United States Patent [19]
Ishihara et al.

[11] Patent Number: 6,155,461
[45] Date of Patent: Dec. 5, 2000

[54] FROZEN DESSERT DISPENSER WITH INCLINABLE DISPENSING CYLINDER

[75] Inventors: Michiharu Ishihara, Ohara-gun; Tsutomu Iwata, Yakumo-mura; Shinji Notsu, Ohara-gun; Takeshi Horie, Yoshida-mura; Yoshinobu Ito, Yatsuka-gun; Hideki Matsudaira, Izumo, all of Japan

[73] Assignee: Hoshizaki Denki Co., Ltd., Aichi, Japan

[21] Appl. No.: 09/390,769

[22] Filed: Sep. 7, 1999

[30] Foreign Application Priority Data

| Mar. 8, 1999 | [JP] | Japan | 11-060690 |
| Mar. 8, 1999 | [JP] | Japan | 11-060691 |

[51] Int. Cl.[7] ................................................. A23G 9/28
[52] U.S. Cl. ..................... 222/146.6; 222/96; 222/326; 222/387; 222/389
[58] Field of Search ................. 222/95, 96, 146.6, 222/325–327, 386, 387, 389

[56] References Cited

U.S. PATENT DOCUMENTS

| 2,998,164 | 8/1961 | Clements | 222/146.6 |
| 5,048,724 | 9/1991 | Thomas | 222/95 |
| 5,069,364 | 12/1991 | McGill | 222/95 |
| 5,492,249 | 2/1996 | Beach | 222/96 |

FOREIGN PATENT DOCUMENTS

| 63-263051 | 10/1988 | Japan . |
| 3-297354 | 12/1991 | Japan . |

Primary Examiner—J. Casimer Jacyna
Attorney, Agent, or Firm—Wenderoth, Lind & Ponack, L.L.P.

[57] ABSTRACT

A frozen dessert dispenser for dispensing ice cream etc. includes a heat-insulating box having a side formed with an opening closed and opened by a heat-insulating door, a dispensing cylinder including a piston and a pack accommodating chamber defined between the piston and a lid closing an upper opening of the cylinder. A frozen dessert pack is accommodated into the pack accommodating chamber when the lid is opened. The dispensing cylinder is mounted on a bracket further mounted on a backside of the door. The bracket positions the dispensing cylinder in the heat-insulating box and is rotated relative to the door so that the dispensing cylinder is inclined from a standing position where the dispensing cylinder stands along the door to a inclined position where an upper end of the dispensing cylinder is spaced away from the door.

28 Claims, 45 Drawing Sheets

Fig. 41
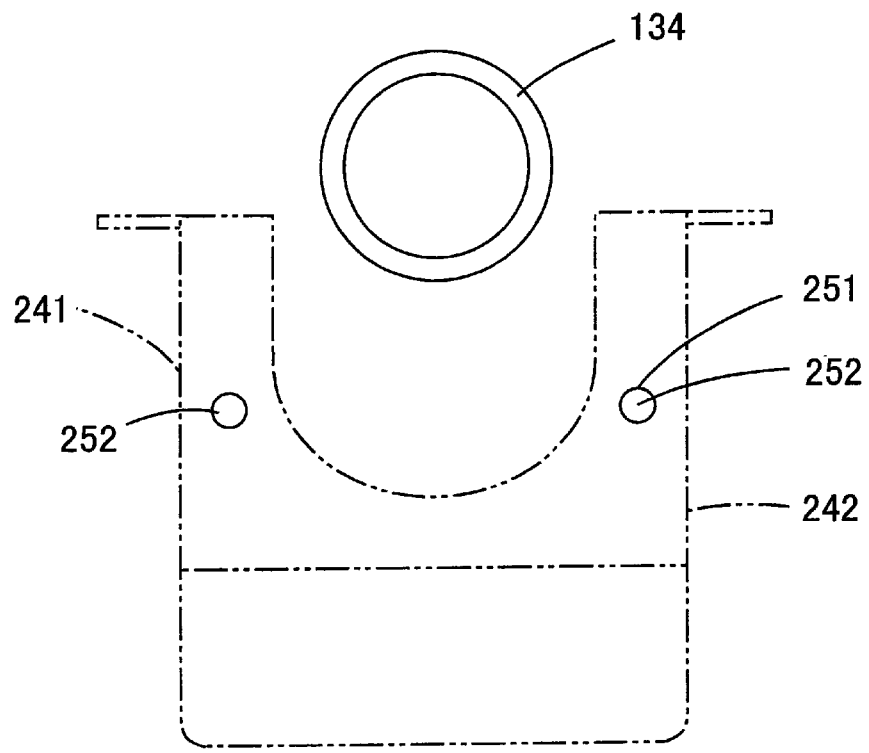
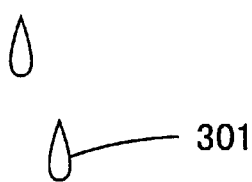
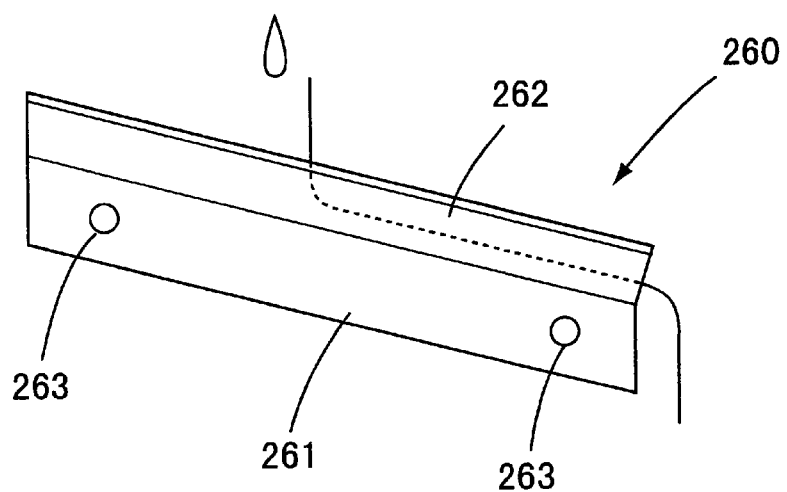

FROZEN DESSERT DISPENSER WITH INCLINABLE DISPENSING CYLINDER

BACKGROUND OF THE INVENTION

1. Field of the Invention

This invention relates generally to a frozen dessert dispenser for dispensing a frozen dessert such as ice cream or frozen yogurt, and more particularly to an improvement in a mounting structure for a dispensing cylinder in such a frozen dessert dispenser.

2. Description of the Prior Art

International Publication No. WO 90/05697 discloses one of the frozen dessert dispensers of the above-described type. In the disclosed dispenser, a cylinder is provided in a heat-insulating box in a vertical disposition. An atmosphere in the heat-insulating box is cooled by a cooling unit. A packed frozen dessert such as a packed ice cream is accommodated in the cylinder. The pack is compressed by a piston driven by a fluid pressure so that the ice cream in the pack is dispensed through a communicating pipe out of the heat-insulating box.

In a case where the communicating pipe through which the frozen dessert is dispensed is long in the above-described construction, the ice cream remaining in the pipe needs to be thrown away in vain when the pack is replaced by a new one. Accordingly, the cylinder is preferably disposed as near to an inner wall surface of the heat-insulating box as possible in order that a length of the communicating pipe through which the frozen dessert is dispensed may be reduced.

On the other hand, when the communicating pipe is disposed near to the inner wall surface of the heat-insulating box, the replacement of the frozen dessert needs to be carried out in a narrow space. This reduces a working efficiency.

SUMMARY OF THE INVENTION

Therefore, an object of the present invention is to provide a frozen dessert dispenser which employs a mechanism for inclining the dispensing cylinder so that an amount of frozen dessert thrown away in the replacement of the pack is reduced and yet in which the replacement of the pack can be carried out in a simplified manner in a shorter period of time.

Another object of the invention is to provide a frozen dessert dispenser in which the inclining mechanism can easily be operated and the cylinder can reliably be held in a required position.

Further another object of the invention is to provide a frozen dessert dispenser in which the interior of the heat-insulating box can be prevented from being soiled by the frozen dessert dropping in the replacement of the packed frozen dessert.

The present invention provides a frozen dessert dispenser comprising a heat-insulating box having a side formed with an opening closed and opened by a heat-insulating door, a cooling unit for cooling an atmosphere in the heat-insulating box, a dispensing cylinder formed into the shape of a vessel having an open end, a bracket for mounting the dispensing cylinder, and a pressure pump. The cylinder includes a lid for closing and opening the open end thereof and a piston provided therein for sliding motion. The open end has a notch in an edge thereof. The cylinder includes a pack accommodating chamber defined between the piston and the lid therein so that a frozen dessert pack is accommodated into the pack accommodating chamber when the lid is opened. The frozen dessert pack includes a dessert discharging cylinder fitted into the notch when the frozen dessert pack is accommodated into the pack accommodating chamber and a frozen dessert filling the pack. The bracket is hingedly mounted on a backside of the door so as to be rotatable. The bracket positions the dispensing cylinder in the heat-insulating box and is rotated relative to the door so that the dispensing cylinder is inclined from a standing position where the dispensing cylinder extends along the door to an inclined position where the open end of the dispensing cylinder is spaced away from the door. The pressure pump supplies and discharges an operating fluid to and from a pressure chamber defined in the dispensing cylinder. The pressure chamber is located in a space opposite the pack accommodating chamber with respect to the piston.

In replacing the pack, the door is opened and the dispensing cylinder is inclined so that the open end thereof is spaced away from the door. The used pack is then taken out of the cylinder and a new pack is accommodated into the cylinder. The pack can easily be put into and taken out of the pack accommodating chamber since the space between the door and the chamber is increased. After the pack has been accommodated in the dispensing cylinder, the latter is raised into the former state and the door is closed, whereupon the frozen dessert can be dispensed.

BRIEF DESCRIPTION OF THE DRAWINGS

Other objects, features and advantages of the present invention will become clear upon reviewing the following description of the preferred embodiments made with reference to the accompanying drawings, in which:

FIG. 41 is a partial front view of the backside of the heat-insulating door;

DETAILED DESCRIPTION OF THE PREFERRED EMBODIMENTS

Figure 1:
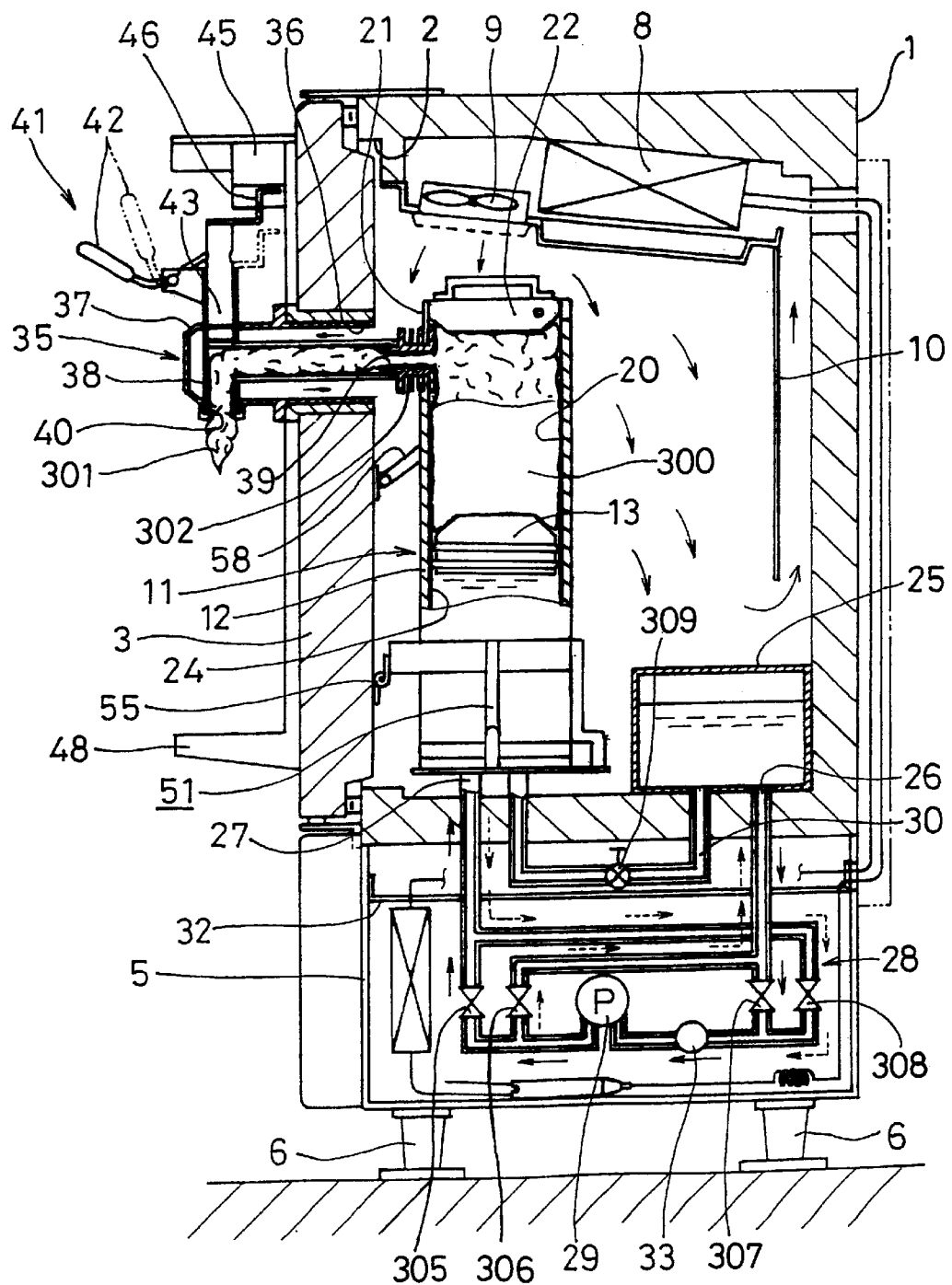
FIG. 1 is a longitudinal sectional side view of an ice cream dispenser of a first embodiment in accordance with the present invention.

The present invention will be described by way of several embodiments in each of which the invention is applied to an ice cream dispenser. FIGS. 1 to 6 illustrate the ice cream dispenser of a first embodiment. Referring to FIG. 1, reference numeral 1 designates a heat-insulating box constituting a freezer. The heat-insulating box 1 has a front opening 2 closed and opened by a heat-insulating door 3 mounted thereon. A machine compartment 5 is provided at the bottom side of the heat-insulating box 1 and supported on legs 6. An evaporator 8 serving as a cooling unit and an interior fan 9 are provided on a ceiling of a freezing compartment. Air in the freezing compartment is drawn in through a duct 10 provided on the rear of the freezing compartment and fed to the evaporator 8 for heat exchange. The air is changed to cold air while passing the evaporator, and the cold air is circulated by the fan 9 into the freezing compartment. The evaporator 8 is connected to a compressor, a condenser, etc. provided in the machine compartment 5 so that a well-known refrigeration cycle is constituted. A temperature in the freezing compartment is maintained at such a value that ice cream 301 can be reserved while being able to be dispensed.

A dispensing cylinder 11 made of a stainless steel is mounted on the inside of the heat-insulating door 3 in a vertical disposition. A mounting structure for the dispensing cylinder 11 will be described in detail later. The dispensing cylinder 11 is formed into the shape of a cylindrical container and has an opening in an upper end thereof. A piston 13 is fitted in the dispensing cylinder 11 so as to be slid therein. An operating fluid is an antifreezing solution.

Figure 2:
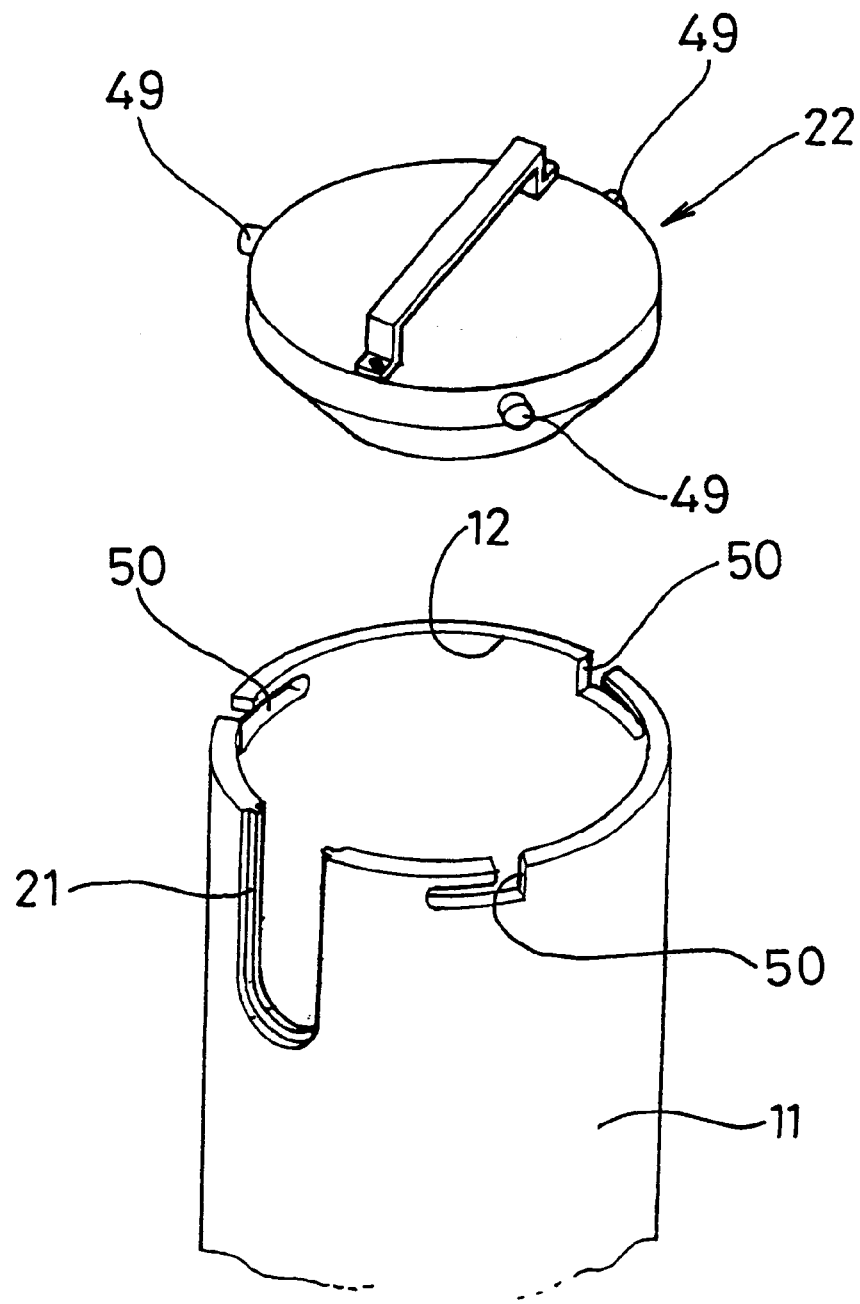
FIG. 2 is an exploded perspective view showing a lid and a portion of a dispensing cylinder to which the lid is attached.
Figure 6:
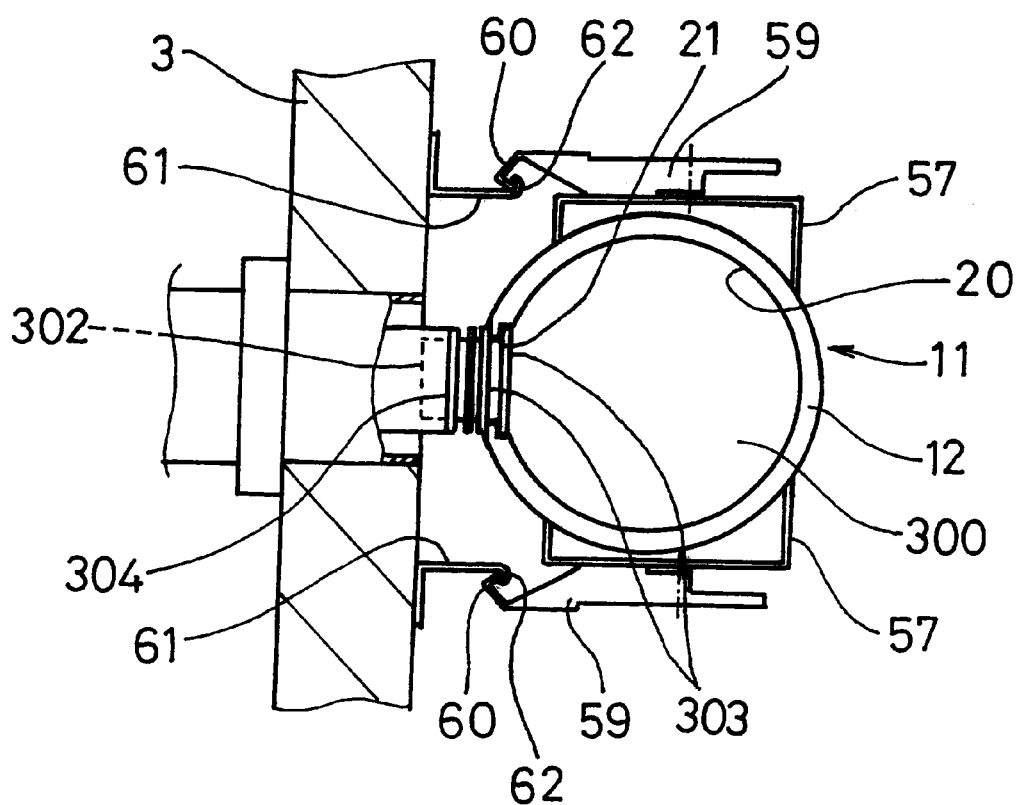
FIG. 6 is a plan view of a latching mechanism.

The interior of the dispensing cylinder 11 at an upper side of the piston 13 is defined as a pack accommodating chamber 20. A wall of the pack accommodating chamber 20 opposed to the heat-insulating door 3 has a U-shaped notch 21 formed by cutting vertically from the upper edge thereof as shown in FIG. 2. A, pack 300 filled with ice cream 301 is made of a soft resin and is flexible. The pack 300 has at one end thereof a frozen dessert discharging cylinder 302 made of a hard resin. The pack 300 has four spaced-apart flanges on an outer circumference thereof as shown in FIG. 6. These flanges include two mounting flanges 303 at the proximal end side and two closing flanges 304 at the distal end side. The pack 300 is accommodated in the pack accommodating chamber 20 with its portion between the flanges 303 being fitted in the notch 21.

A lid 22 made of a stainless steel is detachably attached to the dispensing cylinder 11 so as to close the upper end opening 12 of the pack accommodating chamber 20. The lid 22 has, for example, three pins protruding from an outer circumference thereof as shown in FIG. 2. The dispensing cylinder 11 has three J-shaped slots 50 formed in the upper edge thereof. The pins 49 are fitted in the J-shaped slots 50 respectively and the lid 22 is then rotated clockwise so that the lid is attached to the dispensing cylinder 11.

A pressure chamber 24 is defined in the interior of the dispensing cylinder 11 at the underside of the piston 13. The operating fluid is supplied into and discharged from the pressure chamber 24. A tank 25 is provided on the rear bottom of the freezing compartment for reserving the operating fluid. The bottoms of the tank 25 and the pressure chamber 24 are formed with ports 26 and 27 respectively. A brine passage 28 provided in the machine compartment 5 connects the ports 26 and 27 to each other. More specifically, the brine passage 28 is provided with a pressure pump 29 such as a vane pump and four electromagnetic valves 305 to 308 for switching a passage between two systems. The operating fluid in the tank 25 is supplied into the pressure chamber 24 of the dispensing cylinder 11 when the pressure pump 29 is driven with the first and third valves 305 and 307 being opened and the second and fourth valves 306 and 308 being closed (a first mode). On the other hand, the operating fluid in the pressure chamber 24 is returned to the tank 25 when the pressure pump 29 is driven with the second and fourth valves 306 and 308 being opened and the first and third valves 305 and 307 being closed (a second mode). Another air vent pipe 30 connects the pressure chamber 24 and the tank 25 to each other. The air vent pipe 30 is provided with a normally closed electromagnetic valve 309. A drain pan 32 is provided on the ceiling of the machine compartment 5. A flow rate sensor 33 is provided in the middle of the brine passage 28.

Figure 3:
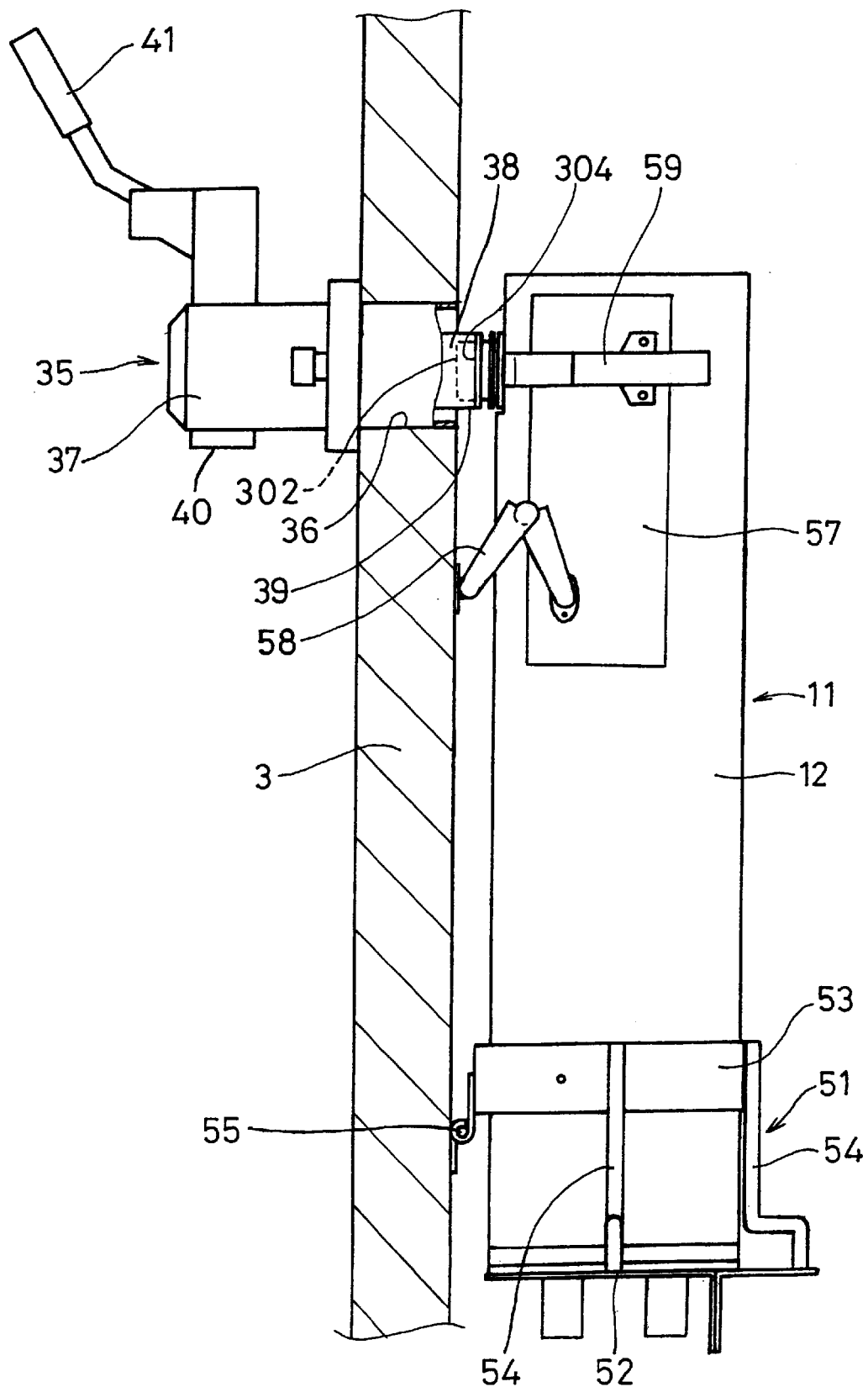
FIG. 3 is a side view of the dispensing cylinder assuming a held position.

A dispensing mechanism 35 for dispensing the ice cream 301 is provided on the heat-insulating door 3. The heat-insulating door 3 has a mounting through hole 36 formed therein to correspond to the frozen dessert discharging cylinder 302 of the pack 300 accommodated in the dispensing cylinder 11. A cylindrical member 37 having a closed front extends through the mounting hole 36 so as to protrude forward from the heat-insulating door 3. A T-shaped connecting pipe 38 is provided in the cylindrical member 37 with a predetermined clearance therebetween. A horizontal pipe of the connecting pipe 38 has a rear end formed with a connecting port 39 protruding toward the inside of the heat-insulating door 3 a predetermined length. The frozen dessert discharging cylinder 302 of the pack 300 is fitted with the connecting port 39 so that the flange 304 of the cylinder abuts the opening edge of the connecting port 39, whereupon the cylinder is connected to the horizontal pipe of the connecting pipe 38, as shown in FIG. 3. A vertical pipe of the connecting pipe 38 has upper and lower ends extending through the cylindrical member 37 upward and downward respectively. The lower end of the vertical pipe serves as a dispensing opening 40. A dispensing cock 41 is provided at the upper end side of the vertical pipe. The dispensing cock 41 includes a lever 42 rotated so that a valve element 43 is moved upward or downward. The valve element 43 constitutes an operating valve opening the dispensing opening 40 when the lever 42 is rotated from a position shown by two-dot chain line to a position shown by solid line.

A normally open microswitch 45 is provided on the outer face of the door 3 so as to be located over the dispensing mechanism 35. The microswitch 45 controls start and stop of an electric motor (not shown) of the pressure pump 29 for supplying the brine. The valve 43 of the dispensing cock 41 is provided with an operation plate 46. When the valve element 43 is moved upward so that the dispensing opening 40 is opened, the operation plate 46 presses an actuator so that the microswitch 45 is turned on. A stand 48 is mounted on the outer face of the door 3 so as to be located below the dispensing mechanism 35. A vessel for receiving the dispensed ice cream 301 is placed on the stand 48.

The structure for mounting the dispensing cylinder 11 on the heat-insulating door 3 will now be described in detail with reference to FIGS. 3 to 6. A bracket 51 is provided for supporting the lower end side of the dispensing cylinder 11. The bracket 51 is generally formed into the shape of a cage and includes a bottom plate 52, an annular fitting 53 and three vertical frames 54 to which the annular fitting 53 is connected so as to be located over the bottom plate 52, as shown in FIG. 5. The lower end of the dispensing cylinder 11 is fitted into the fitting 53 to be received by the bottom plate 52. A front of the fitting 53 is mounted on a hinge 55 further mounted on the lower inside of the door 3, so that the bracket 51 is rockable.

Two mounting plates 57 are fixed to the right-hand and left-hand circumferential faces of the dispensing cylinder 11. at the upper end side respectively as viewed from the front thereof. A pair of foldable stays 58 connect the respective lower ends of the mounting plates 57 to the inside of the door 3. A pair of latch arms 59 are mounted on the upper ends of the mounting plates 57 respectively. Each latch arm 59 extends forward and has a claw 60 formed in the inside of a distal end thereof. The inside of the door 3 has a pair of engagement pieces 61 formed so as to correspond to the latch arms 59 respectively. Each engagement piece 61 is elastically deformable and has a distal end formed with an outwardly bent engaging portion 62.

Figure 4:
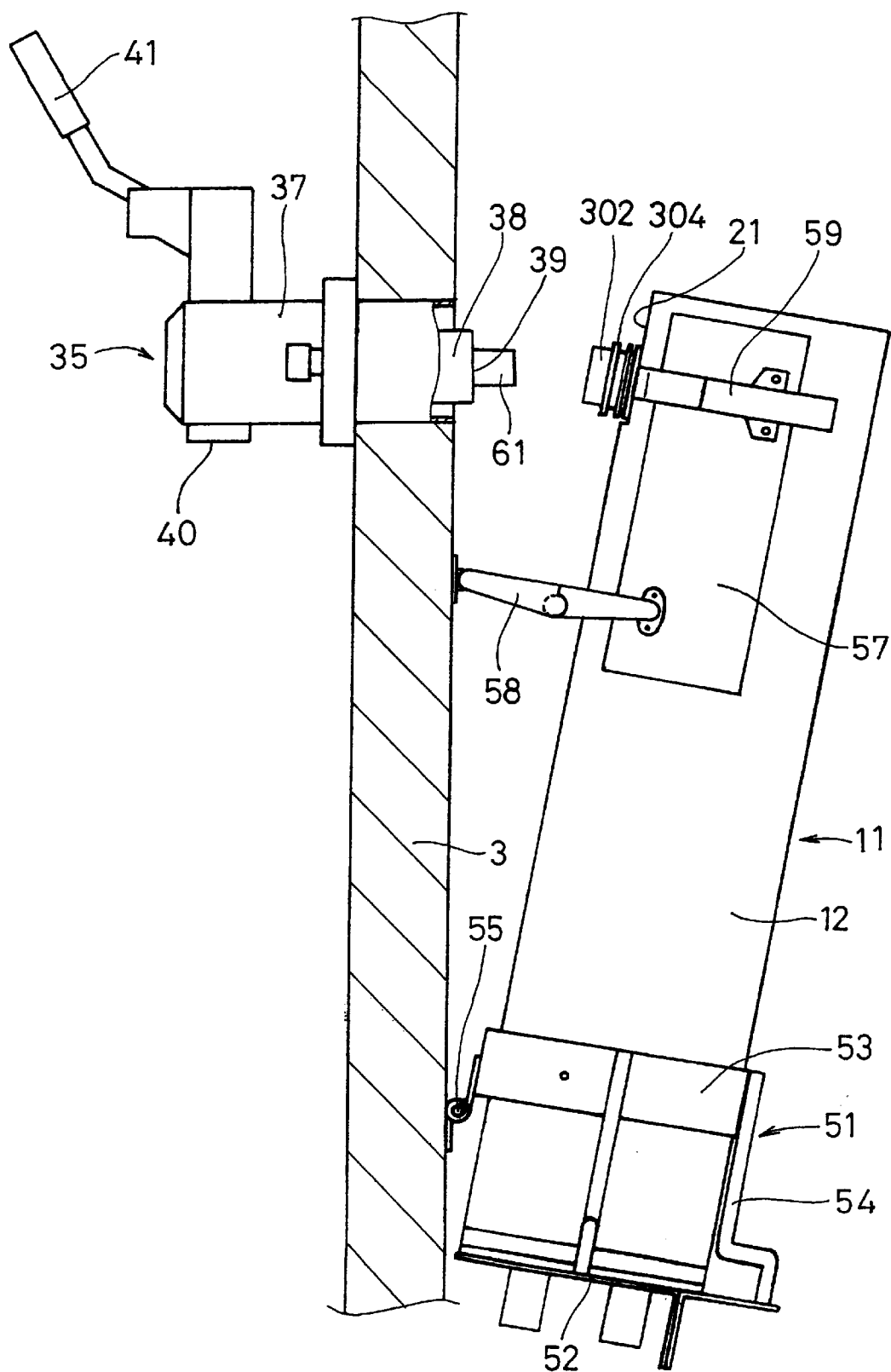
FIG. 4 is a side view of the dispensing cylinder assuming an inclined position.
Figure 5:
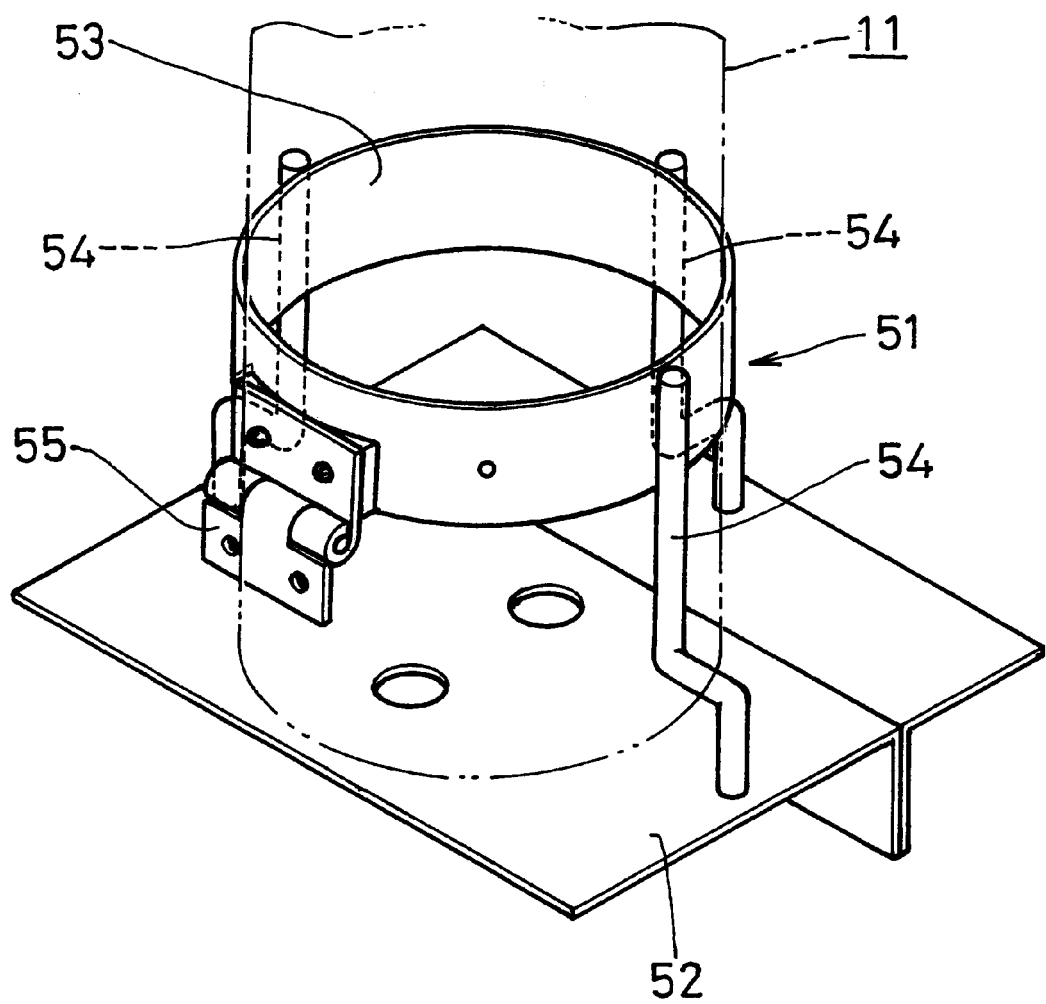
FIG. 5 is a perspective view of a bracket.

The dispensing cylinder 11 is mounted on the inside of the door 3 so as to be inclined between a standing position where the cylinder stands along the door 3 as shown in FIG. 3 and an inclined position where the upper end opening 12 thereof is spaced away from the backside of the door 3 as shown in FIG. 4. When the dispensing cylinder 11 assumes the standing position, the claws 60 of the latch arms 59 are elastically engaged with the engaging portions 62 of the engagement pieces 61 respectively as shown in FIG. 6. At this time, the frozen dessert discharging cylinder 302 of the pack 300 accommodated in the pack accommodating chamber 20 is fitted with the connecting port 39 of the dispensing mechanism 35, so that the flange 304 at the distal end side of the pack 300 abuts the connecting port 39. The inclination of the dispensing cylinder 11 is limited when the stays 58 are extended completely. Each of the brine passage 28 and the air vent pipe 30 both connected to the pressure chamber 24 of the cylinder 11 has a sufficient length so that each of these components can be maintained in the connected state even when the door 3 is opened so that the cylinder 11 is taken out of the freezing compartment.

The operation of the ice cream dispenser will now be described. When the ice cream 301 is to be dispensed, the dispensing cylinder 11 is held at the standing position as shown in FIG. 1. The electromagnetic valves 305 to 308 of the brine passage 28 are controlled so that the passage from the tank 25 to the pressure chamber 24 is established. In order that the ice cream 301 may be dispensed, a vessel not shown is placed on the stand 48 and the lever 42 of the dispensing cock 41 is rotated to the position shown by solid line in FIG. 1 so that the dispensing port 40 is opened. Further, the microswitch 45 is turned on so that the pressure pump 29 is driven. Then, the operating fluid in the tank 25 is pumped up to be supplied into the pressure chamber 24 of the dispensing cylinder 11 as shown by solid line arrows in FIG. 1. When the operating fluid is, pressurized in the pressure chamber 24, the piston 13 is moved upward to compress the pack 300 so that the ice cream 301 is caused to flow through the discharging cylinder 302 out of the pack 300. The ice cream 301 is then dispensed through the dispensing port 40 into the vessel.

When a predetermined amount of ice cream 301 has been dispensed, the lever 42 of the dispensing cock 41 is rotated to the position shown by the two-dot chain line in FIG. 1. As at result, the microswitch 45 is turned off such that the pressure pump 29 is deenergized. Further, the dispensing port 40 is; closed so that the dispensing is stopped. The ice cream 301 is; again dispensed when the above-described procedure is repeated.

The pack 300 is replaced by a new one when the ice cream 301 in the pack 300 has been used up. In this case, the door 3 is first opened, so that the dispensing cylinder 11 is taken out of the dispenser and a pack replacing switch (not shown) is turned on. As a result, the electromagnetic valves 305 to 308 of the brine passage 28 are switched from the first mode to the second mode and the pressure pump 29 is driven. Then, the operating fluid in the pressure chamber 24 of the dispensing cylinder 11 is drawn in to return into the tank 25 as shown by broken line arrows in FIG. 1. As a result, since the interior of the pressure chamber 24 is turned to the negative pressure state, the piston 13 is moved downward and the pack accommodating chamber 20 is spread.

The engagement pieces 61 on the inside of the door 3 are narrowed so that the latch arms 59 are unlatched. The dispensing cylinder 11 is then inclined about the hinge 55 while being held. With this, the discharging cylinder 302 of the pack 300 is pulled out of the connecting port 39 of the dispensing mechanism 35. The dispensing cylinder 11 is held at the inclined position as shown in FIG. 4 when the stays 58 have been completely extended. The lid 22 is then detached so that the used pack 300 is taken out. A new pack 300 is inserted into the pack accommodating chamber 20, and the portion of the discharging cylinder 302 between the two flanges 303 at the proximal end side is fitted into the notch 21. Since the dispensing cylinder 11 is inclined and accordingly, a sufficient space is ensured between the cut-out portion of the notch 21 and the door 3, the discharging cylinder 302 can easily be inserted into the notch 21.

The dispensing cylinder 11 is raised to the standing position as shown in FIG. 3 after the lid 22 has been attached to the cylinder. The dispensing cylinder 11 is raised while the paired engagement pieces 61 are being flexed inward by the respective latch arms 59. When the cylinder 11 assumes a vertical position, the claws 60 of the latch arms 59 are engaged with the engaging portions 62 respectively while the engagement pieces 61 are being returned to the former states, whereupon the cylinder 11 is held at the standing position, as shown in FIG. 6. With this, the discharging cylinder 302 of the pack 300 is fitted into the connecting port 39 of the dispensing mechanism, and the flange 304 at the distal end side abuts the connecting port, whereupon the discharging cylinder 302 is connected to the connecting port 39. The replacement of the pack 300 is thus completed. When the door 3 is finally closed, the ice cream 301 can be dispensed again.

According to the first embodiment, the dispensing cylinder 11 is mounted on the inside of the door 3 so as to be inclined. With the inclining operation, the discharging cylinder 302 of the pack 300 can automatically be connected to and disconnected from the connecting port 39 of the dispensing mechanism 35. Thus, the dispensing mechanism 3 need not be detached. Further, the space between the portion of the cylinder 11 where the notch 211 is provided and the door is increased when the dispensing cylinder 11 is moved to the inclined position. Consequently, the discharging cylinder 30 of the pack 300 can easily be fitted into the notch 21. Thus, the pack 300 can readily be replaced by a new one in a short time. Further, since the latching mechanism is employed for holding the cylinder 11 at the standing position, the cylinder 11 can be held at the standing position by a single operation and he usability of the dispenser can be improved.

Figure 7:
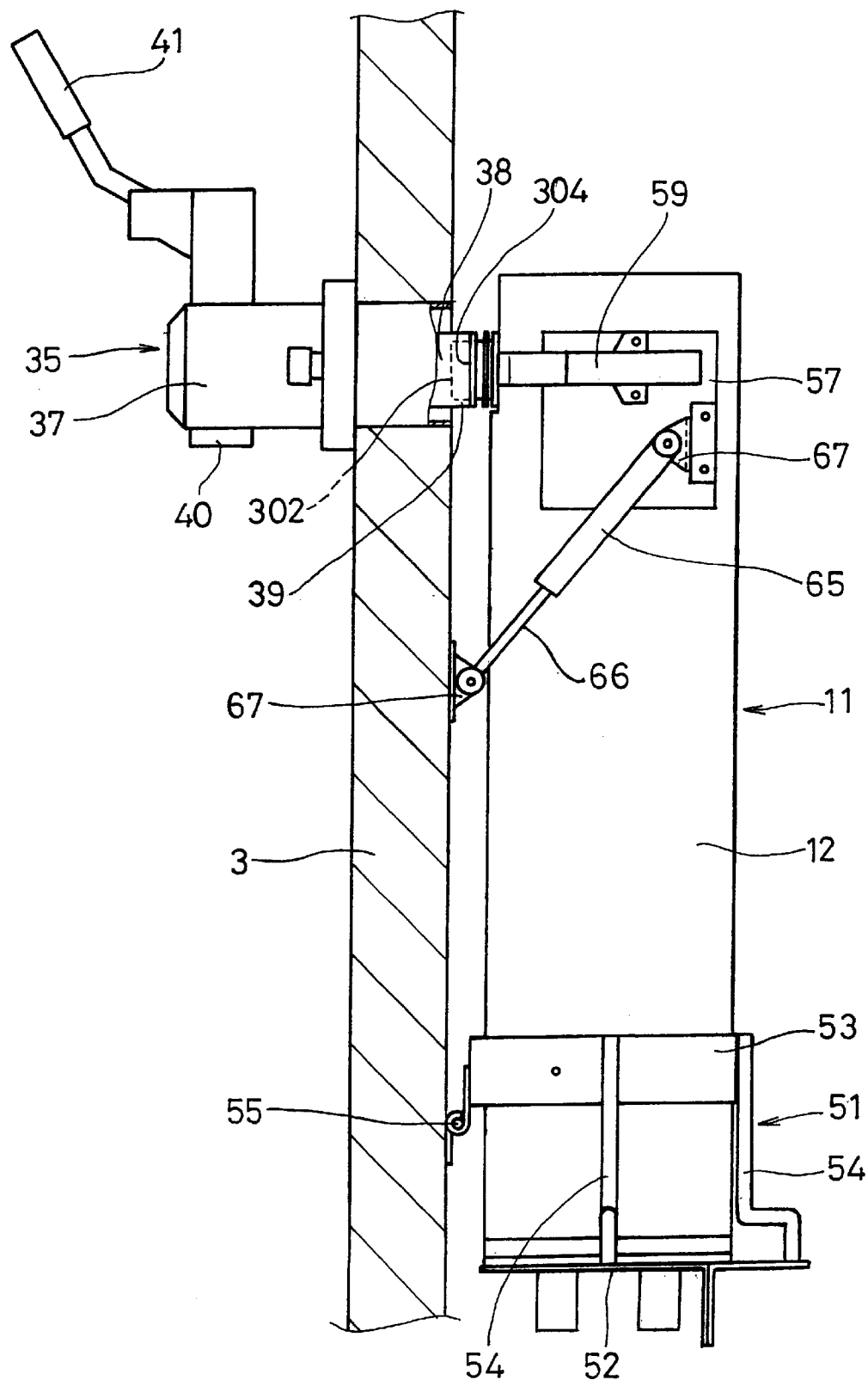
FIG. 7 is a side view of the dispensing cylinder assuming the held position in the ice cream dispenser of a second embodiment in accordance with the invention.
Figure 8:
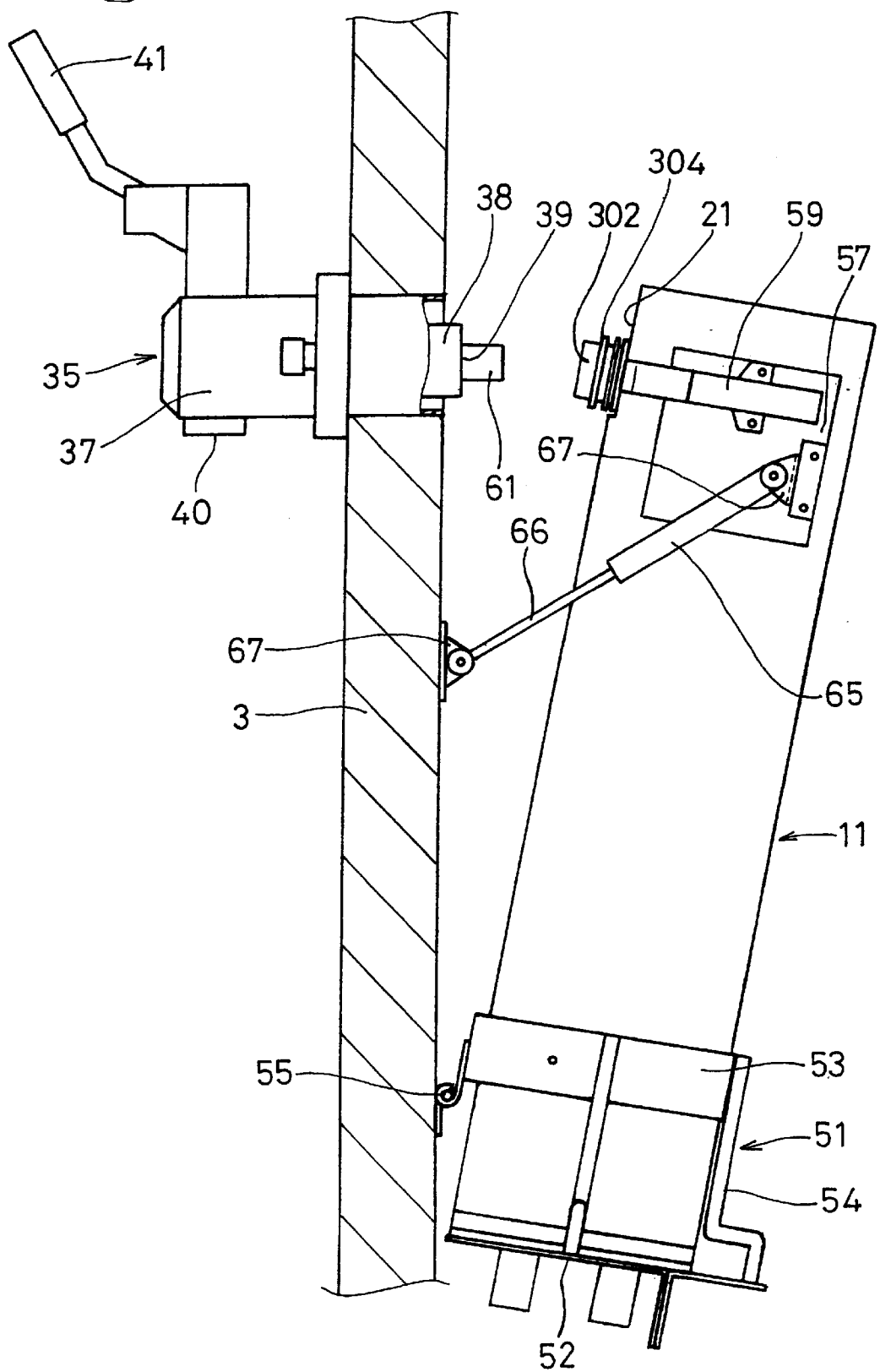
FIG. 8 is a side view of the dispensing cylinder assuming the inclined position.

FIGS. 7 and 8 illustrate a second embodiment of the invention. A pair of damper stays 65 are provided for holding the dispensing cylinder 11 at the inclined position in the second embodiment. Each damper stay 65 has a proximal end mounted on a bracket 67 further mounted on the mounting plate 57 of the dispensing cylinder 11. A distal end of each rod 66 is mounted on another bracket 67 further mounted on the inside of the heat-insulating door 3. The other construction of the ice cream dispenser of the second embodiment is the same as that of the first embodiment. The identical or similar parts are labeled by the same reference symbols as in the first embodiment and accordingly, the description of these parts is eliminated.

The cylinder 11 is inclined to the inclined position as shown in FIG. 8 when the latch arms 59 are unlatched in the state where the cylinder 11 assumes the standing position as shown in FIG. 7. In this case, the cylinder 11 is inclined with the rod 66 of the damper stay 65 being protruded against gas pressure. Consequently, the dispensing cylinder 11 can smoothly be inclined without being shocked when the damper stays 65 are used.

Figure 9:
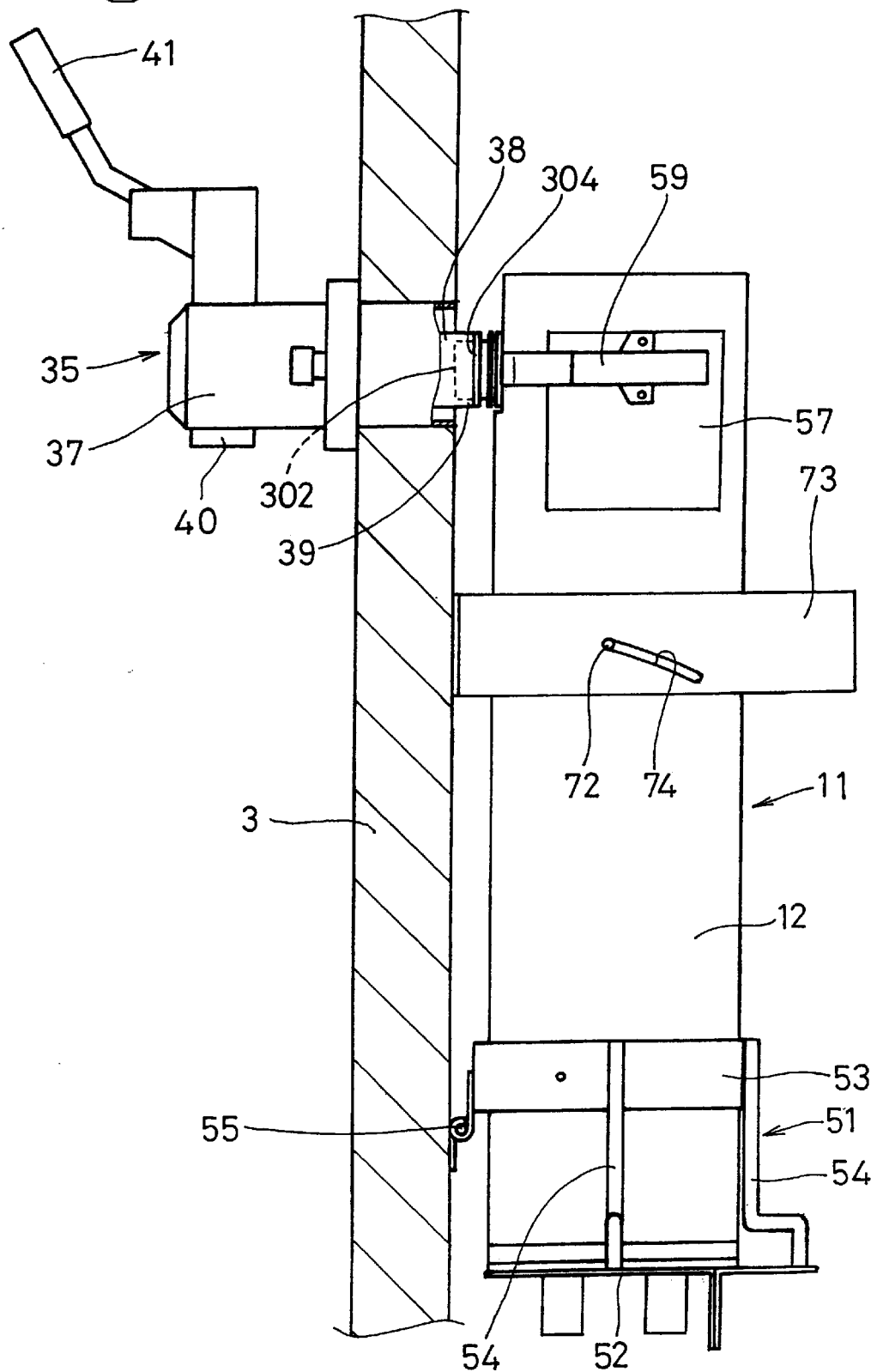
FIG. 9 is a side view of the dispensing cylinder assuming the held position in the ice cream dispenser of a third embodiment in accordance with the invention.
Figure 10:
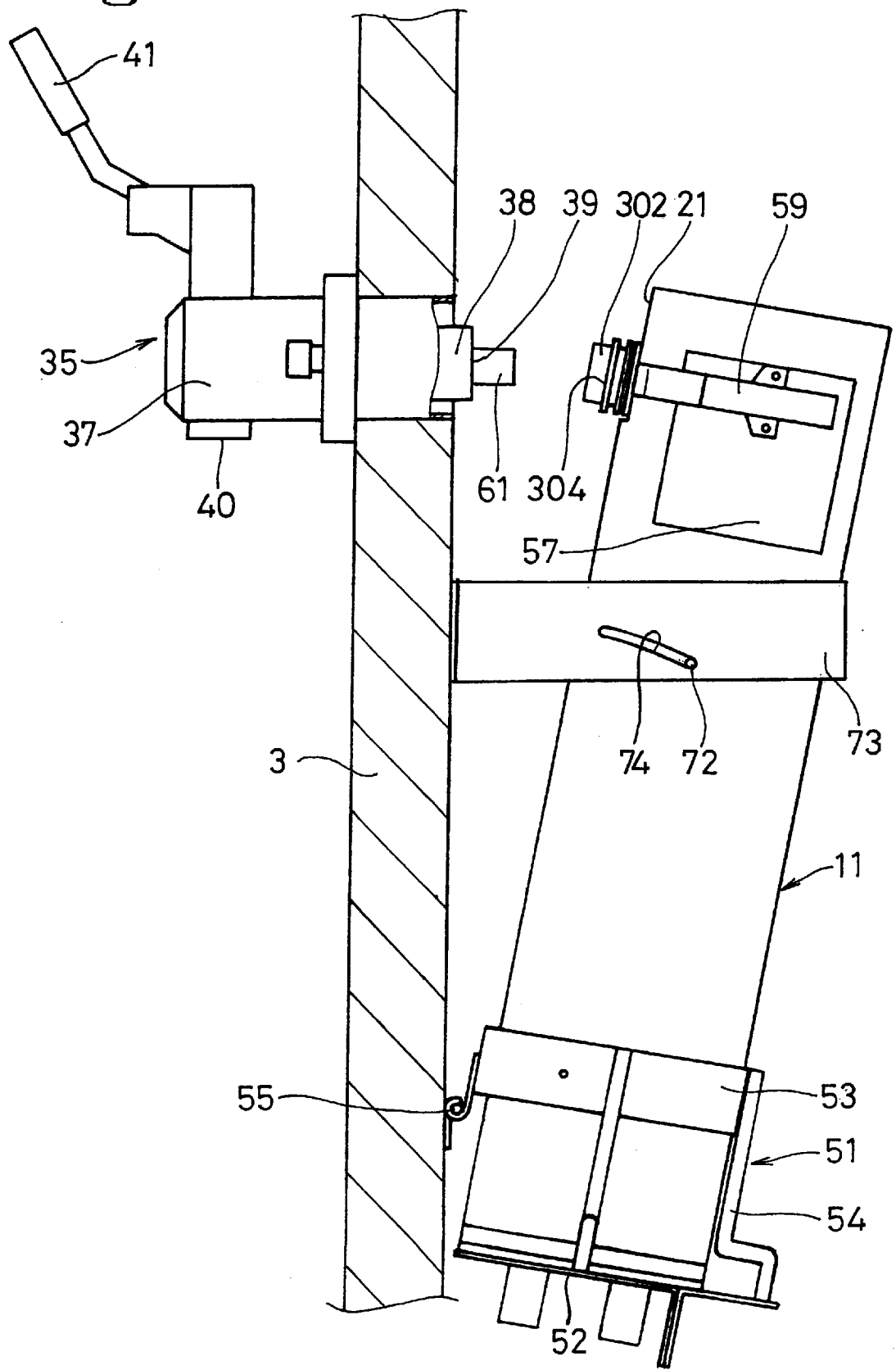
FIG. 10 is a side view of the dispensing cylinder assuming the inclined position.
Figure 11:
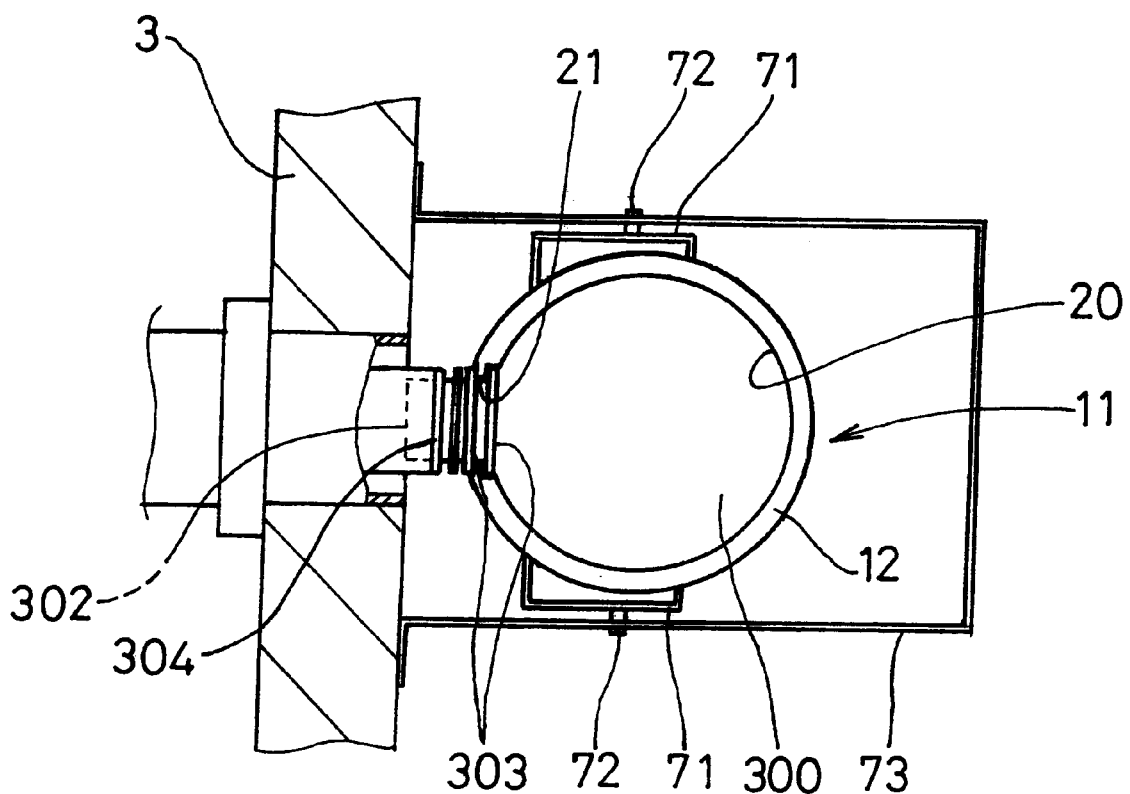
FIG. 11 is a plan view of the dispensing cylinder assuming the held position.

FIGS. 9 to 11 illustrate a third embodiment. The third embodiment is also directed to means for holding the dispensing cylinder at the inclined position. Two pins 72 protrude from the mounting plates 71 fixed to the right-hand and left-hand circumferential faces of the dispensing cylinder 11 respectively. A generally C-shaped support plate 73 is mounted on the inside of the heat-insulating door 3 so as to surround the dispensing cylinder 11. The support plate 73 has two arc-shaped slots 74 formed in right-hand and left-hand sides thereof respectively. The pins 72 are fitted in the slots 74 respectively. The dispensing cylinder 11 assuming the standing position as shown in FIG. 9 is inclined while the pins 72 is being slid in the respective slots 74. When the pins 72 collide against the rear ends of the slots 74 respectively, the cylinder 11 stops inclining to be held in position.

Another holding means may be provided. For example, a chain may be provided for connecting the cylinder 11 and the door 3 to each other. Further, the door 3 may be provided with a receiving member for merely receiving the inclined cylinder 11.

Figure 12:
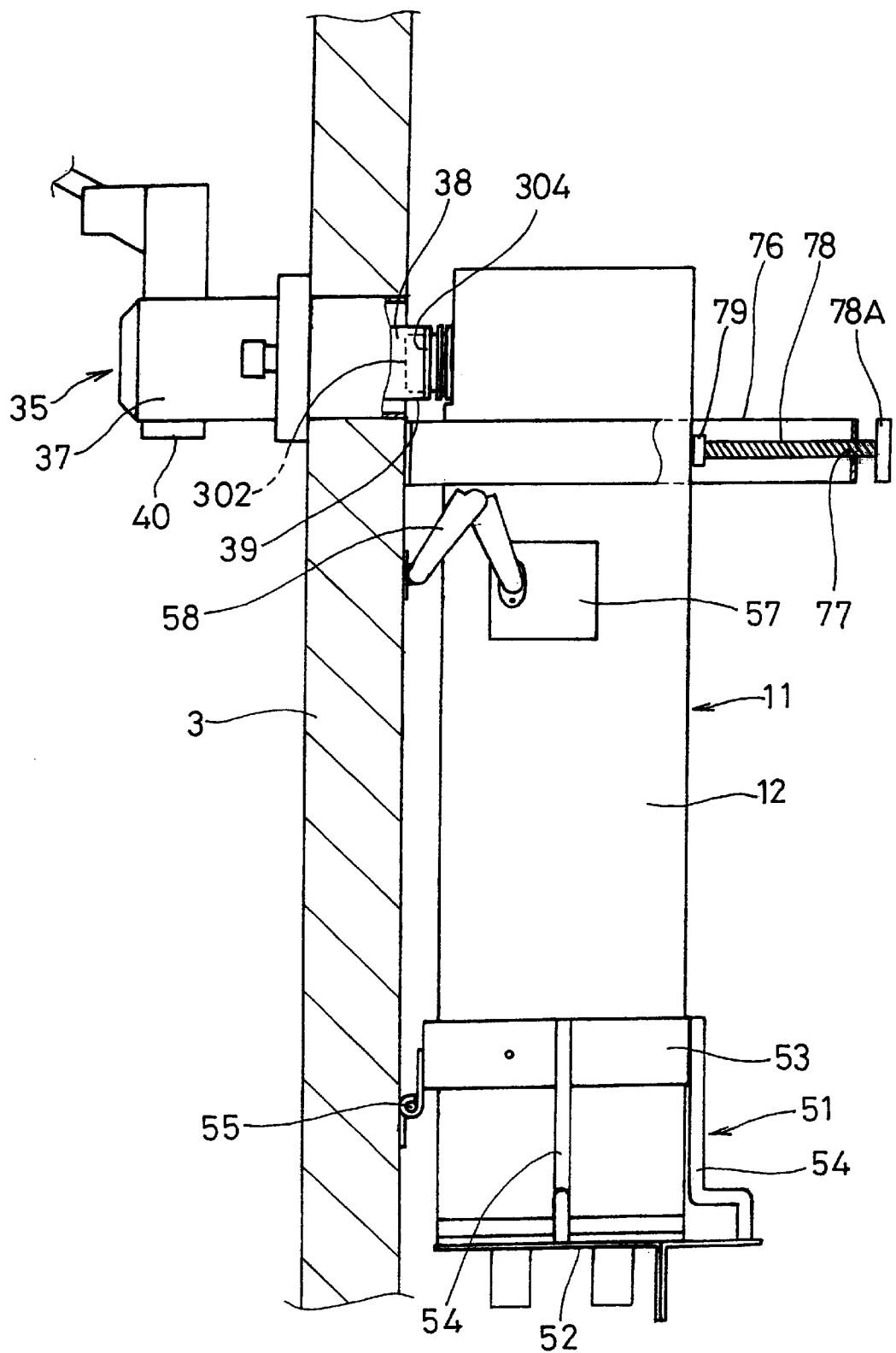
FIG. 12 is a side view of the dispensing cylinder assuming the held position in the ice cream dispenser of a fourth embodiment in accordance with the invention.
Figure 13:
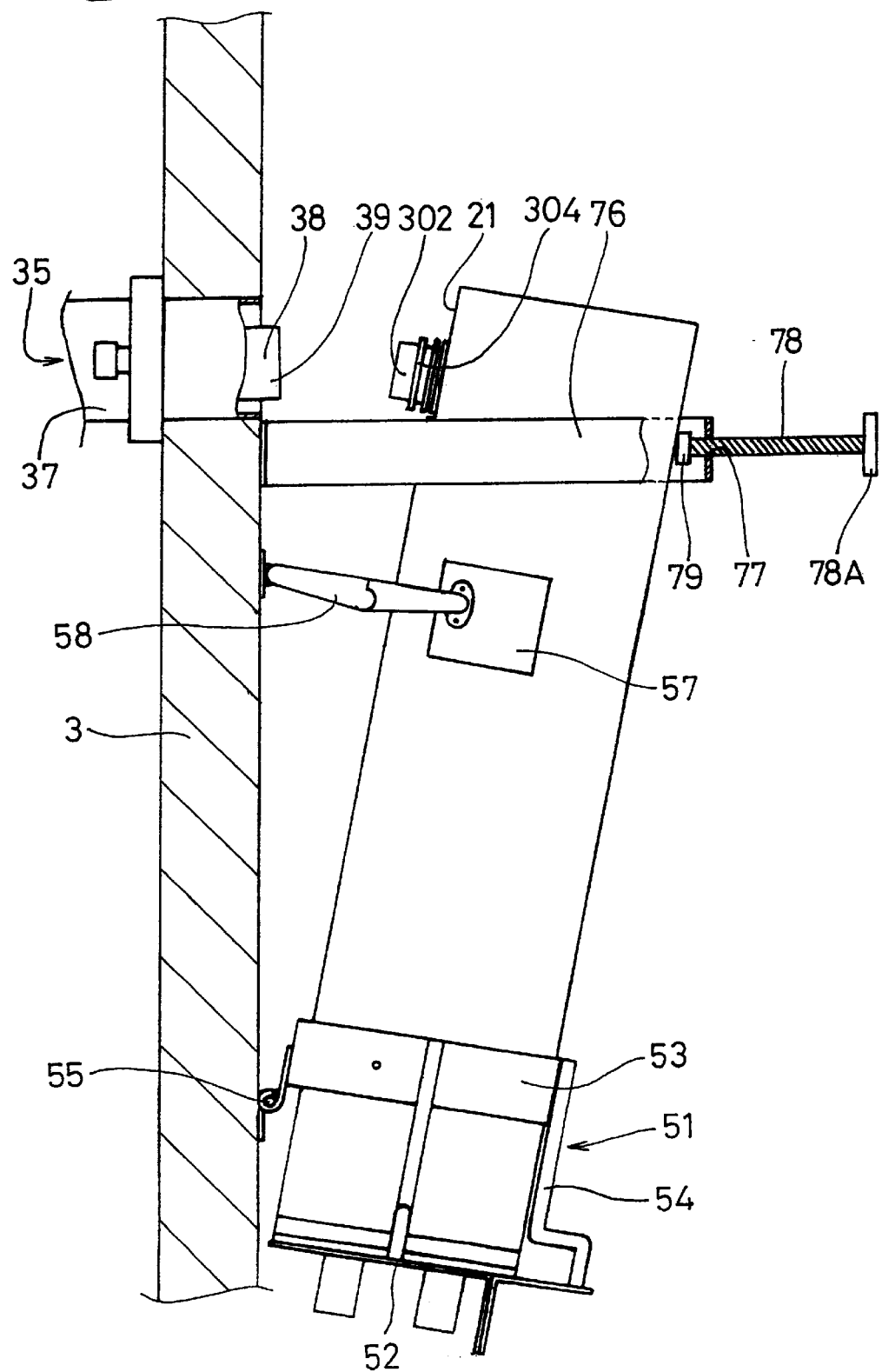
FIG. 13 is a side view of the dispensing cylinder assuming the inclined position.
Figure 14:
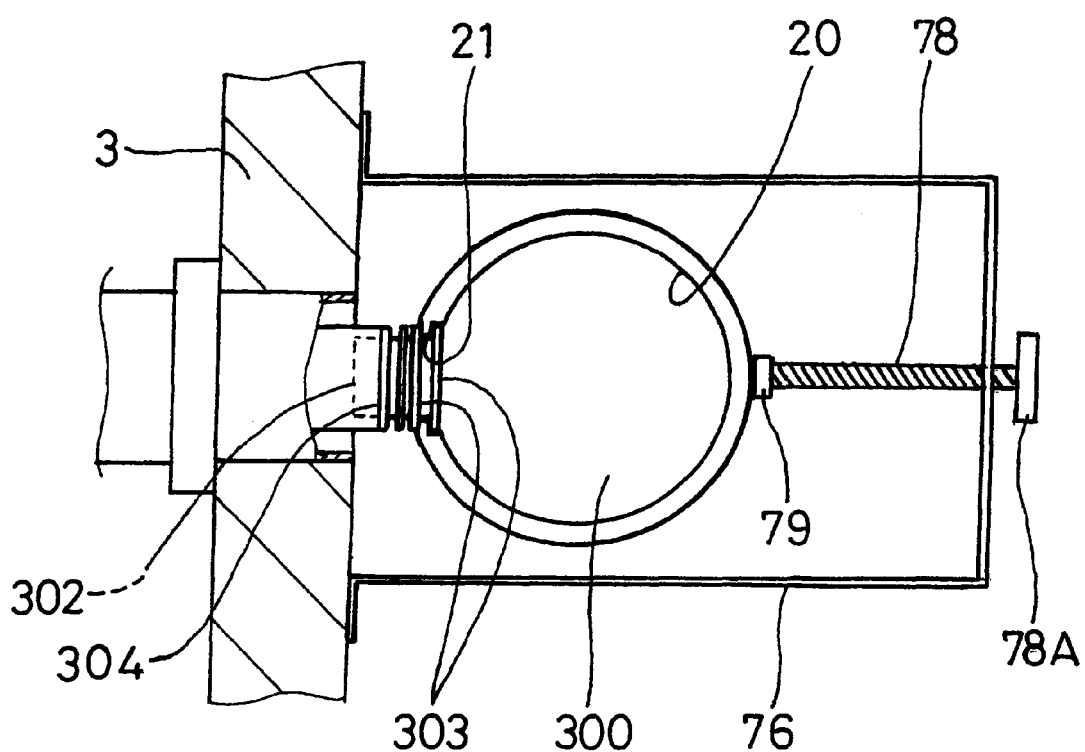
FIG. 14 is a plan view of the dispensing cylinder assuming the held position.

FIGS. 12 to 14 illustrate a fourth embodiment. The fourth embodiment is also directed to means for holding the dispensing cylinder 11 at the standing position. A generally C-shaped mounting plate 76 is mounted on the inside of the door 3 so as to surround the upper end of the cylinder 11. The mounting plate 76 has a screw hole 77 threaded in the central rear thereof. A screw rod 78 having an operating knob 78A is thrust into the screw hole 77. The rod 78 has a pressing portion 79 at a distal end thereof.

The screw rod 78 is tightened so that the pressing portion 79 presses the upper rear face of the dispensing cylinder 11, whereupon the cylinder 11 is held at the standing position as shown in FIG. 12. When the screw rod 78 is loosened, the cylinder 11 is inclined as shown in FIG. 11.

Figure 15:
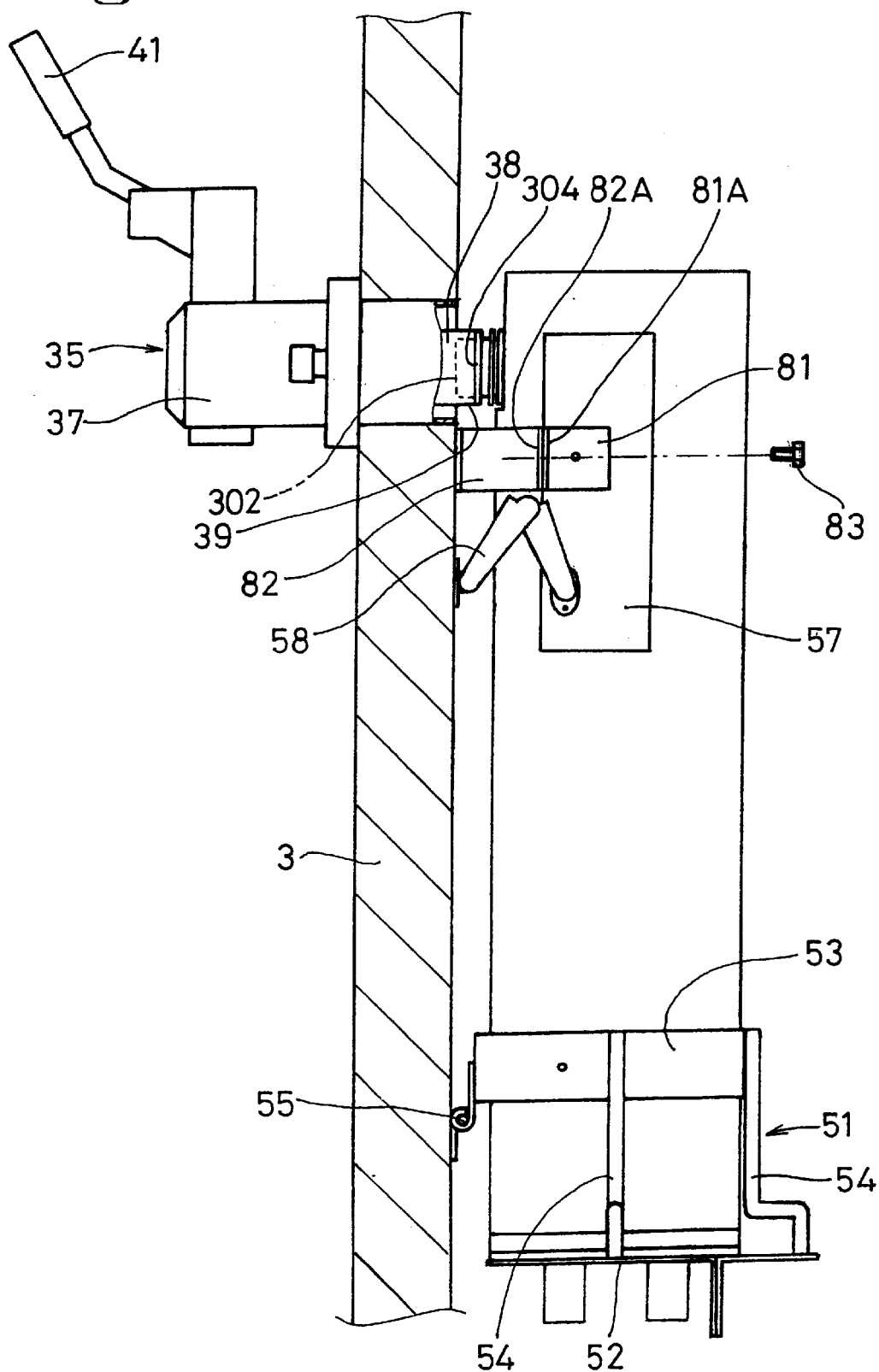
FIG. 15 is a side view of the dispensing cylinder assuming the held position in the ice cream dispenser of a fifth embodiment in accordance with the invention.
Figure 16:
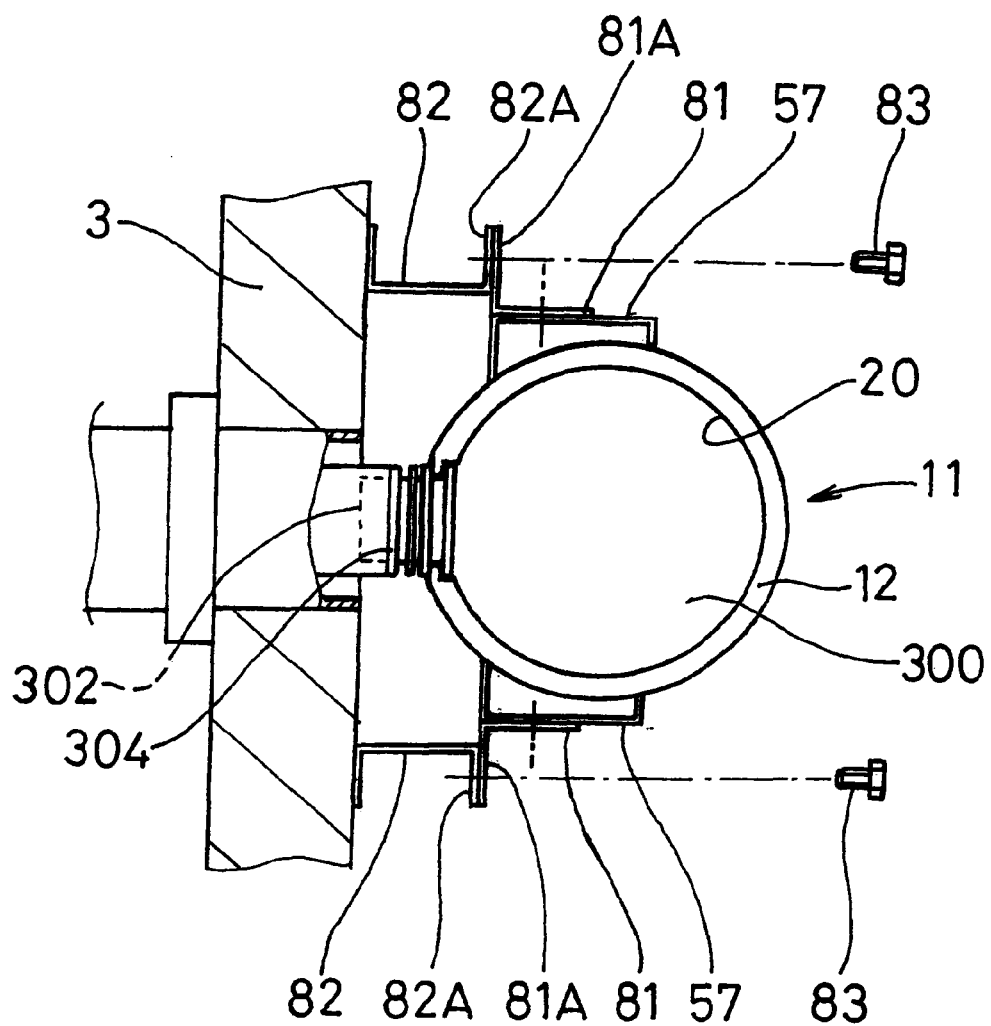
FIG. 16 is a plan view of the dispensing cylinder assuming the held position.

FIGS. 15 and 16 illustrate a sixth embodiment. The sixth embodiment is also directed to means for holding the dispensing cylinder 11 at the standing position. Two generally L-shaped connecting plates 81 having abutting portions 81A are mounted on the mounting plates 57 of the dispensing cylinder 11 respectively. Two generally C-shaped connecting plates 82 protrude from the inside of the door 3 so as to correspond to the connecting plates 81 respectively. The connecting plates 82 include abutting portions 82A abutting the respective abutting portions 81A of the connecting plates 81. In order that the cylinder 11 may be held at the standing position, the cylinder 11 is raised to the standing position and screws 83 are screwed into the abutting portions 81A and 82A of both connecting plates 81 and 82 so that the abutting portions are tightened up, respectively. The dispensing cylinder 11 is inclined when the screws 83 are loosened to be detached.

Figure 17:
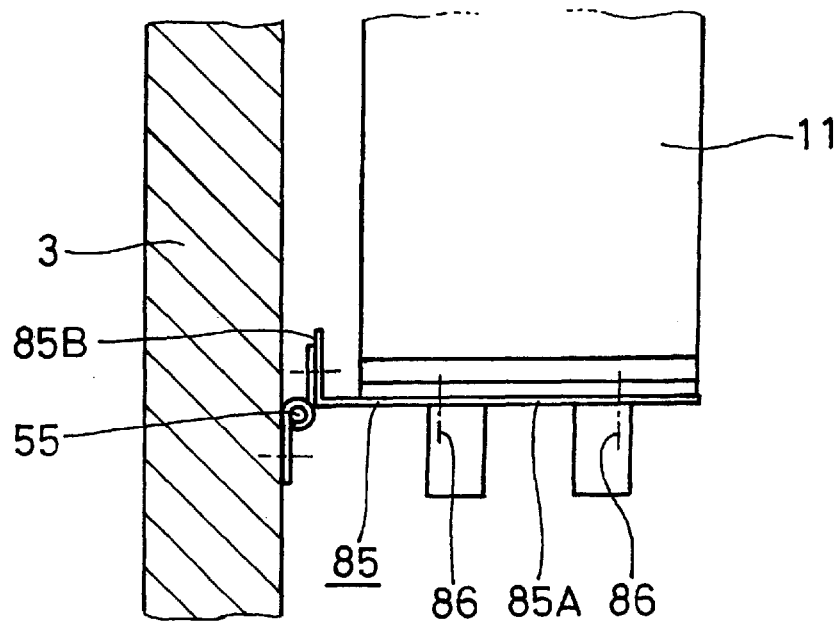
FIG. 17 is a plan view of a bracket used in the ice cream dispenser of a sixth embodiment in accordance with the invention.

Sixth to eighth embodiments are directed to modified forms of the bracket for receiving the lower portion of the dispensing cylinder 11. FIG. 17 illustrates the sixth embodiment. A bracket 85 comprises a generally L-shaped fitting. The bracket 85 includes a long side 85A fixed to the bottom of the dispensing cylinder 11 by screws 86 etc. and a short side 85B mounted to the inside of the heat-insulating door 3.

Figure 18:
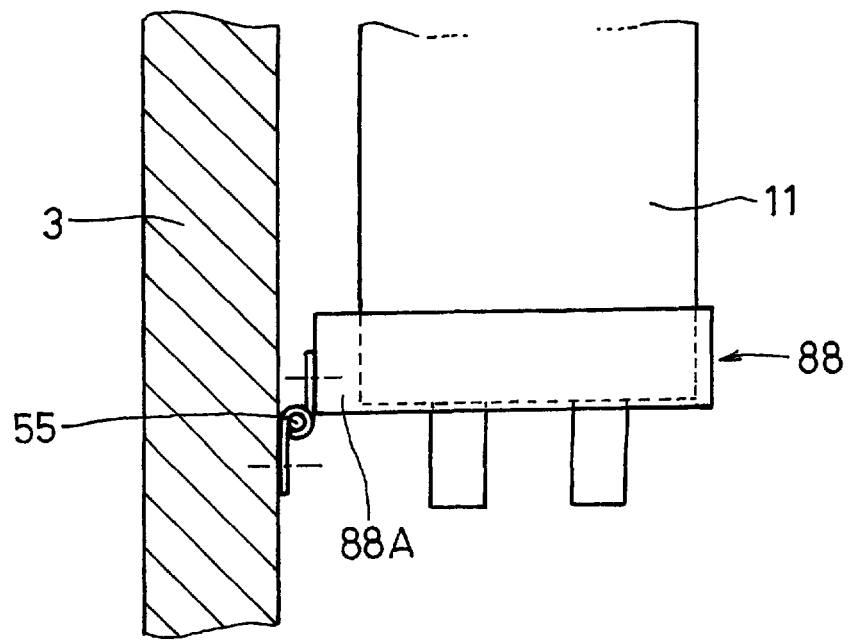
FIG. 18 is a plan view of a bracket used in the ice cream dispenser of a seventh embodiment in accordance with the invention.

FIG. 18 illustrates the seventh embodiment. A bracket 88 is formed into the shape of a bottomed cylinder. The lower end of the dispensing cylinder 11 is fitted into the bracket 88 to be received therein. A cylindrical portion 88A of the bracket 88 is mounted at a front face thereof to hinge 55 further mounted on the inside of the heat-insulating door 3.

Figure 19:
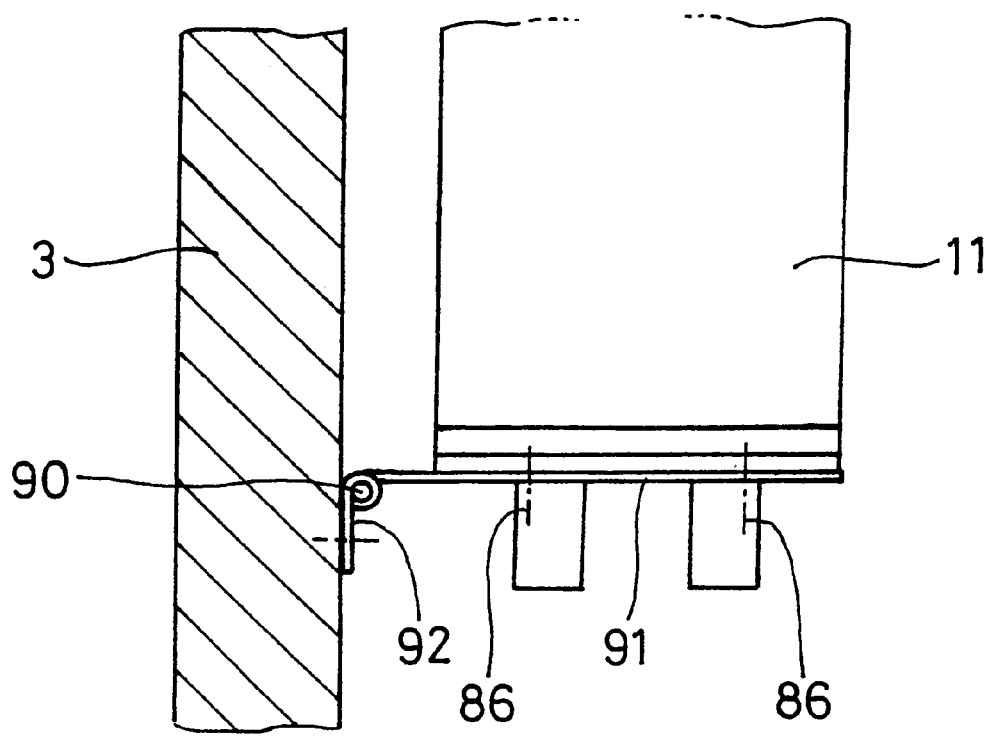
FIG. 19 is a plan view of a bracket used in the ice cream dispenser of an eighth embodiment in accordance with the invention.

FIG. 19 illustrates the eighth embodiment. A hinge 90 includes a large rocking plate 91 and a small rocking plate 92 both of which are asymmetric. The large rocking plate 91 serves as a bracket and is fixed to the bottom of the dispensing cylinder 11 by screws 86 etc. The small rocking plate 92 is fixed to the inside of the heat-insulating door 3.

Figure 20:
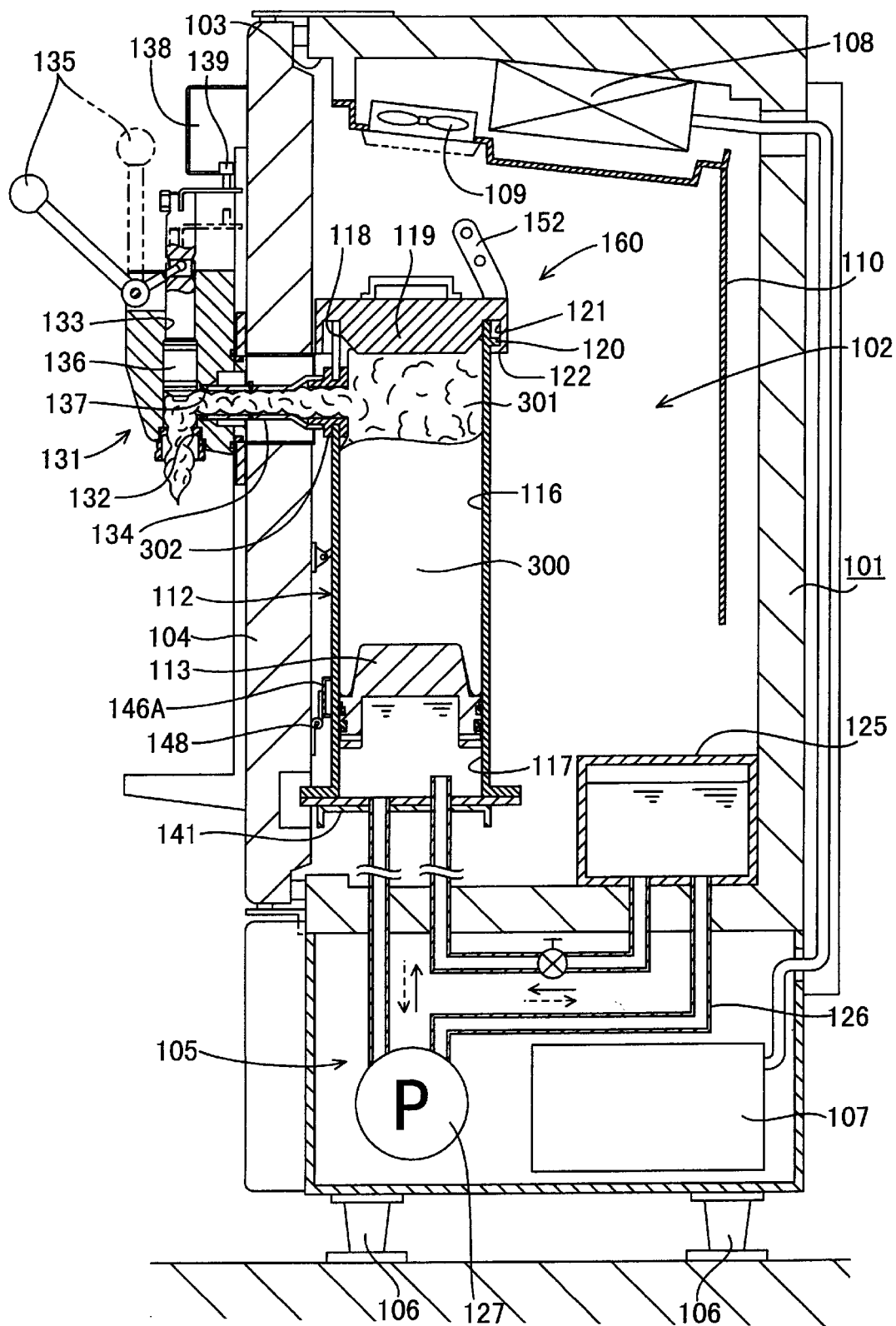
FIG. 20 is a longitudinal sectional side view of the ice cream dispenser of a ninth embodiment in accordance with the present invention.

FIGS. 20 to 25 illustrate a ninth embodiment of the invention. The ninth embodiment differs from the first embodiment in the mounting structure for the dispensing cylinder. Referring to FIG. 20, the interior of the heat-insulating box 101 serves as a freezing chamber 102. The heat-insulating box 101 has a front. opening 103 closed and opened by a heat-insulating door 104 mounted thereon. A machine compartment 105 is provided at the bottom side of the heat-insulating box 101 and supported on legs 106 mounted on respective corners of the underside thereof. An evaporator 108 and an interior fan 109 are provided on a ceiling of the freezing compartment 102. The evaporator 108 constitutes a cooling unit connected to a refrigerator 107. Air in the freezing compartment 102 is drawn in through a duct 110 provided on the rear of the freezing compartment 102 and fed to the evaporator 108 for heat exchange. The air is changed to cold air while passing the evaporator 108, and the cold air is circulated by the fan 109 into the freezing compartment 102. As a result, a temperature in the freezing compartment 102 is maintained at such a value that ice cream 301 can be reserved while being able to be dispensed.

A dispensing cylinder 112 is provided on the backside of the heat-insulating door 104 in the vertical disposition. The dispensing cylinder 112 is formed into the shape of a cylindrical container and has an opening in an upper end thereof. The cylinder 112 has a lower end supported so that the cylinder is inclined by a link mechanism 160, as will be described in detail later. A piston 113 is fitted in the dispensing cylinder 112 so as to be slid therein. An operating fluid is an antifreezing solution. The interior of the dispensing cylinder 112 at an upper side of the piston 113 is defined as a pack accommodating chamber 116. A pressure chamber 117 is defined in the interior of the dispensing cylinder 112 at the underside of the piston 113. The operating fluid is supplied into and discharged from the pressure chamber 117. A wall of the pack accommodating chamber 116 opposed to the heat-insulating door 104 has a notch 118 formed by cutting vertically from the upper edge thereof. A flexible pack 300 filled with ice cream 301 has at one end thereof a frozen dessert discharging cylinder 302. The pack 300 is accommodated in the pack accommodating chamber 116 with the discharging cylinder 302 being fitted in the notch 118.

Figure 23:
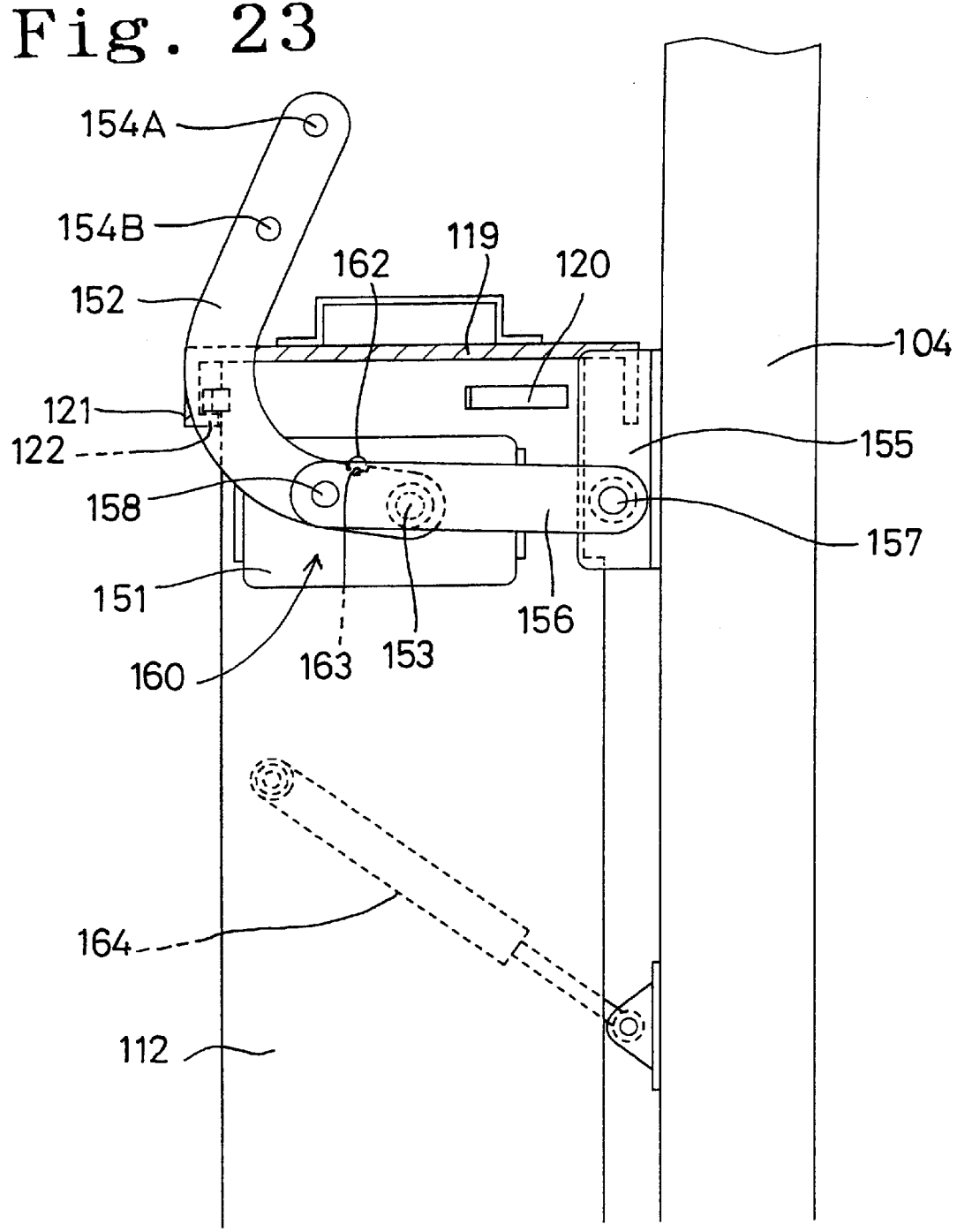
FIG. 23 is a side view of the dispensing cylinder assuming the standing position.

A lid 119 is detachably attached to the dispensing cylinder 112 so as to close the upper end opening 12 of the pack accommodating chamber 116. The dispensing cylinder 112 has a plurality of spaced-apart protrusions 120 on the outer circumference of the upper end thereof as shown in FIG. 23. The lid 119 has a downwardly open cylindrical portion 121 formed on the outer circumference thereof. The cylindrical portion 121 has inwardly extending flanges 122 formed on a lower end thereof so as to correspond to the protrusions 120 respectively. The lid 119 is put onto the upper end of the dispensing cylinder 112 with the flanges 122 being out of engagement with the respective protrusions 120. The lid 119 is then rotated until striking a stopper (not shown), so that the flanges 122 slip under the protrusions 120 respectively. Thus, the lid 119 is attached to the dispensing cylinder 112.

A tank 125 is provided on the rear bottom of the freezing compartment 102 for reserving the operating fluid. A brine passage 126 connects the bottoms of the tank 125 and the dispensing cylinder 112 to each other. A reversible pressure pump 127 is provided in the middle of the brine passage 126 in the machine compartment 105. When the pressure pump 127 is driven forward, the operating fluid in the tank 125 is supplied into the pressure chamber 117 as shown by solid line arrows in FIG. 20. On the other hand, when the pressure pump 127 is driven backward, the operating fluid in the pressure chamber 117 is returned into the tank 125 as shown by broken line arrows in FIG. 20.

A dispensing mechanism 131 is provided on an upper portion of the outer face of the heat-insulating door 104. The dispensing mechanism 131 includes a vertically directed dispensing passage 133 with a dispensing port 132 in its lower end. The dispensing mechanism 131 further includes a connecting pipe 134 communicating with the dispensing passage 133 and protruding to the backside of the heat-insulating door 104 so that an inside protruding end thereof is connected to the discharging cylinder 302 of the pack 300. A valve element 136 is also provided in the dispensing passage 133. The valve element 136 is moved upward and downward when a cock 135 is operated. The valve element 136 constitutes an operating valve opening and closing a communicating port 137 between the dispensing passage 133 and the connecting pipe 134. An operation panel 138 is provided on the outer face of the heat-insulating door 104 so as to be located over the dispensing mechanism 131. The operation panel 138 is provided with a dispensing switch 139 turned on and off in response to an opening operation (shown by solid line in FIG. 20) and a closing operation (shown by two-dot chain line) of the cock 135.

Figure 21:
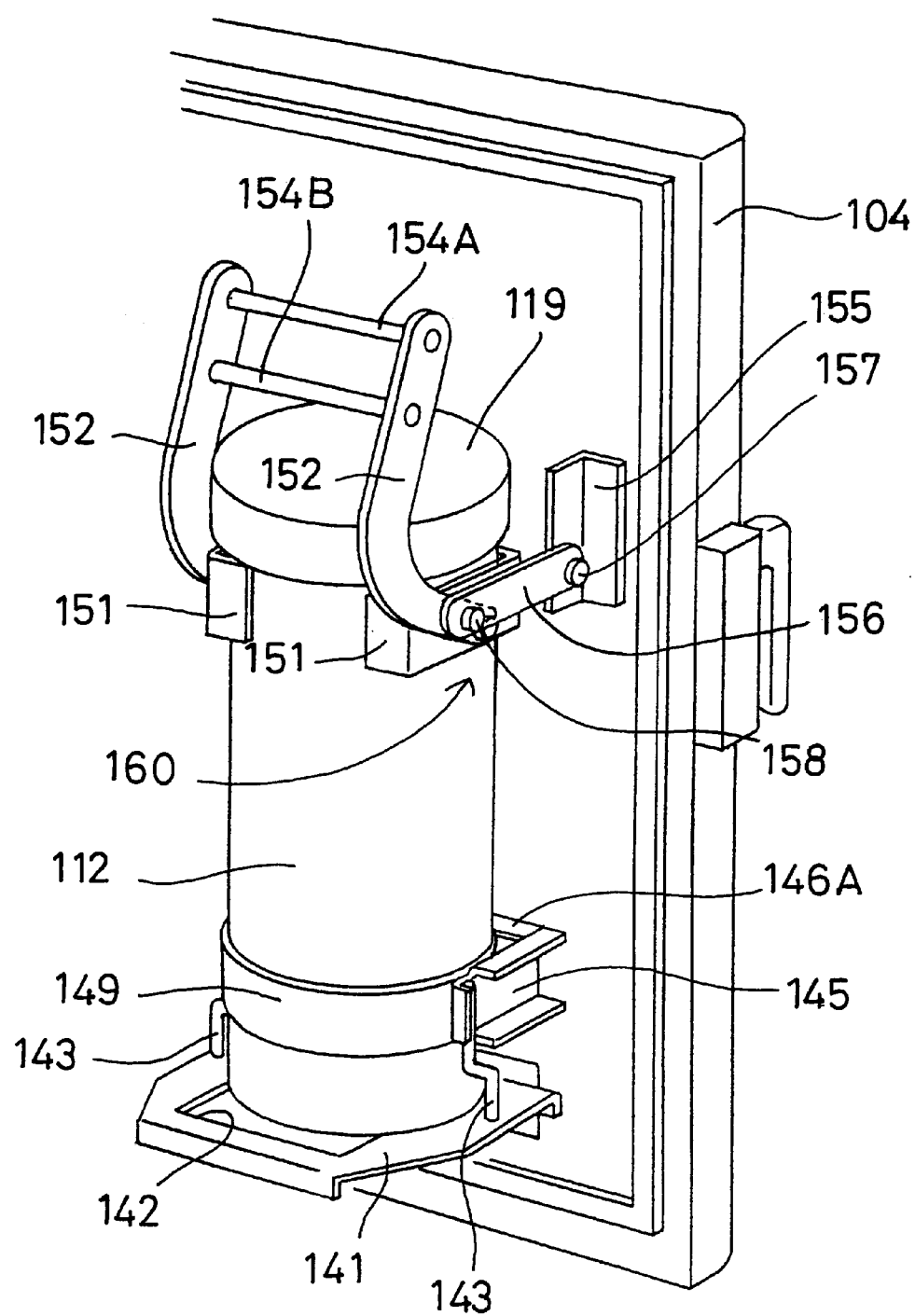
FIG. 21 is a perspective view of the dispensing cylinder mounted on the backside of the heat-insulating door.
Figure 22:
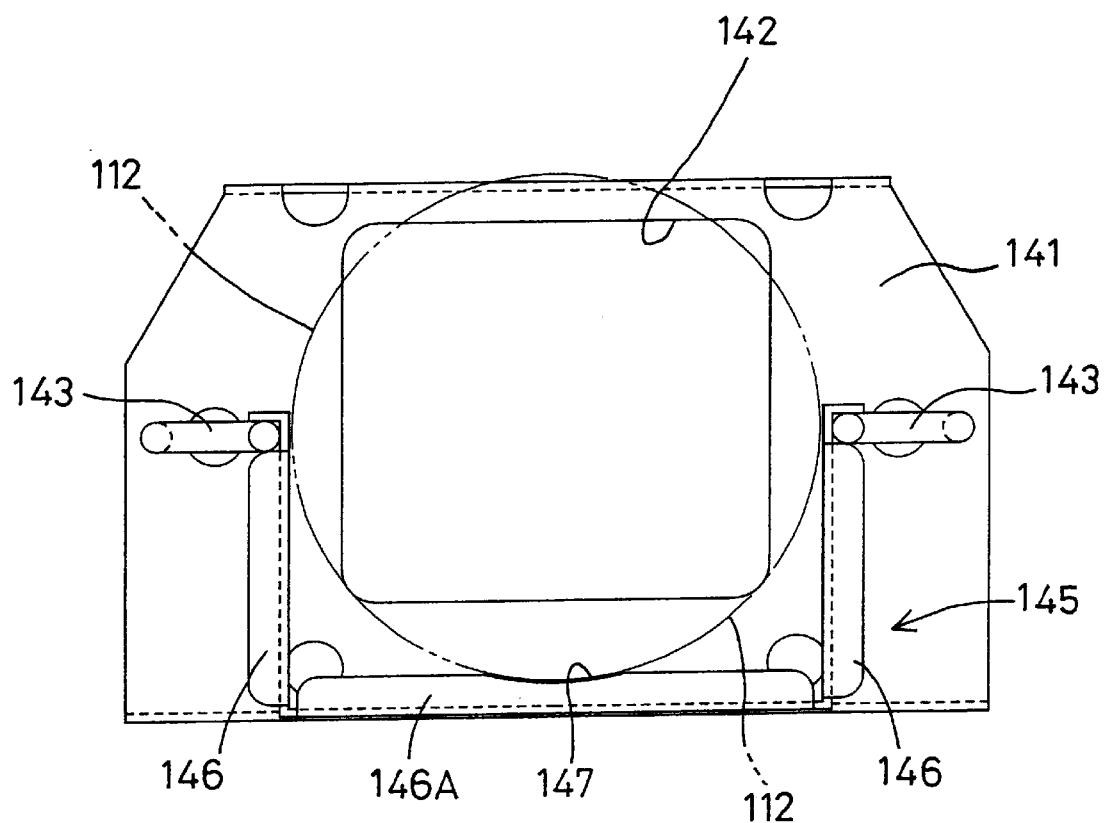
FIG. 22 is a plan view of the bracket.

The structure of a mechanism for supporting the dispensing cylinder 112 will now be described in detail. The lower end of the dispensing cylinder 112 is placed on a bracket 141 to be supported thereon. The bracket 141 has a central opening 142 through which the brine passage 126 etc. extends as shown in FIGS. 21 and 22. A pair of vertical rods 143 stand on portions of the bracket 141 on the right and left of the opening 142. Each vertical rod 143 has at the side of its upper end an inwardly narrowed stepped portion. A generally C-shaped fitting member 145 is attached to the upper ends of the vertical rods 143. A substantially half of the outer circumference of the lower end of the cylinder 112 at the door 104 side can be fitted into the fitting member 145. The fitting member 145 comprises three channel members 146 and 146A. The channel member 146A opposed to the heat-insulating door 104 has an opening directed to the freezing compartment side (upward as viewed in FIG. 22). Each of upper and lower plates of the channel member 146A has a central arc-shaped concave portion 147 conforming to a part of the outer circumference of the dispensing cylinder 112. The channel member 146A of the fitting member 145 is rotatably mounted to a hinge 148 further mounted on the back side of the heat-insulating door 104.

The dispensing cylinder 112 is placed on the bracket 142 with its face with the notch 118 being directed to the door 104 side and fitted in the concave portions 147 of the channel member 146A. A metal belt 149 wound on the cylinder 112 is attached to the fitting member 145, whereupon the cylinder 112 is fixed. Parts of the outer circumferential face of the lower end of the cylinder 112 are fitted in the concave portions 147 respectively such that the cylinder 112 is positioned. Consequently, the distance between the cylinder 112 and the backside of the door 104 can be rendered accurate, and the cylinder 112 can be prevented from shaking right and left. Further, since the fitting member 145 include the channel member 146A, a high supporting strength can be achieved.

Figure 24:
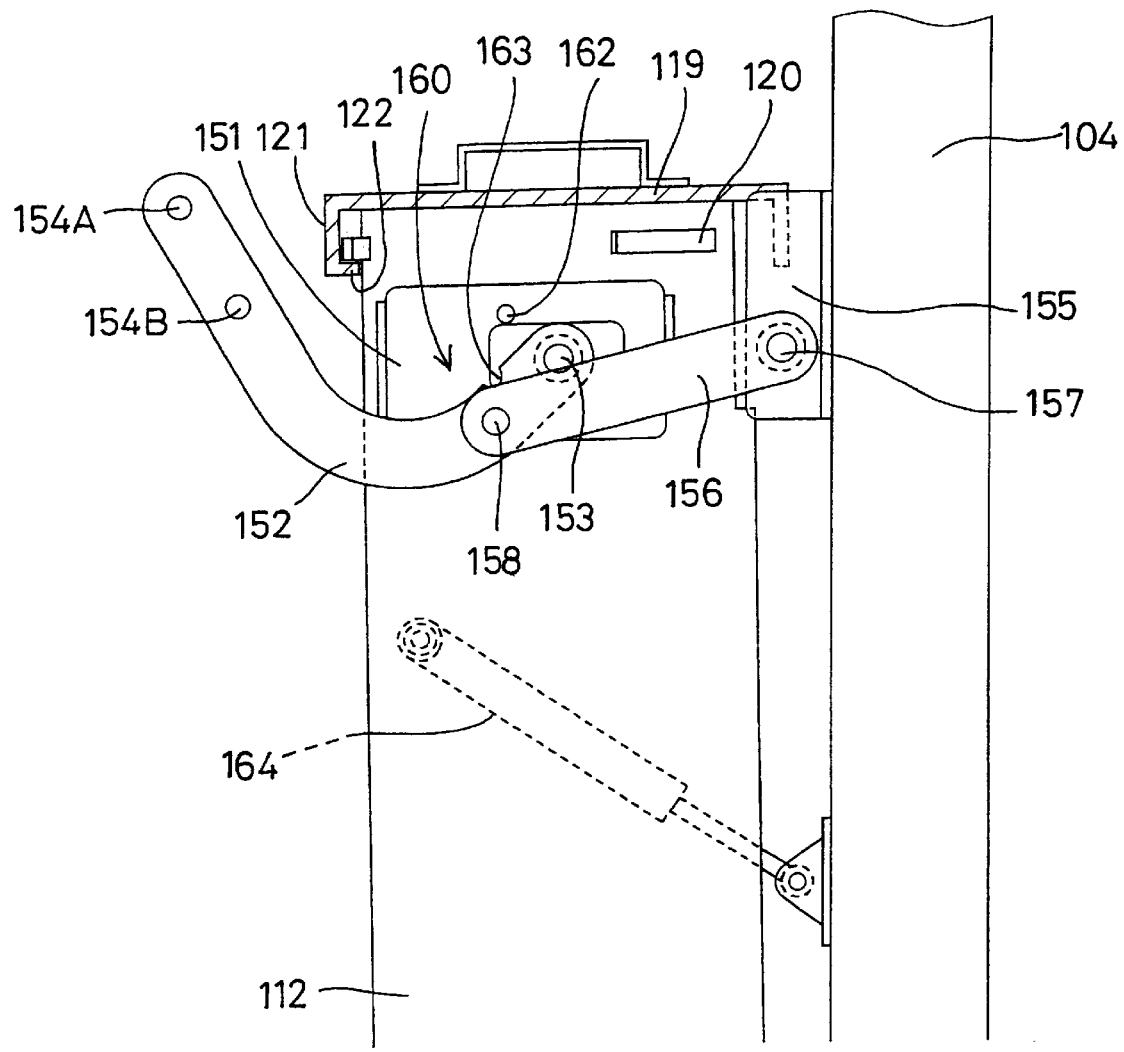
FIG. 24 is a side view of the dispensing cylinder during inclination.

A mechanism for inclining the cylinder 112 will now be described with reference to FIGS. 23 to 25. Two mounting plates 151 are welded to the right-hand and left-hand faces of the upper end of the cylinder 112 respectively. A pair of generally L-shaped operating arms 152 have proximal ends are rotatably mounted on movable shafts 153 further mounted on the mounting plates 151, respectively. Two connecting rods 154A and 154B extend between both operating arms 152 so that the arms are integrated as shown in FIG. 21. The rod 154A extends between the distal ends of the mounting plates 151, whereas the rod 154B extends between portions inwardly away from the distal ends of the operating arms 152 respectively. The connecting rod 154A serves as a door closing limiting section and the connecting rod 154B serves as an abutting section.

A pair of generally L-shaped brackets 155 are mounted on the backside of the heat-insulating door 104. Two straightforward support arms 156 have proximal ends mounted on support shafts 157 further mounted on the brackets 155 respectively, so that each support arm 156 is rotatable. Each support shaft 157 is at the same level as the corresponding movable shaft 153 in a case where the dispensing cylinder 112 assumes the straightforward standing position. The distal end of each support arm 156 is connected to a connecting shaft 158 at a position spaced away from the proximal end of the operating arm 152. The connecting shaft 158 is further mounted on the operating arm 152. A link mechanism 160 for inclining the dispensing cylinder 112 is thus constructed. The dispensing cylinder 112

Figure 25:
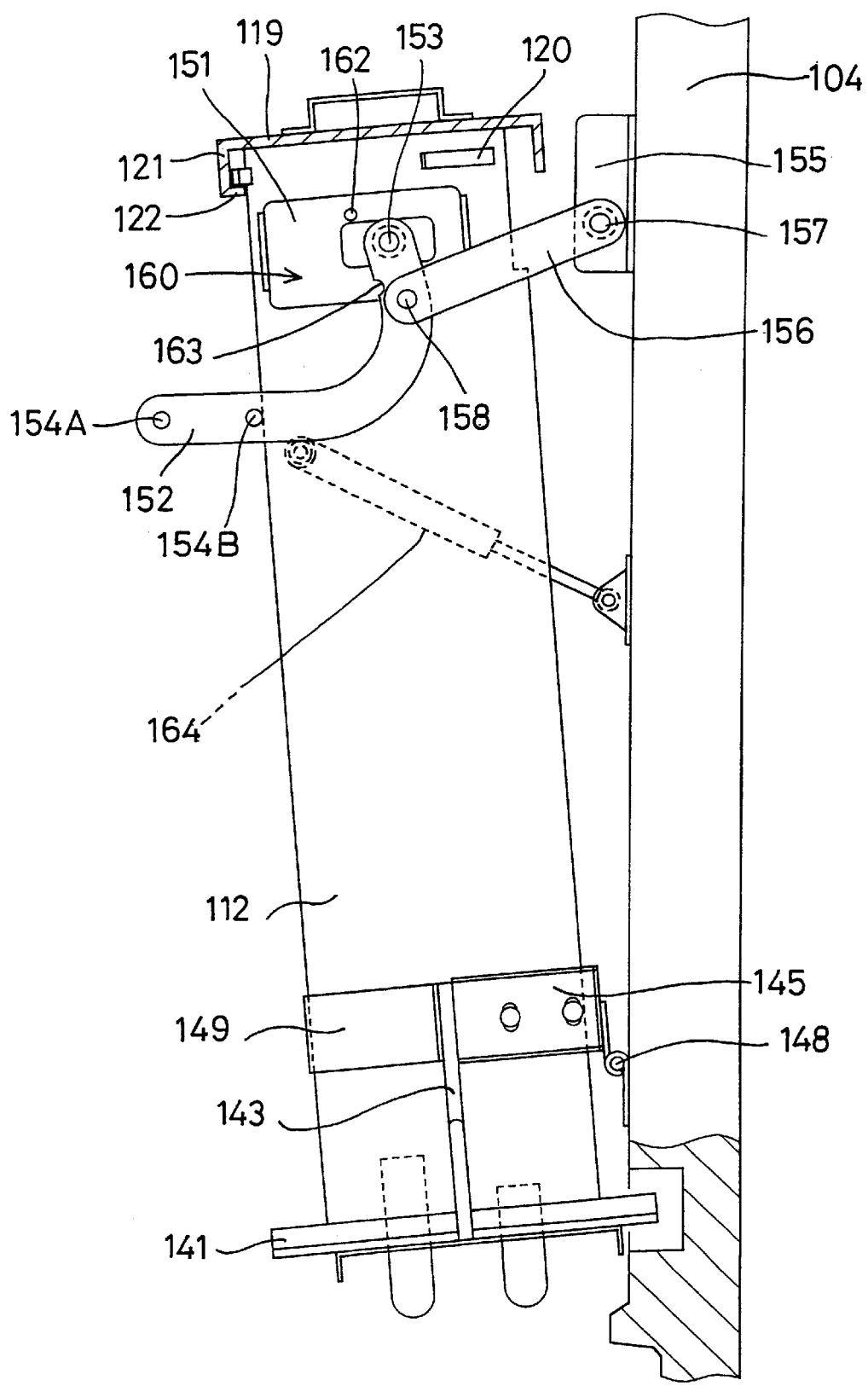
FIG. 25 is a side view of the dispensing cylinder assuming the inclined position.

The dispensing cylinder 112 is inclined about the hinge 148 between a standing position where the cylinder stands along the backside of the door 104 as shown in FIG. 23 and an inclined position where the upper end of the cylinder 112 is spaced away from the door 104 as shown in FIG. 25. When the dispensing cylinder 112 is inclined at the inclined position, the distal end of each support arm 156 is directed obliquely downward, and the distal end side of each operating arm 152 projects substantially horizontally toward the backside of the door 104. At this time, the rear face of the upper end of the cylinder 112 abuts the inside connecting rod 154B extending between the operating arms 152.

On the other hand, when the cylinder 112 stands at the standing position, each support arm 156 is directed slightly obliquely upward, and the distal end side of each operating arm 152 rises up over the lid 119 so as not to project toward the rear face of the cylinder 112. Further, two limiting pins 162 stands on the mounting plates 151 of the cylinder 112 obliquely in the rear of the movable shafts 153 over the shafts respectively. Each operating arm 152 has a generally semicircular notch 163 formed in the upper face of the proximal end side thereof. The limiting pins 162 are fitted into the notches 163 respectively. As shown in FIG. 23, when the cylinder 112 assumes the standing position, the notches 163 of the operating arms 152 abut the limiting pins 162 respectively. A damper stay 164 connects the cylinder 112 and the backside of the door 104 to each other.

The operation of the ice cream dispenser will be described. The cylinder 112 is held at the standing position during operation of the dispenser as shown in FIGS. 20 and 23. The discharging cylinder 302 of the pack 300 accommodated in the pack accommodating chamber 116 is fitted into the inwardly projecting end of the connecting pipe 134 communicating with the dispensing mechanism 131 to thereby be connected thereto as shown in FIG. 20.

In order that the ice cream 301 may be dispensed, a vessel (not shown) is placed below the dispensing port 132. When the cock 135 is opened, the communicating port 137 is opened and the dispensing switch 139 is turned on so that the pressure pump 127 is driven forward so that the operating fluid in the tank 125 is supplied into the pressure chamber 117 of the cylinder 112 and pressurized. As a result, when the piston113 is moved upward to compress the pack 300, the ice cream 301 is dispensed through the discharging cylinder 302 of the pack 300. The ice cream 301 is then dispensed through the connecting pipe 134, the lower end of the dispensing passage 133 and the dispensing port 132 into the vessel. When a suitable amount of ice cream has been dispensed, the cock 135 is closed so that the dispensing switch 139 is turned off to deenergize the pressure pump 127. Further, the communicating port 137 and the dispensing port 132 are closed so that the dispensing is stopped. The above-described operation is repeated so that the ice cream 301 is sequentially dispensed.

The pack 300 is replaced by a new one when the ice cream 301 in the pack 300 has been used up. In this case, when a pack replacing switch (not shown) provided on the operation panel 138 is turned on, the pressure pump 127 is driven in the reverse direction so that the operating fluid in the pressure chamber 117 of the cylinder 112 is drawn in to return into the tank 125. As a result, since the interior of the pressure chamber 117 is turned to the negative pressure state, the piston 113 is moved downward and the pack accommodating chamber 116 is spread. The reversing of the pressure pump 127 is stopped when the piston 113 reaches the lower end position.

With this, when the heat-insulating door 104 is opened, the dispensing cylinder 112 is taken out of the freezing chamber. When the operator grips the distal end of the operation arm 152 with his or her hand in the state as shown in FIG. 23 to rotate the arm 152 counterclockwise, the dispensing cylinder 112 is inclined with the support arm 156 being rotated counterclockwise as shown in FIG. 24. The discharging cylinder 302 of the pack 300 is pulled out from the connecting pipe 134. Thereafter, the dispensing cylinder 112 is inclined by the self-weight toward the inclined position. In this case, the cylinder 112 is slowly inclined by the damper stay 164. When inclined a predetermined angle, the cylinder 112 abuts the inside connecting rods 154B of the respective operating arms 152, thereby being held at the inclined position as shown in FIG. 25. The lid 119 is then detached from the cylinder 112 and the used pack 300 is taken out. A new pack 300 is accommodated in the pack accommodating chamber 116 and the lid 119 is attached to the cylinder 112.

When the lid 119 has been attached to the cylinder 112, the operator grips the distal end of the operation arm 152 with his or her hand in the state as shown in FIG. 25 to rotate the arm 152 clockwise. The dispensing cylinder 112 is raised up with the support arm 156 being rotated clockwise. When the cylinder 112 is raised into the state as shown in FIG. 24, the discharging cylinder 302 of the pack 300 faces the inwardly projecting end of the connecting pipe 134. The operating arms 152 are rotated with a slightly larger force so that the discharging cylinder 302 is fitted into the connecting pipe 134. When the cylinder 112 is further raised to assume the standing position as shown in FIG. 23, the limiting pins 162 fit into and abut the notches 163 of the operating arms 152 respectively. Consequently, the operating arms 152 are prevented from being excessively rotated. The cylinder 112 is held at the standing position with the discharging cylinder 302 of the pack 300 being fit in the connecting pipe 134 as shown in FIG. 20. Then, when the door 104 is closed, the cylinder 112 is accommodated in the freezing compartment 102, so that the ice cream 301 can be dispensed.

According to the ninth embodiment, the dispensing cylinder 112 is held by the link mechanism 160 at the backside of the heat-insulating door 104. Consequently, when the cylinder 112 is inclined at the time of replacement of the pack 300 etc., the operator puts his or her hand on either operating arm 152 so that the cylinder 112 is inclined. Thus, the cylinder 112 can easily be inclined.

Further, the cylinder 112 can reliably be held at the inclined position since the connecting rod 154B extending between the operating arms 152 receives the cylinder 112. Further, the operating arms 152 collide against the respective limiting pins 162 when the cylinder 112 is raised up to assume the standing position. As a result, since further rotation of the operating arms 112 can be prevented, the cylinder 112 can be prevented from being raised excessively over the standing position.

Figure 26:
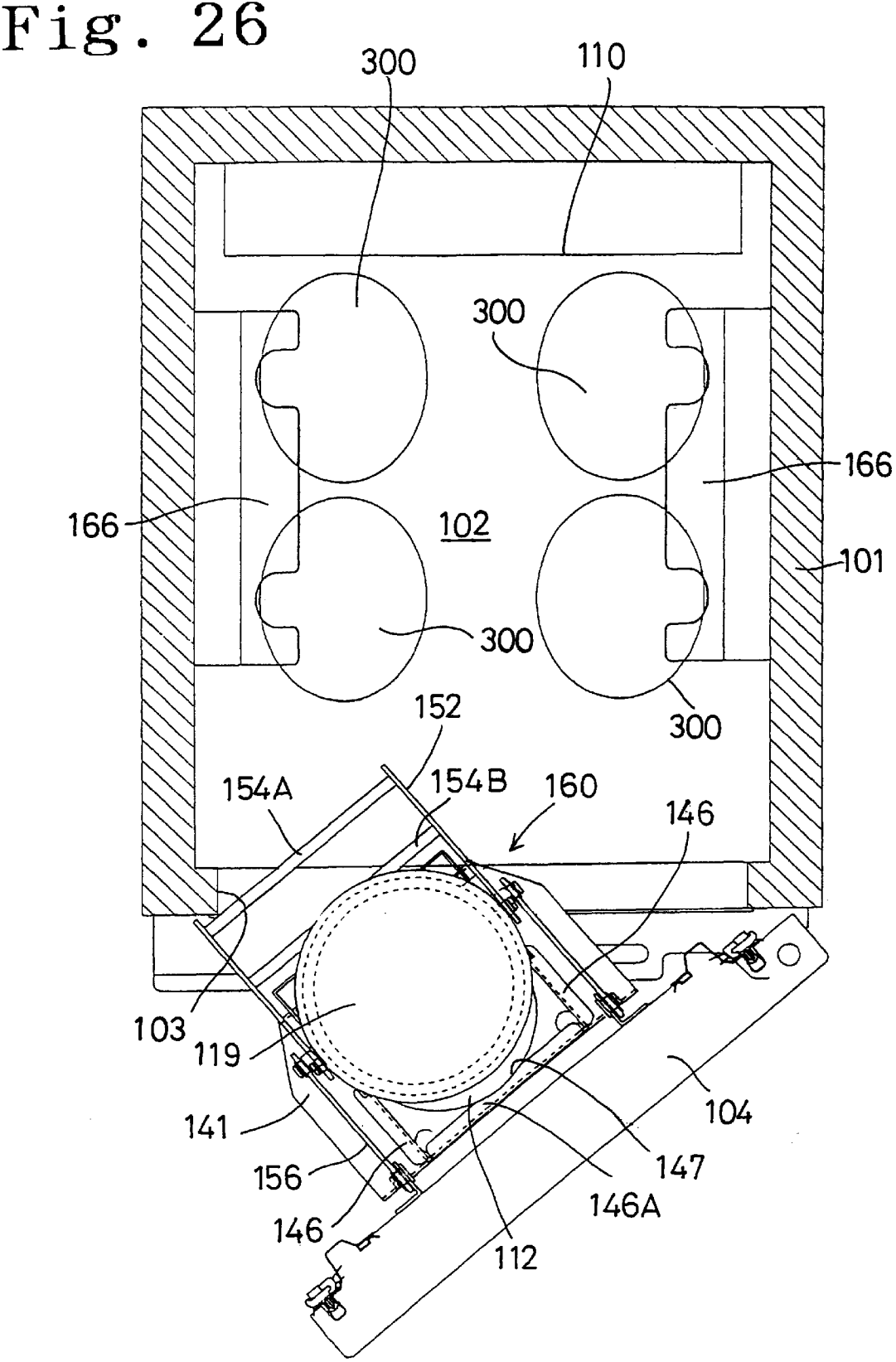
FIG. 26 is a sectional plan view of the dispenser, showing the state where the heat-insulating door cannot be closed.

In some types of ice cream dispensers, a spare pack 300 can be hung on a support plate 166 by utilizing a rear space in the freezing compartment 102 as shown in FIG. 26. In this construction, when the door 104 is closed with the cylinder 112 being left at the inclined position after the replacement of the pack 300 or the like, the cylinder 112 may strike the spare pack 300 to thereby break it.

In the above-described embodiment, however, the distal end side of each operating arm 152 is horizontal and projects to the backside of the door 104 when the cylinder 112 assumes the inclined position. Accordingly, when the door 104 is closed with the cylinder 112 being left at the inclined position, the connecting rod 154A at the distal end side of each projecting operating arm 152 strikes the open edge of front opening 103 of the freezer 2, whereupon the door 104 cannot be closed. Consequently, the spare pack 300 can be prevented from being damaged by the cylinder 112.

The lid 119 of the pack accommodating chamber 116 is fitted with the upper end of the cylinder 112 from above and then rotated to be attached to the cylinder. The inside of the lid 119 is subjected to a high pressure during the dispensing operation or the like. Accordingly, when the lid 119 is not completely rotated such that it does not assume the normal position, the lid 119 would be detached due to the pressure in the cylinder 112 if the engagement by the protrusions 120 should be insufficient.

Figure 27:
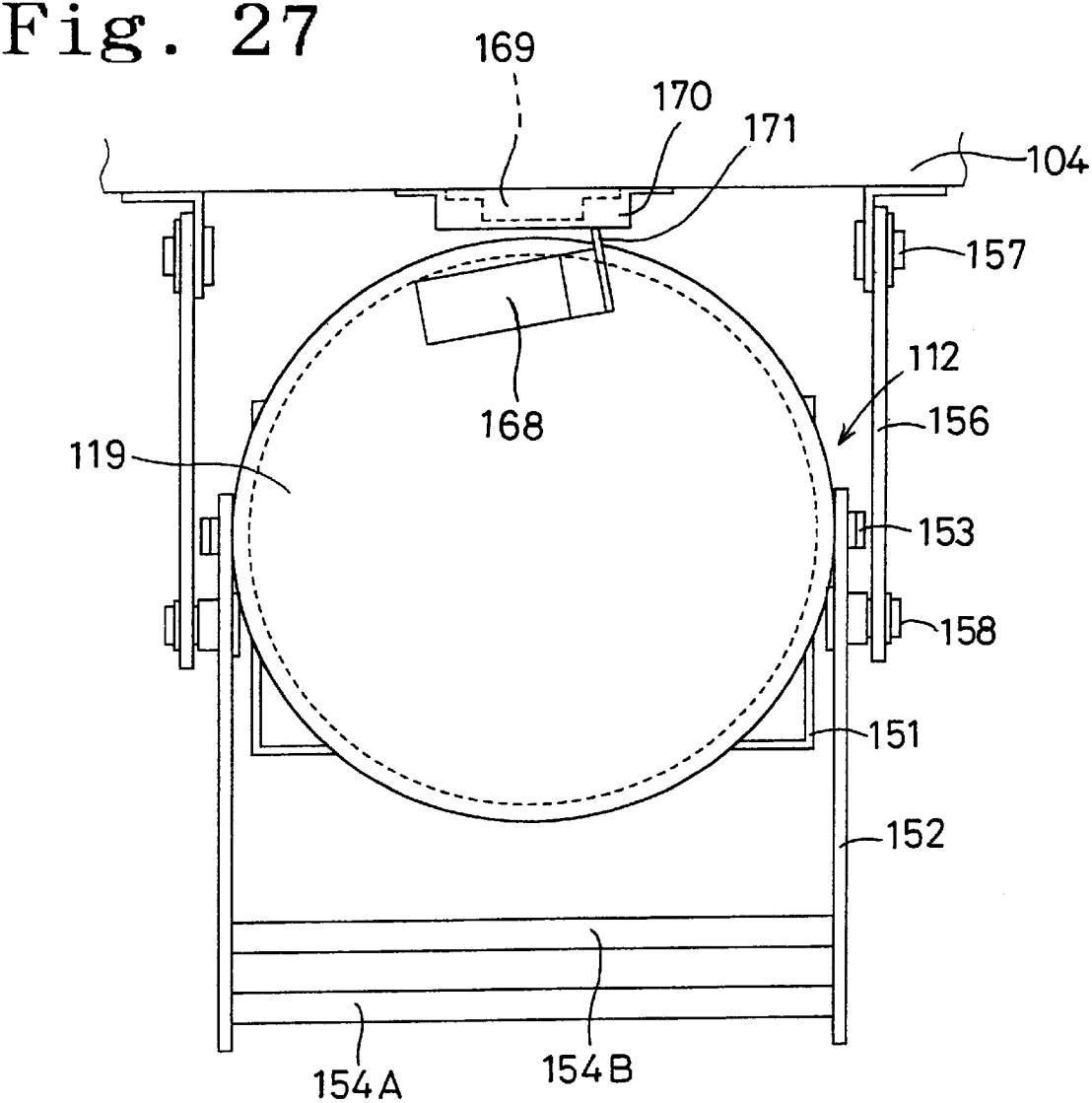
FIG. 27 is a plan view of the dispensing cylinder in the state where it cannot rise up.
Figure 28:
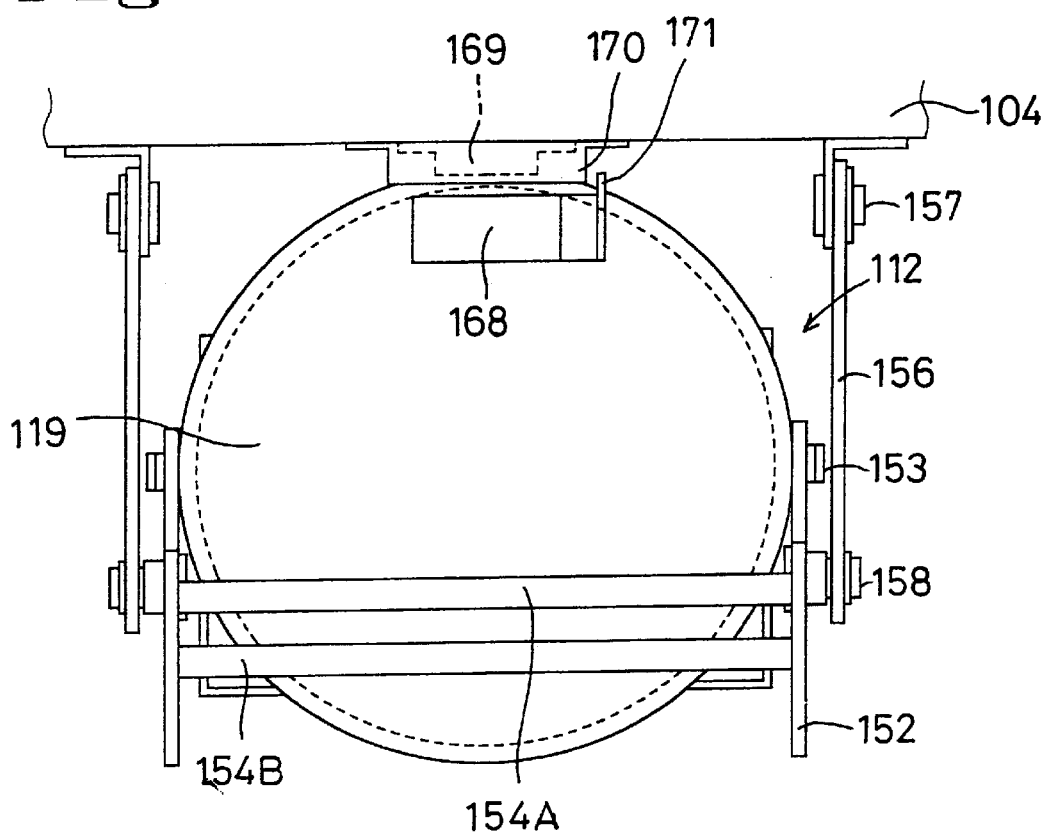
FIG. 28 is a plan view of the dispensing cylinder assuming the standing position.

In view of the above-described problem, a magnet 168 is mounted to the circumferential end of the upper face of the lid 119 as shown in FIGS. 27 and 28. A casing 170 enclosing a reed switch 169 is mounted on the backside of the door 104. When the cylinder 112 is raised with the lid 119 attached thereto, whether the reed switch 169 responses to the magnet 168 is detected, whereby whether the lid 119 assumes the normal closing position is detected. In this detecting means, however, in a case where the lid 119 has been incompletely rotated such that it does not assume the normal closing position, the reed switch 169 sometimes responses to the magnet 168 depending upon its sensitivity even when the magnet is displaced from the reed switch to a certain extent. This results in an error detection.

In the above-described embodiment, however, a limiting protrusion 171 is provided at one side edge of magnet 169 so as to protrude toward the door 104 side. When the cylinder 112 is raised with the lid 119 not assuming the normal closing position, the limiting protrusion 171 abuts the casing 170 of the reed switch 169 such that the rising of the cylinder 112 is limited, as shown in FIG. 27. On the other hand, when the lid 119 assumes the normal closing position, the limiting protrusion 171 moves forward outside one side of the casing 170. As a result, the cylinder 112 is allowed to be raised to the standing position and the magnet 168 is normally opposed to the reed switch 169. Thus, in the embodiment, whether the lid 119 has normally been attached to the cylinder 112 can be determined by the determination as to whether the cylinder 112 can be raised.

Figure 29:
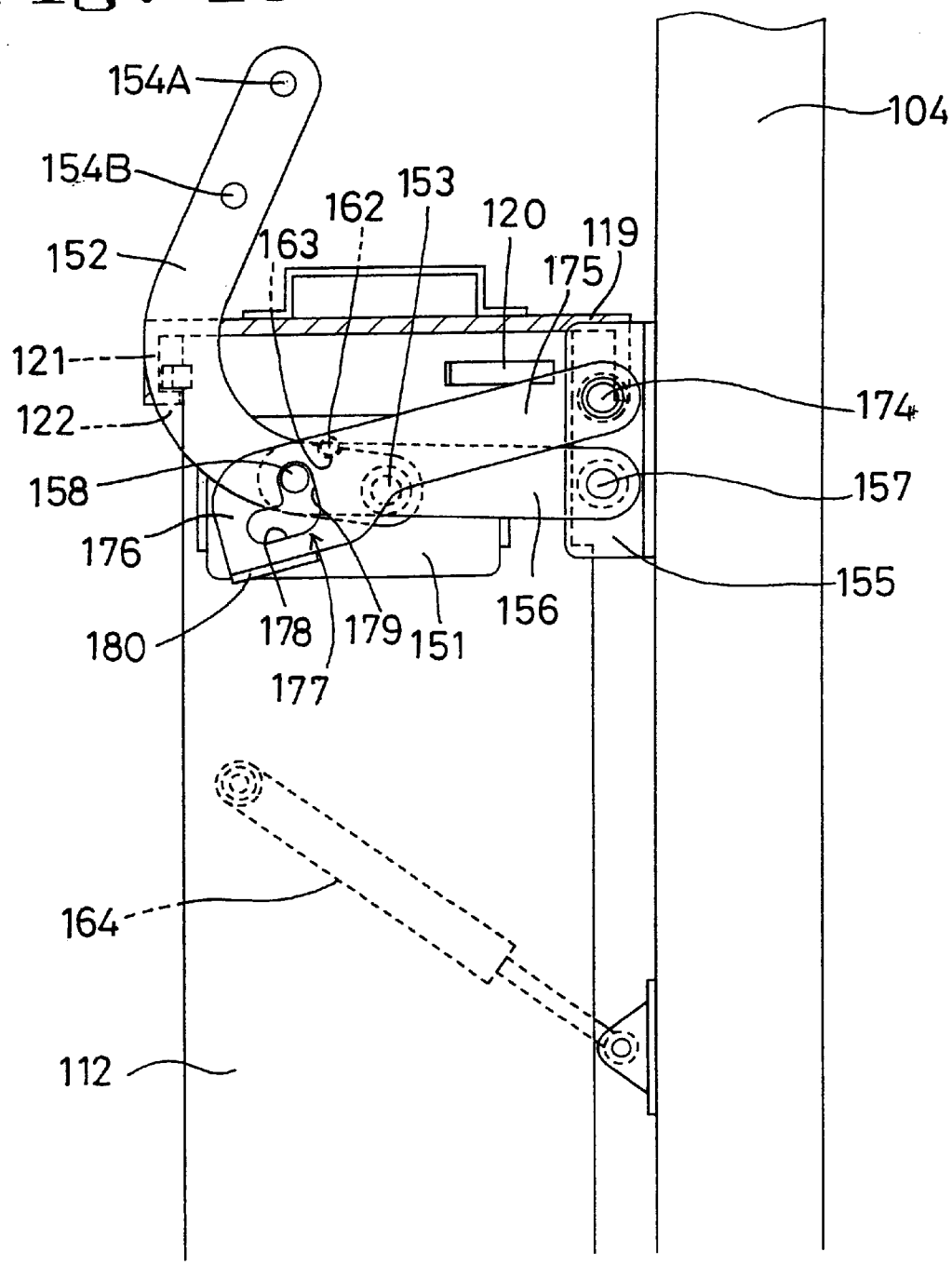
FIG. 29 is a side view of a link mechanism used in the ice cream dispenser of a tenth embodiment in accordance with the invention, showing the state where the dispensing cylinder assumes the standing position.
Figure 30:
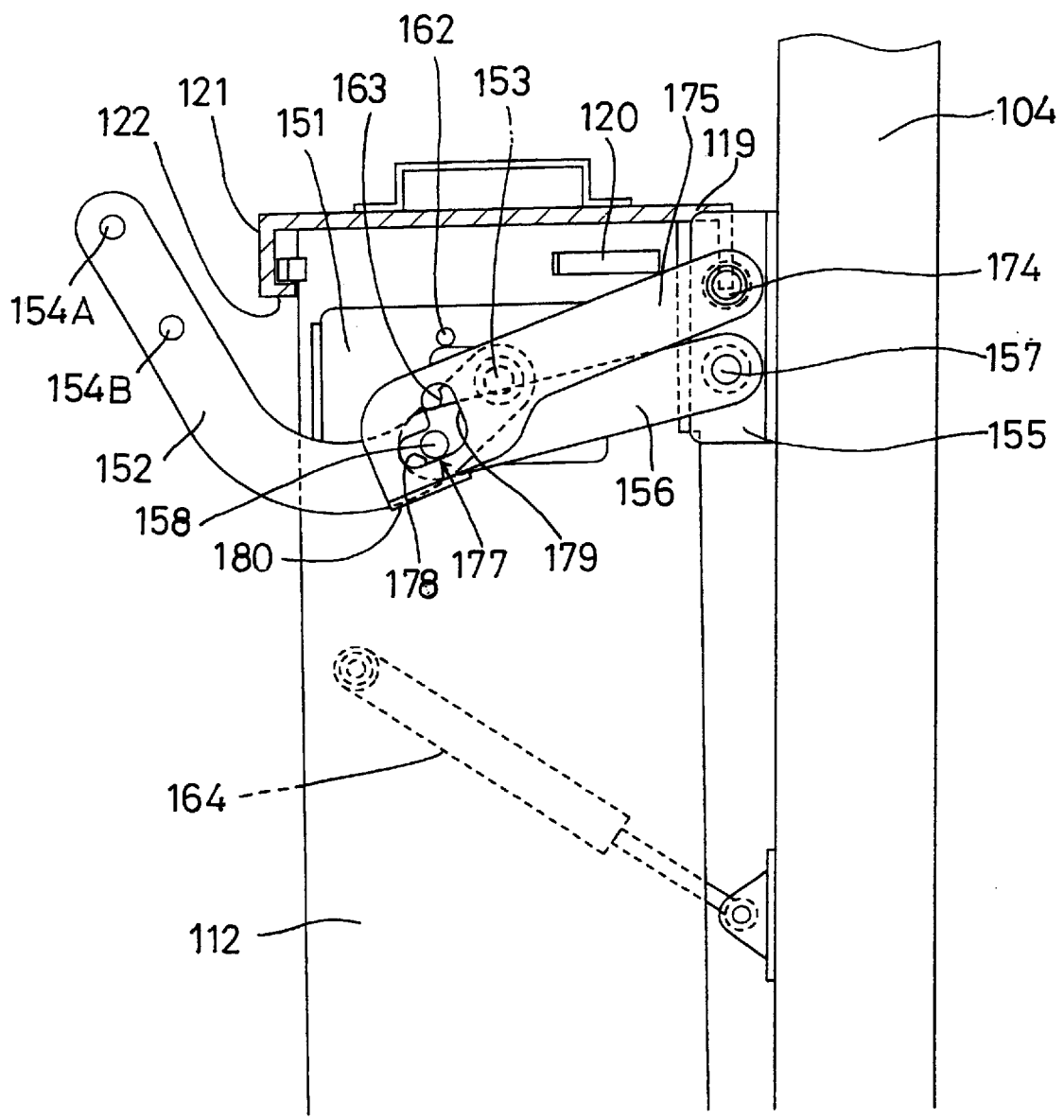
FIG. 30 is a side view of the dispensing cylinder during inclination.

FIGS. 29 and 30 illustrate a tenth embodiment. Differences between the ninth and tenth embodiments will be described. The identical or similar parts are labeled by the same reference symbols as in the ninth embodiment and accordingly, the description of these parts is eliminated. A locking arm 175 is mounted on one of the brackets 155 supporting the respective support arms mounted on the backside of the heat-insulating door 104. A proximal end of the locking arm 175 is rotatably mounted on a support shaft 174 located over the support shaft 157 of the support arm 156. The locking arm 175 includes at the distal end side an increased width portion 176 whose width is downwardly increased. The increased width portion 176 has a generally L-shaped slit 177 into which the connecting shaft 158 connecting the operating arm 152 and the support arm 156 is fitted. The L-shaped slit 177 includes a horizontal groove serving as an escape groove 178 and a vertical groove extending perpendicularly to a rear end of the escape groove 178 and serving as latch groove 179.

Figure 31:
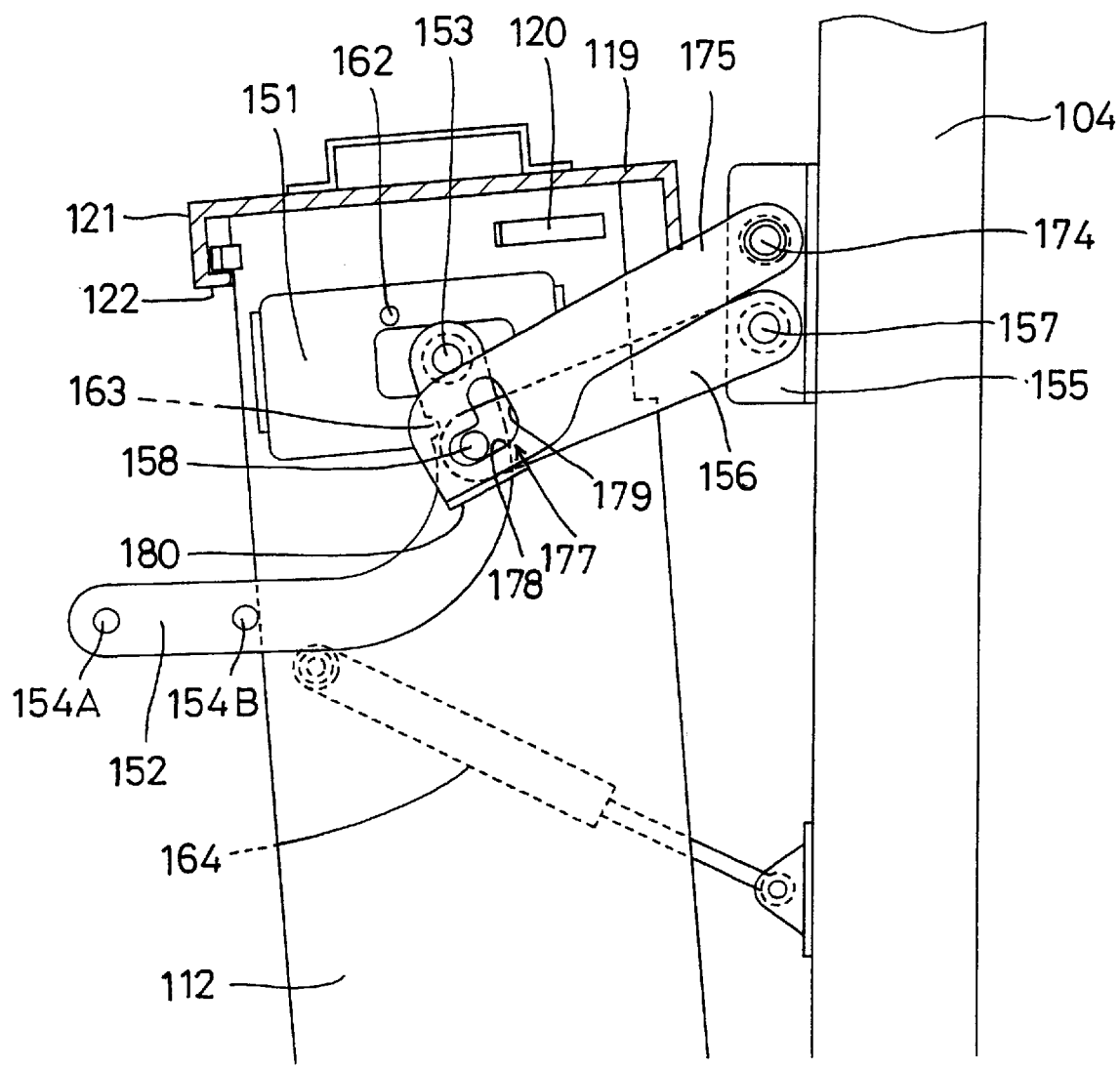
FIG. 31 is a side view of the dispensing cylinder assuming the inclined position.

When the cylinder 112 assumes the inclined position as shown in FIG. 31, the locking arm 175 is directed obliquely downward and the connecting shaft 158 is fitted in the distal end side of the escape groove 178. When the cylinder 112 is raised to assume the standing position as shown in FIG. 29, the locking arm 175 is slightly raised so that the connecting shaft 158 moves to the rear end of the escape groove 178. The locking arm 175 has an operation piece 180 projecting downward from the underside of the distal end thereof.

The dispensing cylinder 112 is gradually raised as shown in FIG. 30 when the operating arm 152 is rotated clockwise with the cylinder 112 assuming the inclined position as shown in FIG. 31. In this while, the locking arm 175 is slowly raised so that the connecting shaft 158 slides to the rear of the escape groove 178. When the cylinder 112 is raised to the standing position as shown in FIG. 29, the locking arm 175 is further raised so that the connecting shaft 158 moves to the rear end of the escape groove 178. Accordingly, the self-weight rotates the locking arm 175 downward so that the connecting shaft 158 enters the latch groove 179. As a result, the operating arm 152 is locked to be disallowed to be rotated in the direction in which the cylinder 112 is inclined (counterclockwise in FIG. 29). The cylinder 112 is subjected to a counter-force inclining it for example, during the dispensing of the ice cream 301. However, since the operating arm 152 is locked, the inclination of the cylinder 112 is prevented. Accordingly, the discharging cylinder 302 of the pack 300 can be prevented from being loosened or pulled out.

When the cylinder 112 is inclined, fingers are put on the operation piece 180 in the state as shown in FIG. 29 so that the distal end of the locking arm 175 is raised. When the connecting shaft 158 is moved to the lower end of the latch groove 179 or the inner end of the escape groove 178, the operating arm 152 is released from the locked state. Then, when the operating arm 152 is rotated counterclockwise, the connecting shaft 158 is slid to the distal end side in the escape groove 178 so that the cylinder 112 is inclined.

Figure 32:
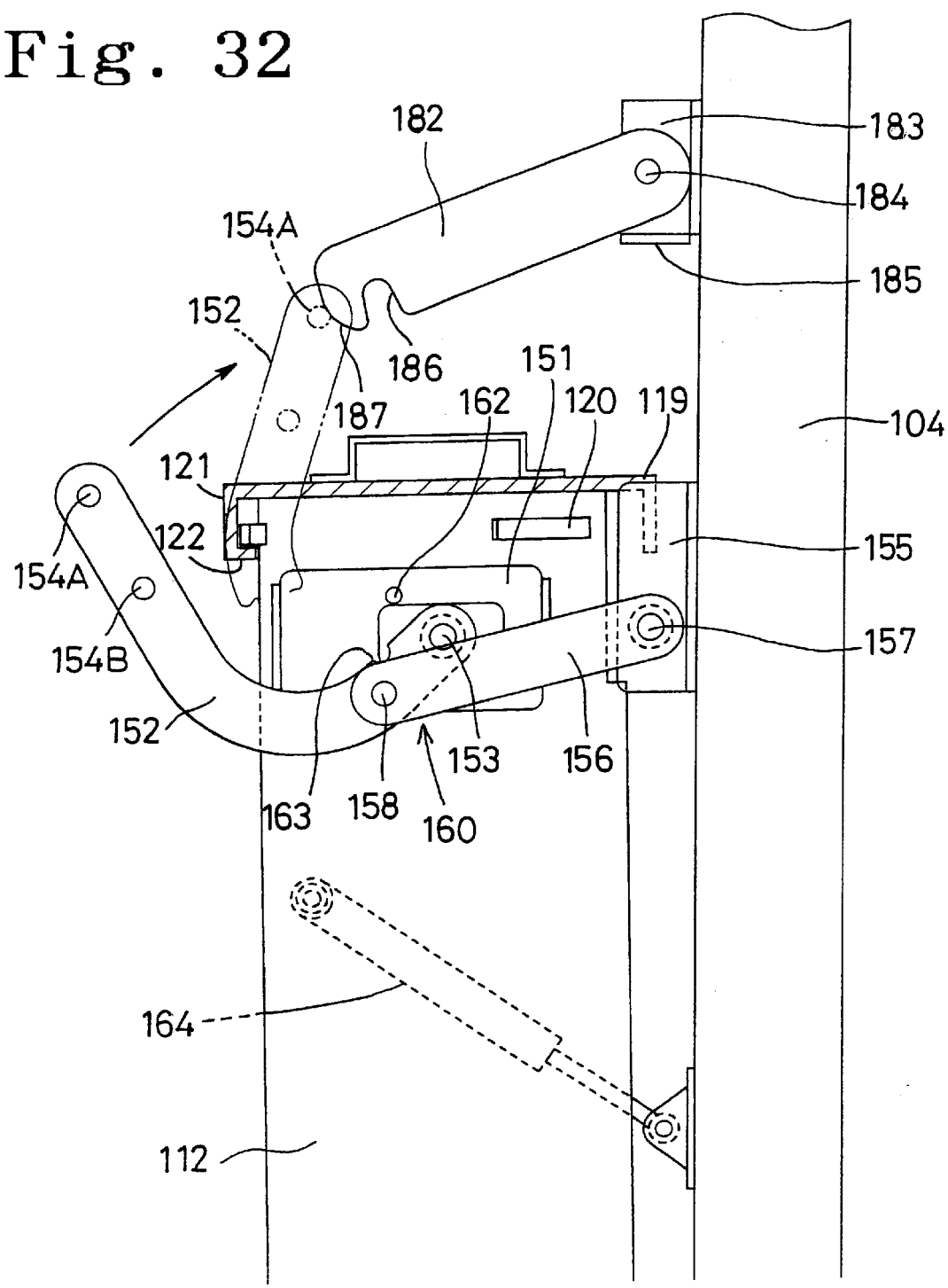
FIG. 32 is a side view of a link mechanism used in the ice cream dispenser of an eleventh embodiment in accordance with the invention, showing the state where the dispensing cylinder is rising up.
Figure 33:
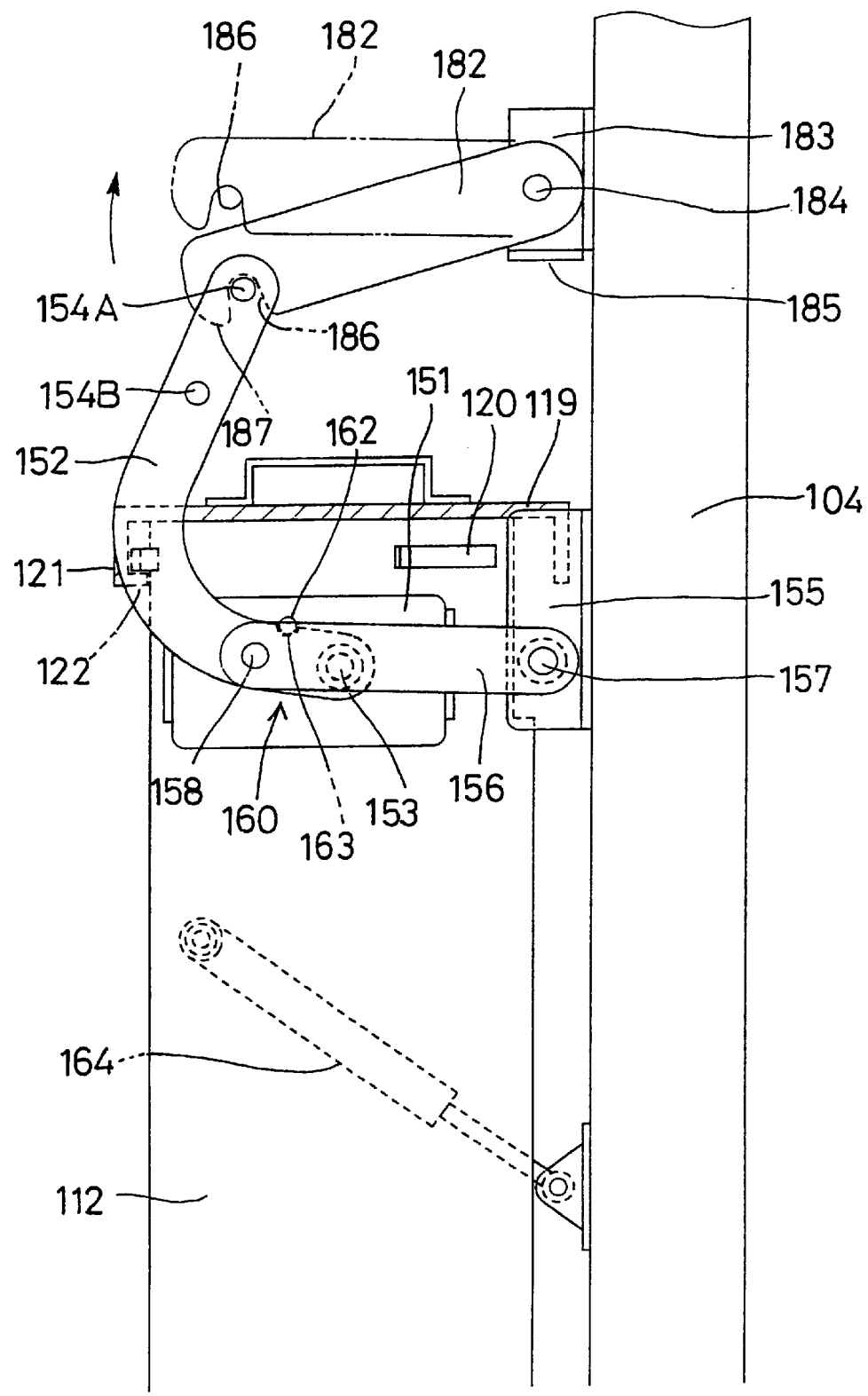
FIG. 33 is a side view of the dispensing cylinder assuming the standing position.
Figure 34:
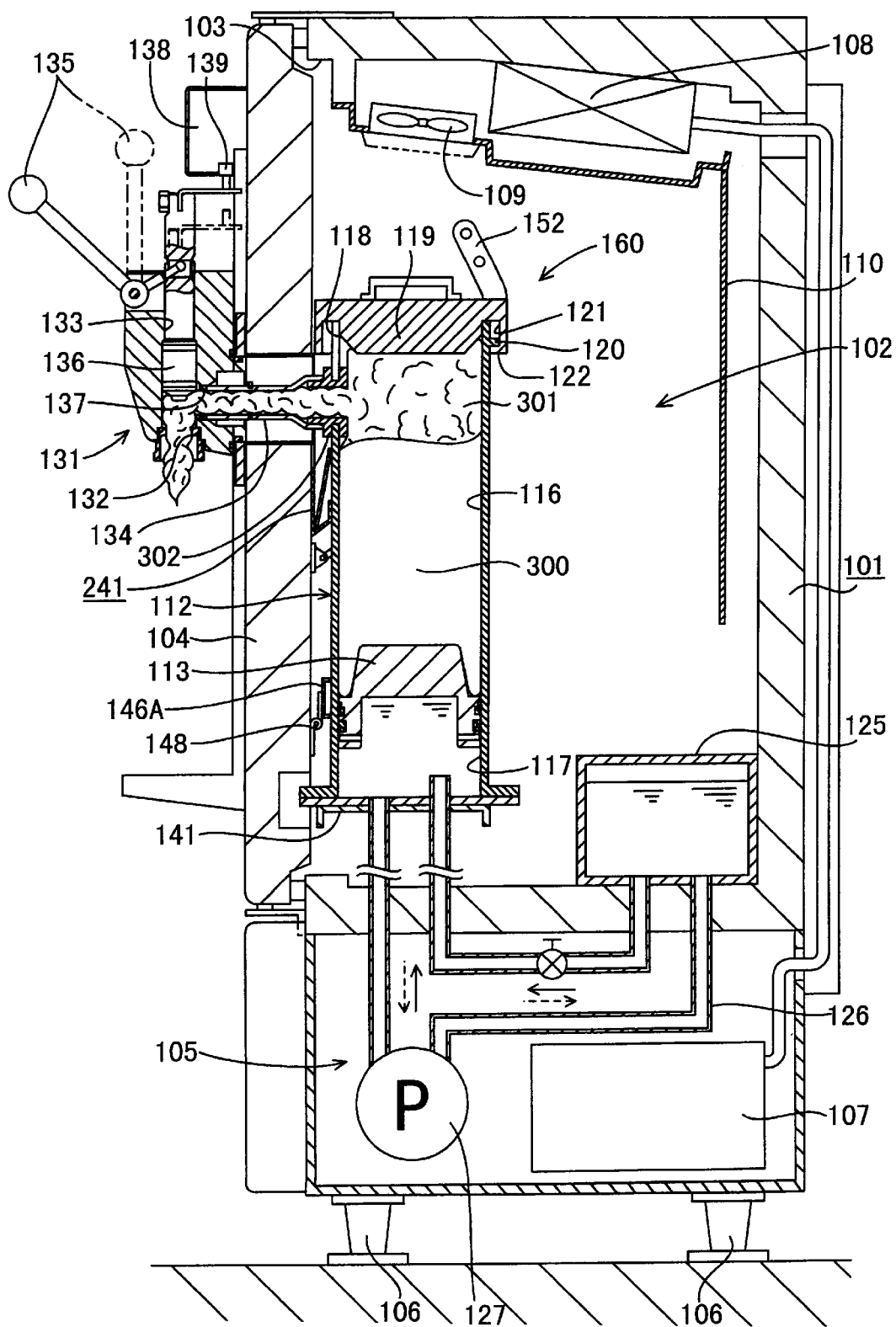
FIG. 34 is a longitudinal side section of the ice cream dispenser of a twelfth embodiment in accordance with the invention.
Figure 35:
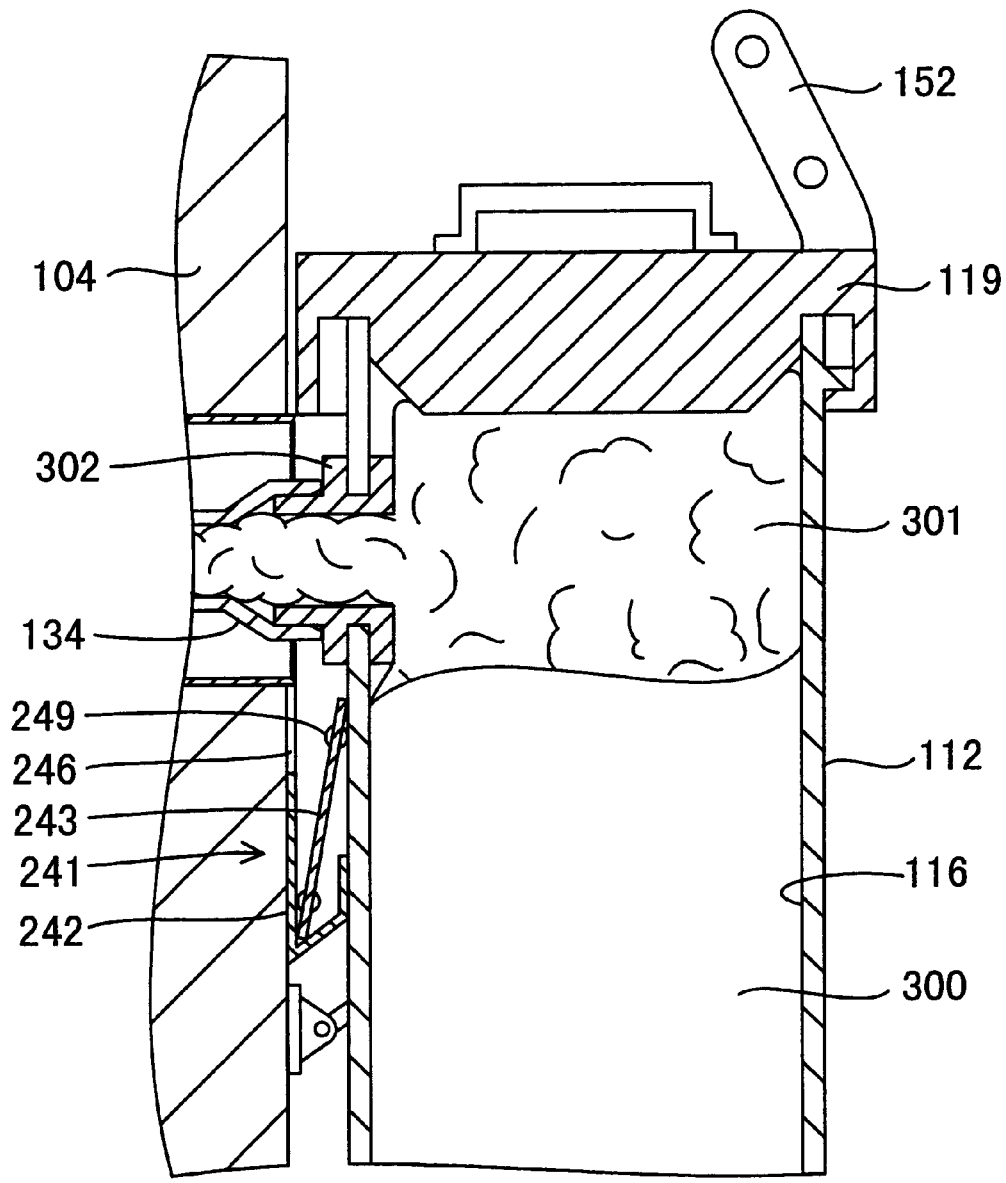
FIG. 35 is an enlarged sectional view of the dispensing cylinder and a connecting pipe connected to the dispensing cylinder.

FIGS. 32 and 33 illustrate an eleventh embodiment. The eleventh embodiment is directed to a modification of the structure for mounting a stopper arm 182. A bracket 183 is mounted on the backside of the door 104 to be located over the cylinder 112. The bracket 183 is further positioned to correspond to an intermediate position between the operating arms 152. The proximal end of the stopper arm 182 is rotatably mounted on a support shaft 184 further mounted on the bracket 183. A bottom plate 185 of the bracket 183 limits the downward rotation. The distal end side of the stopper arm 182 is usually inclined downward. The distal end of the stopper arm 182 is located in an area of rotation of the connecting rod 154A connecting both operating arms 152. The stopper arm 182 has a vertical latch groove 186 formed in the lower distal end and an arc-shaped guide face 187 formed in the lower portion in front of the latch groove 186.

When the operating arm 152 is raised so that the cylinder 112 is raised as shown in FIG. 32, the connecting rod 154A strikes the guide face 187 of the stopper arm 182 immediately before the cylinder 112 reaches the standing position, as shown by chain line in FIG. 32. As a result, the connecting rod 154A raises the stopper arm 182. When the cylinder 112 reaches the standing position as shown in FIG. 33, the self-weight rotates the stopper arm 182 downward and the connecting rod 154A enters the latch groove 186. Consequently, the operating arm 152 is locked to be disallowed to be rotated in the direction in which the cylinder 112 is inclined.

When the cylinder 112 is to be inclined, a finger is put on the middle lower end of the stopper arm 182 so that the distal end side of the stopper arm is raised as shown by chain line in FIG. 33. As a result, connecting arm 154A is disengaged from the latch groove 186 such that the operating arm 152 is released from the locked state. The operating arm 152 is then rotated counterclockwise.

Figure 36:
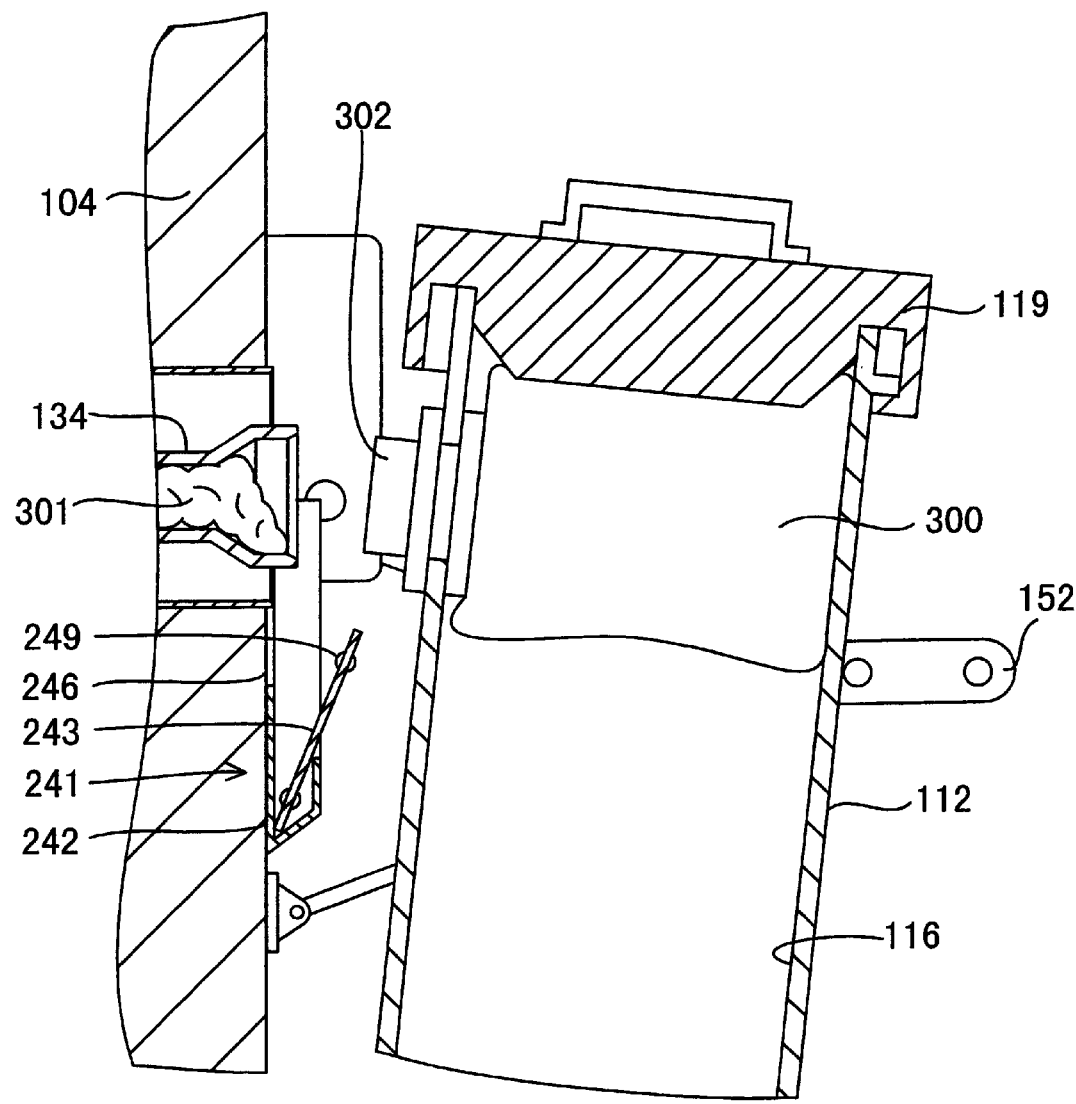
FIG. 36 is an enlarged sectional view of the dispensing cylinder in an inclined state.
Figure 37:
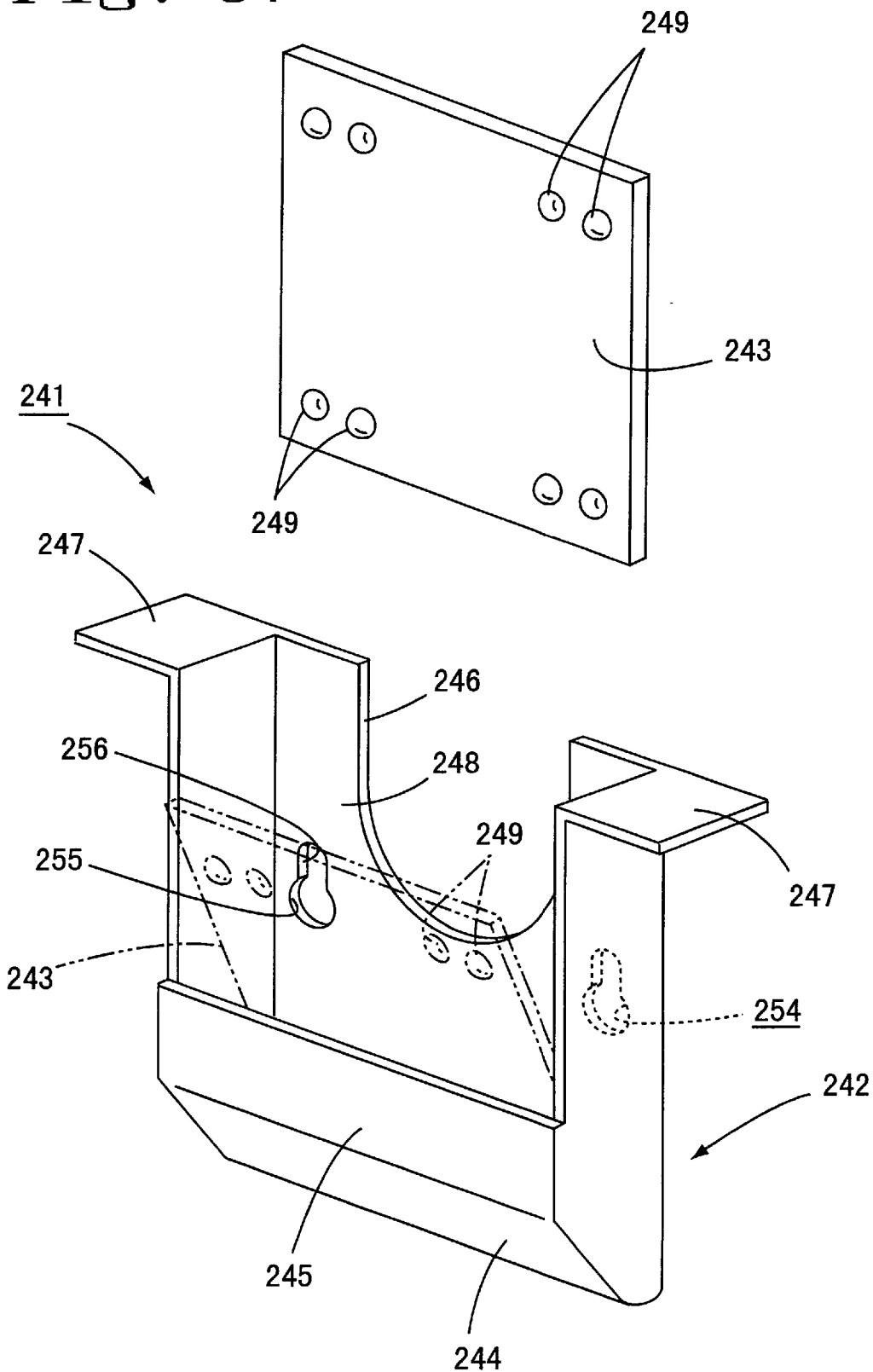
FIG. 37 is an exploded perspective view of a receiving member.
Figure 38:
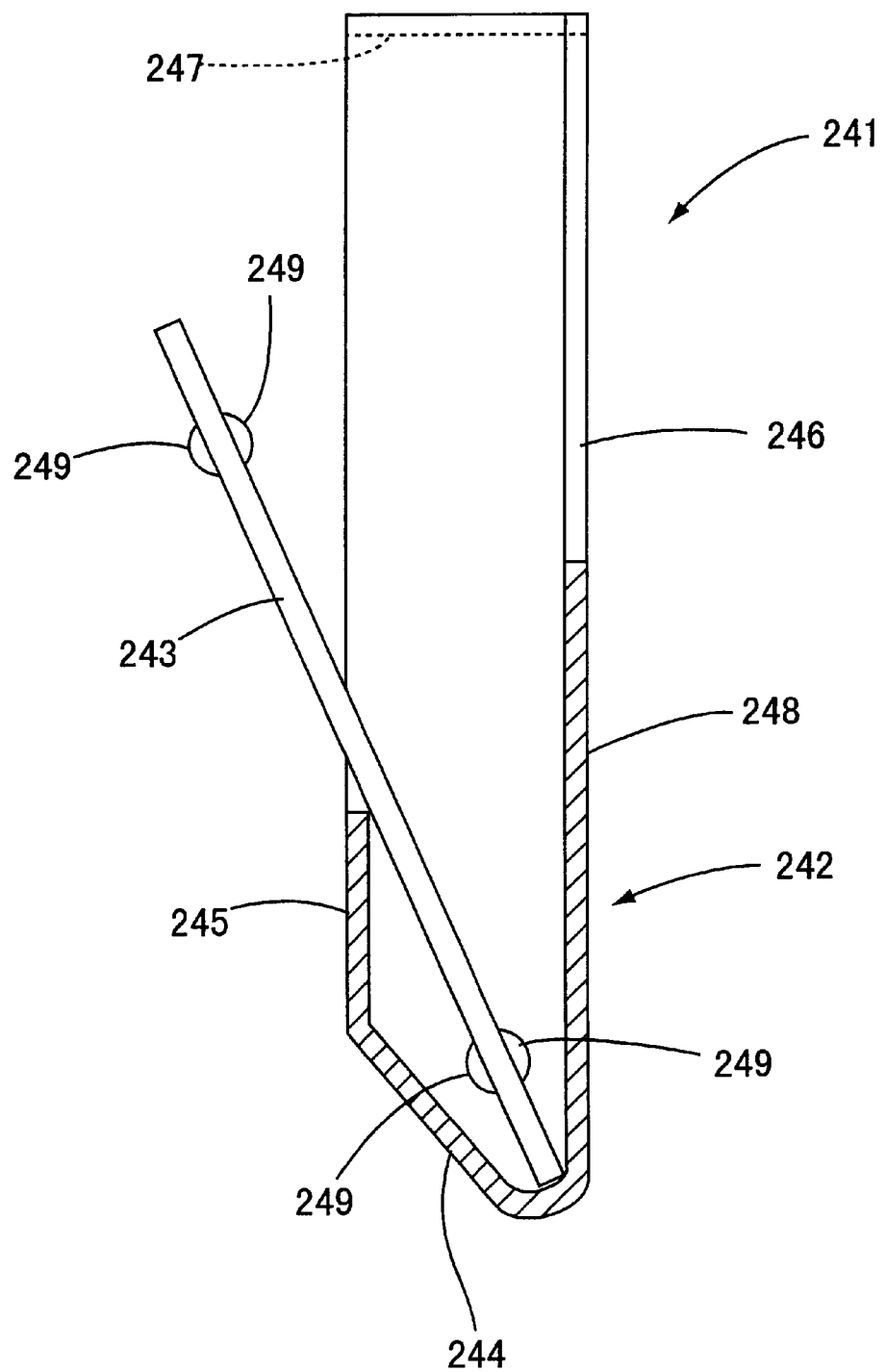
FIG. 38 is a sectional view of the receiving member in the natural state.

FIGS. 34 to 39 illustrate a twelfth embodiment. Differences between the ninth and twelfth embodiments will be described. A receiving member 241 is detachably attached to the backside of the door 104 to be located below connecting pipe 134. The receiving member 241 includes a vessel 242 and a receiving plate 243 as shown in FIGS. 37 and 38. The vessel 242 is formed into the shape of a flat box and includes a bottom plate 244 inclined downward from the front toward the rear thereof. The vessel 242 also includes a low front plate 245 extending from the bottom plate 244 and an opening extending from an upper end of the front plate 245 to the top. The vessel 242 further includes a rear plate 248 formed with a generally U-shaped escape groove 246 extending downward from an upper edge of the rear plate 248. Further, right-hand and left-hand side plates of the vessel 242 include knob plates 247 projecting from upper edges of the plates respectively.

The receiving plate 243 is inserted into the vessel 242. The receiving plate 243 has a width substantially equal to that of the vessel 242 and a height lower than the vessel 242 and is formed into a generally square shape. A pair of protrusions 249 are formed on each of corners of the receiving plate 243. In each pair, one protrusion:249 protrudes from the front side and the other protrusion 249 protruding from the backside. The protrusions 249 are provided so that the receiving plate 243 is prevented from adhering to the rear plate 248 when it is wet. Since the protrusions 249 protrude from the corners of the front side and the backside of the receiving plate 243, the protrusions 249 reliably abuts the rear plate 248 even when the receiving plate 243 is inserted into the vessel 242 from any side thereof and with its sides inverted.

When inserted into the vessel 242, the receiving plate 243 is supported on the upper edge of the front plate 245 and inclined with its upper end projecting out of the vessel 242, since the bottom plate 244 of the vessel 242 is inclined, as shown in FIG. 38.

Figure 39:
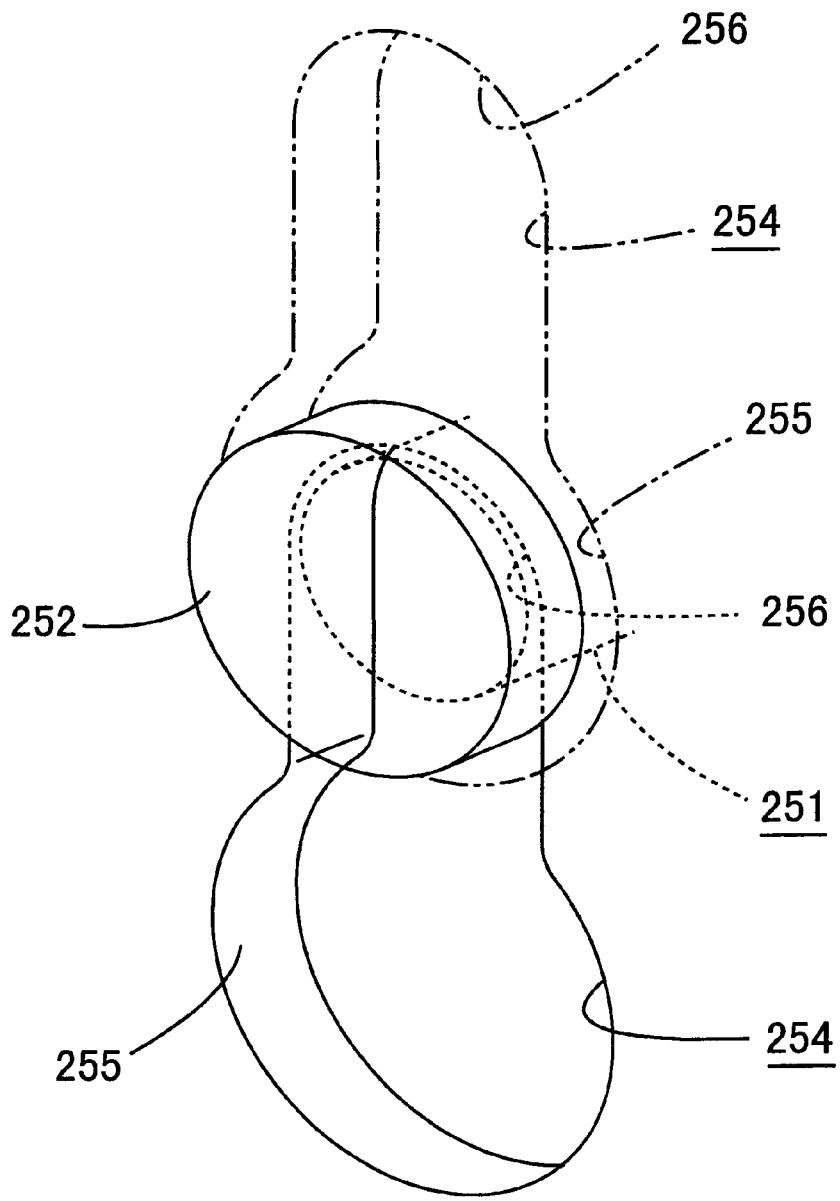
FIG. 39 is a partial perspective view showing a mounting structure for a vessel of the receiving member.

The structure for mounting the vessel 242 will now be described. A pair of pins 252 project from the backside of the door 104 slightly below the connecting pipe 134. The pins 252 have respective heads 252 as shown in FIG. 39. The rear plate 248 of the vessel 242 has a pair of mounting holes 254. Each mounting hole 254 includes a large diameter portion 255 through which the head 252 of each pin 251 is inserted and a small diameter portion 256 which is continuous to the large diameter portion and into which a shaft portion of each pin 215 is fitted.

In attaching the vessel 242, the knob plates 247 are gripped so that the vessel is pressed against the backside of the door 104 with the large diameter portions 255 of the mounting holes 254 being aligned with the heads 252 of the pins 251 respectively, as shown by chain line in FIG. 39. Then, when the vessel 242 is lowered as shown by solid line in FIG. 39, the shaft portions of the pins 251 are fitted into the small diameter portions 256, so that the pins 251 are locked at the head portions 252, respectively. As a result, the vessel 242 is attached to the backside of the door 104. When the vessel 242 is detached, the knobs 247 are gripped so that the vessel 242 is raised. When the head portions 252 of the pins 251 are moved to the large diameter portions 255 respectively, the vessel 242 is pulled toward the operator.

The operation of the ice cream dispenser will now be described. The pack 300 is replaced by a new one when the ice cream 301 in the pack 300 has been used up. In this case, the door 3 is first opened, so that the dispensing cylinder 11 is taken out of the dispenser. The operating arms 152 of the link mechanism 160 are rotated so that the dispensing cylinder 112 is inclined to assume the inclined position. With this, the discharging cylinder 302 of the pack 300 is pulled out from the inner projecting end of the connecting pipe 134. When the lid 119 is then detached from the cylinder 112, the used pack 300 is taken out and a new pack 300 is accommodated in-the pack accommodating chamber 116.

A certain amount of ice cream 301 left in the last dispensing operation remains in the connecting pipe 134 as shown in FIG. 36. The connecting pipe 134 is exposed to outside air when the heat-insulating door 104 is opened and accordingly, the temperature of the pipe 134 is increased. As a result, the ice cream 301 remaining in the pipe 134 would be melted, thereby dropping from the inner projecting end thereof. In the embodiment, however, the receiving plate 243 is inclined so that the upper end thereof projects further inward in the rear of the inner projecting end of the connecting pipe 134 as shown in FIG. 36. Accordingly, even if the melted ice cream 301 drops from the inner projecting end of the connecting pipe 134, the drops are received on the receiving plate 243 and flows to be reserved in the vessel 242. Consequently, the melted ice cream 301 can be prevented from adhering to unnecessary portions including the hinge 21.

When the new pack 300 is accommodated in the pack accommodating chamber 116 and the lid 119 is re-attached to the cylinder 112, the operating arms 152 are operated so that the cylinder 112 is raised to assume the standing position. With this, the discharging cylinder 302 of the pack 300 is fitted into the inner projecting end of the connecting pipe 134 to be connected thereto, and the receiving plate 243 of the receiving member 241 is pushed to be folded to the vessel 242 side. Then, when the door 104 is closed, the cylinder 112 is accommodated in the freezing compartment 102, the ice cream 301 can be re-dispensed.

When filled with the dropped ice cream 301, the cylinder 112 is inclined and the vessel 242 is detached with the receiving plate 243 in the manner as described above and cleaned with water.

According to the twelfth embodiment, the receiving member 241 receives the ice cream 301 which is melted and drops from the inner projecting end of the connecting pipe 134 to the backside of the door 104. The received ice cream 301 is reserved in the receiving member 241. Consequently, the melted ice cream 301 can be prevented from adhering to the unnecessary portions including the hinge 21 which is difficult to clean.

Further, the receiving member 241 is folded to the vessel 242 side while the cylinder 112 is standing. The receiving member 241 is inclined so as to project further inward in the rear of the inner projecting end of the connecting pipe 134 when the cylinder 112 is inclined such that there is a possibility that the ice cream 301 may drop. Consequently, the receiving member 241 can reliably receive the dropping ice cream 301 although provided in the narrow space between the door 134 and the cylinder 112.

Figure 40:
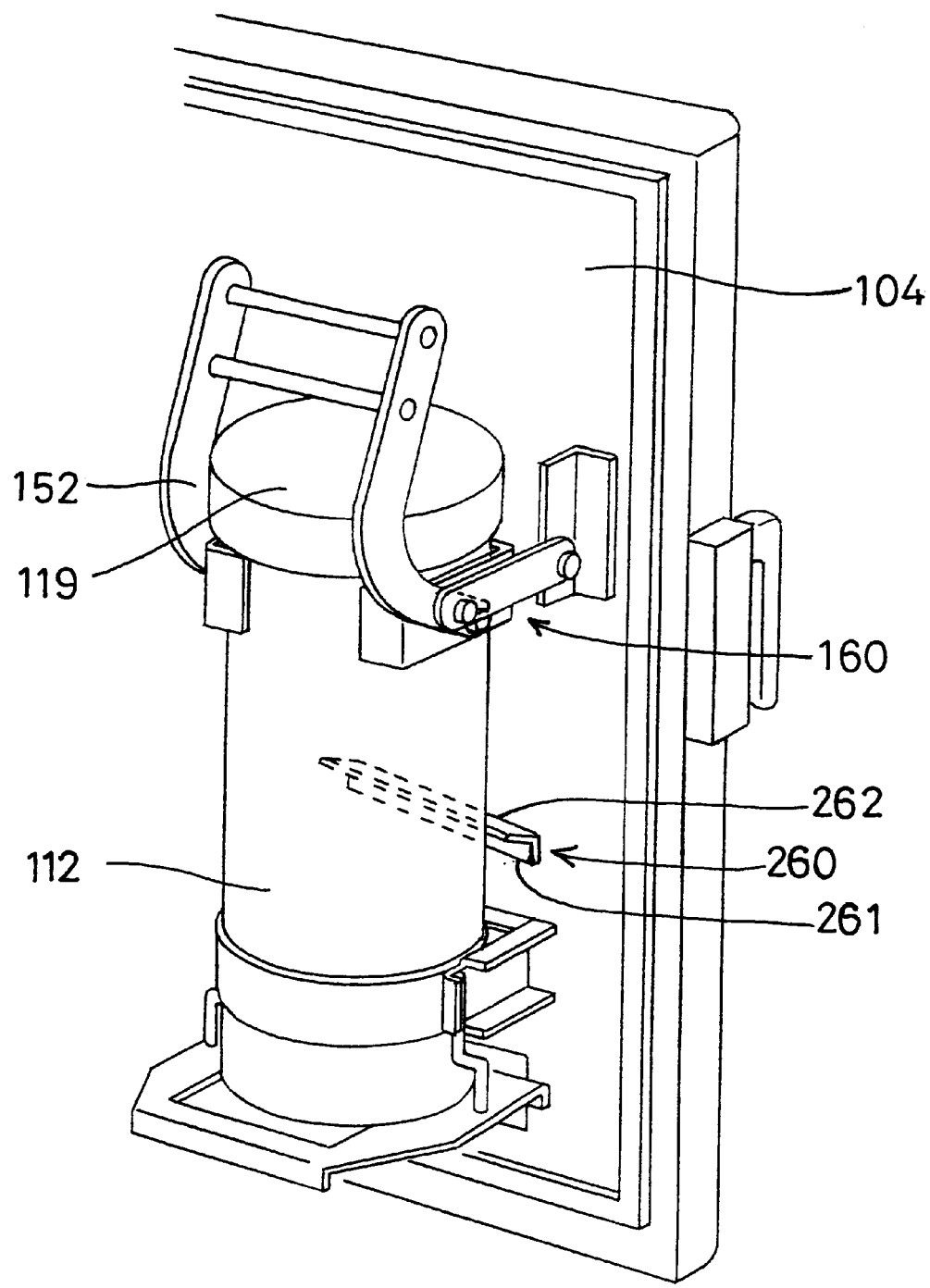
FIG. 40 is a perspective view of the backside of the heat-insulating door of the ice cream dispenser of a thirteenth embodiment in accordance with the invention.

FIGS. 40 and 41 illustrate a thirteenth embodiment. In the above-described twelfth embodiment, the receiving member 241 filled with the dropped ice cream 301 is detached for the cleaning. When the melted ice cream 301 drops from the connecting pipe 134 while the receiving member 241 is not attached to the door 104, the hinge 148 etc. would be soiled. In view of this problem, the thirteenth embodiment provides an auxiliary receiving plate 260 used when the receiving member 241 has been detached.

The auxiliary receiving plate 260 is formed to have an enough length to cover the hinge 148 mounted on the lower end of the cylinder 112. The auxiliary receiving plate 260 includes a vertical mounting portion 261 and a receiving portion 262 formed by bending an upper portion of the mounting portion 261 obliquely upward. The auxiliary receiving plate 260 is mounted on the backside of the door 104 by screws 263 below the receiving member 241 with the receiving portion 262 being directed to the inner interior of the freezing compartment.

The melted ice cream 301 drops from the connecting pipe 134 after the receiving member 241 has been detached, as shown in FIG. 41. However, the ice cream 301 drops onto the receiving portion 262 of the auxiliary receiving plate 260, flowing to the lower end side. The melted ice cream 301 is then discharged along the backside of the door 104 at one side of the hinge 148. Accordingly, when the melted ice cream 301 drops while the receiving member 241 is detached, the ice cream can be prevented from adhering at least to the hinge 148.

Figure 42:
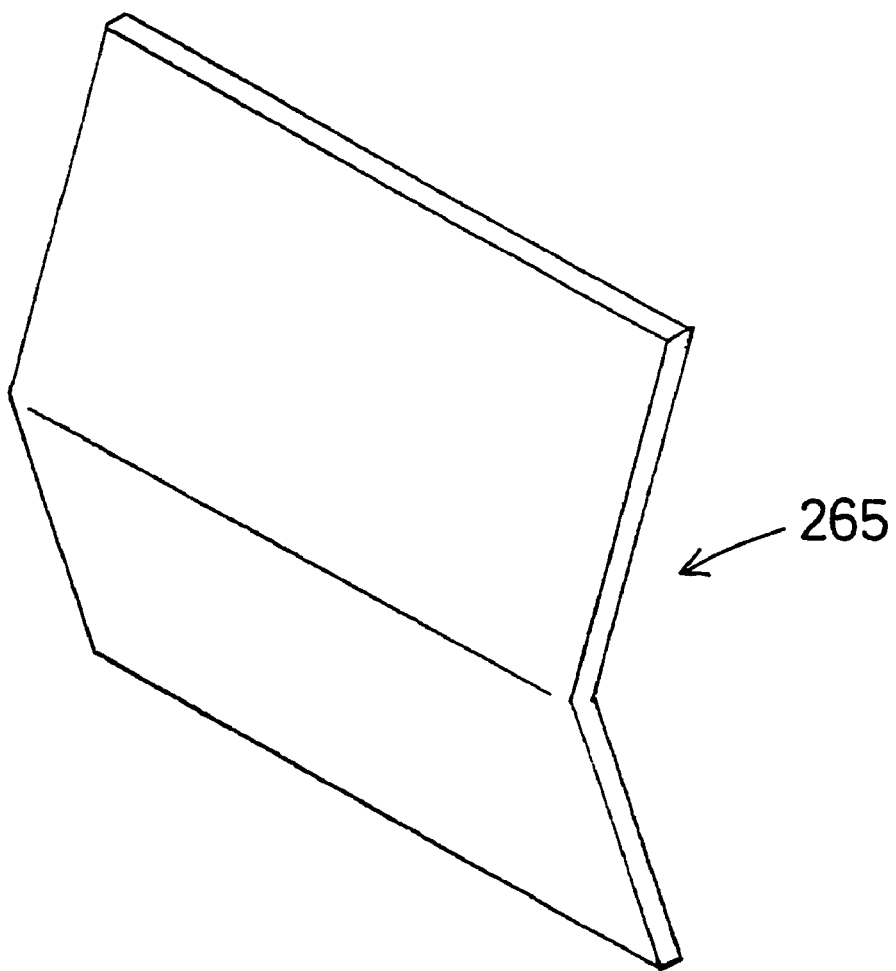
FIG. 42 is a perspective view of a modified form of the receiving plate of the receiving member.

The receiving plate used in the vessel 242 of the receiving member 241 may be bent into the shape as shown as a receiving plate 265 in FIG. 42. In this case, since the center of gravity is shifted to the surface side, the receiving plate 265 can be inclined with the upper end projecting from the vessel 242 when inserted into the vessel.

Figure 43:
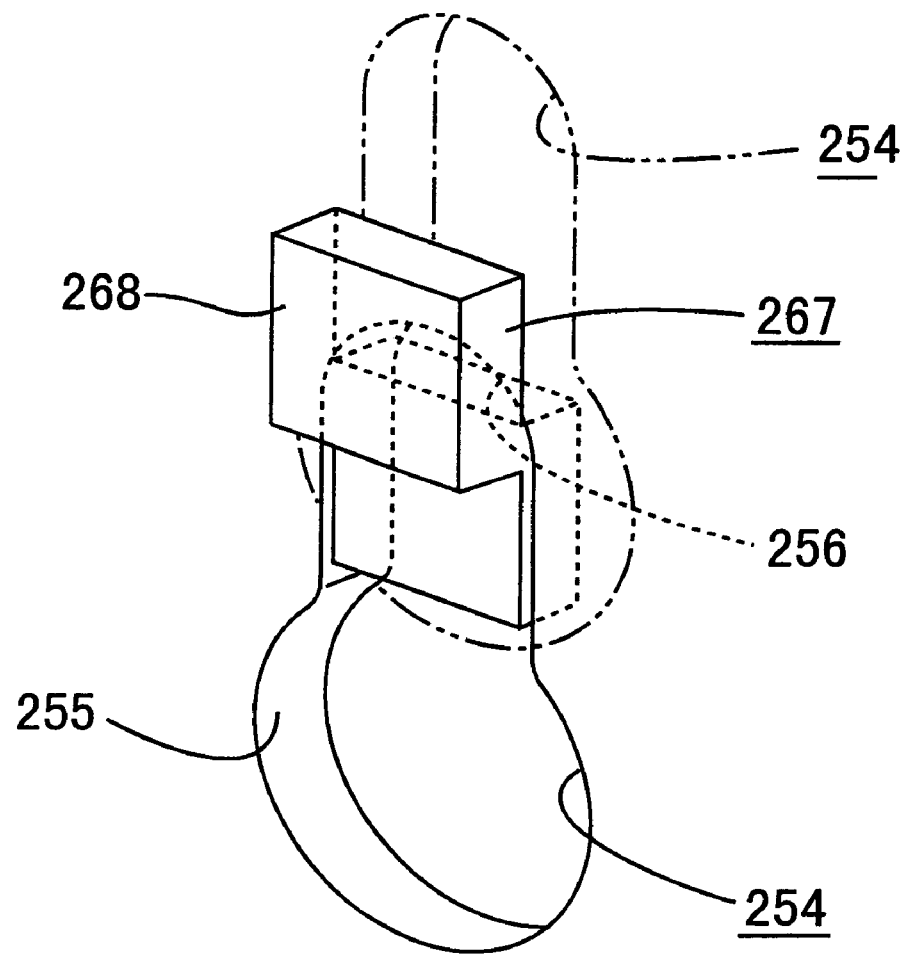
FIG. 43 is a perspective view of a modified form of the mounting structure for the vessel of the receiving member.
Figure 44:
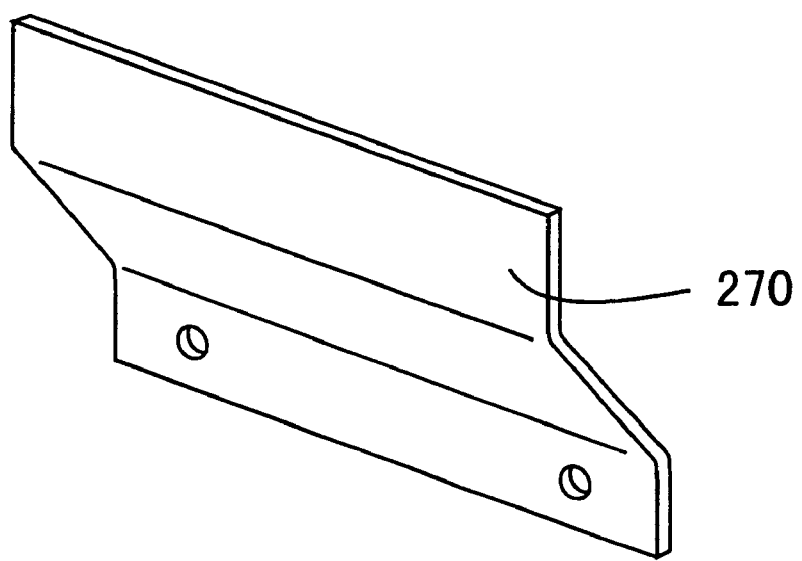
FIG. 44 is a perspective view of another modified form of the mounting structure for the vessel of the receiving member.
Figure 45:
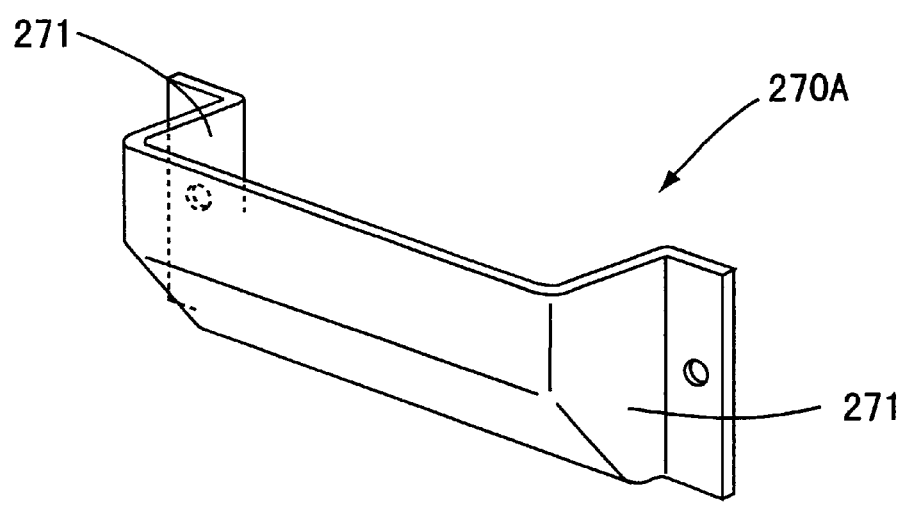
FIG. 45 is a front view of a modified form of an auxiliary receiving plate.
Figure 46:
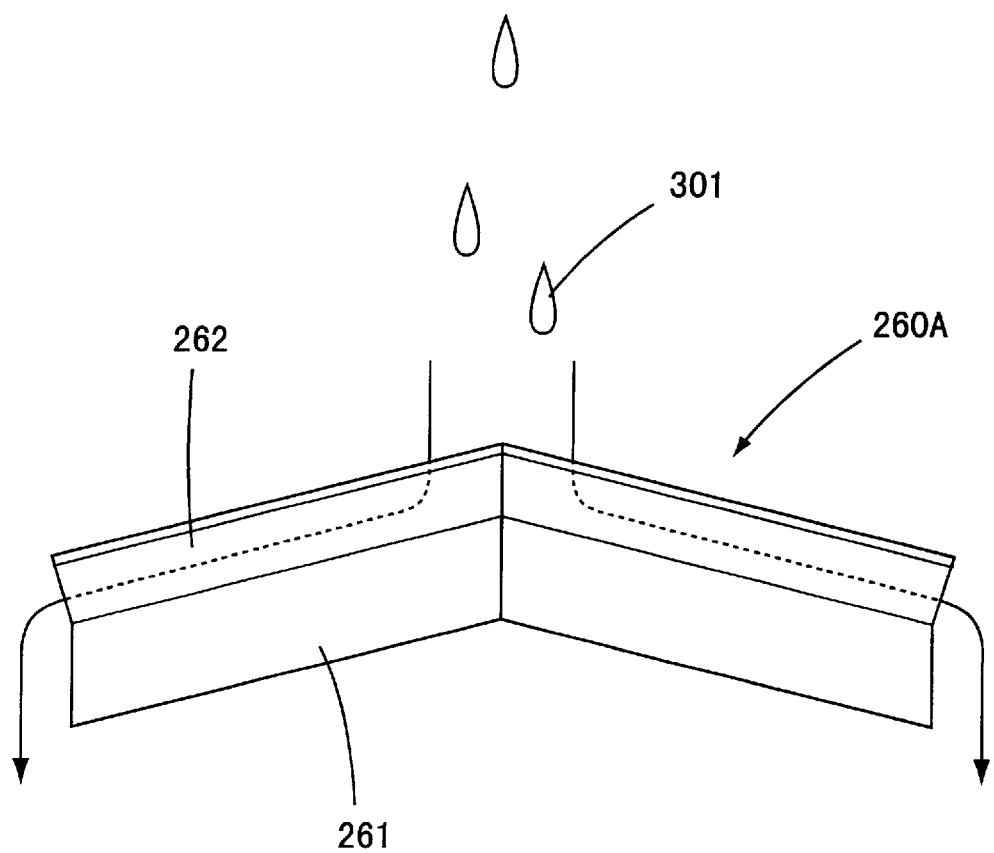
FIG. 46 is a front view of another modified form of the auxiliary receiving plate.

A crank-shaped engaging member may be attached to the backside of the door 104 as the means for mounting the vessel 242 of the receiving member 241 on the backside of the door, as shown in FIG. 43. The small diameter portion 256 of the mounting hole 254 may be caught on a projecting portion 268 of the upper end. Further, a mounting member 270 as shown in FIG. 44 may be used. The bottom of the vessel 242 can be fitted with the mounting member 270 from above. A mounting member 270A provided with side plates 271 may be provided, instead of the mounting member 270 as shown in FIG. 44. An angled auxiliary receiving plate 260A as shown in FIG. 46 may be provided instead of the auxiliary receiving plate 260 in the thirteenth embodiment. In this case, the ice cream 301 dropped on the receiving portion 262 flows along both sides of the hinge 148, avoiding the latter.

In the foregoing first to third embodiments, as the locking means for holding the dispensing cylinder at the standing position, the latch member is elastically engaged with the engaging piece. However, a lever employed in a locking mechanism of a tool box may be provided, for example. In this case, the lever supports one end side of an engagement ring for rocking motion and is provided at the dispensing cylinder side. The other end of the ring is caught on the engagement piece projecting from the heat-insulating door while the lever is rocking in such a direction as to be loosened. Thereafter, the lever is rocked in such a direction as to be tightened. Thus, the structure for holding the cylinder by means of a toggle function may be employed.

Another fluid than the brine may be used as the operating fluid. Alternatively, the invention may be applied to a case where air is used as the operating fluid.

In the foregoing embodiments, the ice cream includes both of a soft ice cream and a hard ice cream. Further, the invention may be applied to dispensers for dispensing other frozen desserts such as yogurt or sherbet.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A frozen dessert dispenser comprising:
   a heat-insulating box having a side formed with an opening closed and opened by a heat-insulating door;

a cooling unit for cooling an atmosphere in the heat-insulating box;

a dispensing cylinder formed into the shape of a vessel and having an open end, the cylinder including a lid for closing and opening the open end thereof and a piston provided therein for sliding motion, the open end having a notch in an edge thereof, the cylinder including a pack accommodating chamber defined between the piston and the lid therein so that a frozen dessert pack is accommodated into the pack accommodating chamber when the lid is opened, the frozen dessert pack including a dessert discharging cylinder fitted into the notch when the frozen dessert pack is accommodated into the pack accommodating chamber and a frozen dessert filling the pack;

a bracket for mounting the dispensing cylinder and hingedly mounted on a backside of the door so as to be rotatable, the bracket positioning the dispensing cylinder in the heat-insulating box and being rotated relative to the door so that the dispensing cylinder is inclined from a standing position where the dispensing cylinder stands along the door to an inclined position where the open end of the dispensing cylinder is spaced away from the door; and a pressure pump for supplying and discharging an operating fluid to and from a pressure chamber defined in the dispensing cylinder, the pressure chamber being located in a space opposite the pack accommodating chamber with respect to the piston.

2. The frozen dessert dispenser according to claim 1, which further comprises an engagement claw provided on the backside of the door and a latch arm provided on the dispensing cylinder so as to engage the engagement claw and wherein the dispensing cylinder is held at the standing position when the latch arm engages the engagement claw.

3. The frozen dessert dispenser according to claim 1, which further comprises an operating arm having one of two ends rotatably connected to the dispensing cylinder and provided with an operating handle at the other end, a support arm having one end rotatably connected to the door and the other end rotatably connected to a portion of the dispensing cylinder away from a portion of the dispensing cylinder to which the operating arm is connected, thereby constituting a link mechanism with the operating arm, and wherein the dispensing cylinder is reciprocally moved between the standing and inclined positions when the operating handle is operated so that the link mechanism is actuated.

4. The frozen dessert dispenser according to claim 3, which further comprises an abutting section provided on the operating arm so as to abut the dispensing cylinder and wherein when the dispensing cylinder is inclined to the inclined position, the abutting section abuts the dispensing cylinder, thereby holding the dispensing cylinder at the inclined position and preventing further inclination of the dispensing cylinder.

5. The frozen dessert dispenser according to claim 4, which further comprises a limiting pin provided on the dispensing cylinder so as to abut the operating arm and wherein when the operating arm is rotated so that the dispensing cylinder assumes the standing position, the limiting pin abuts the operating arm, thereby limiting further rotation of the operating arm.

6. The frozen dessert dispenser according to claim 5, which further comprises an engagement pin provided on the operating arm and a locking arm having one end rotatably connected to the door and including at the other end side a generally L-shaped slit with which the engagement pin is fitted and having a vertical hole and a horizontal hole continuous to each other, and wherein when the dispensing cylinder assumes the standing position, the engagement pin enters the vertical hole of the L-shaped slit, thereby preventing the operating arm from being rotated, and when the locking arm is further rotated so that the engagement pin enters the horizontal hole from the vertical hole, the operating arm is allowed to be rotated.

7. The frozen dessert dispenser according to claim 4, which further comprises an engagement pin provided on the operating arm and a locking arm having one end rotatably connected to the door and including at the other end side a generally L-shaped slit with which the engagement pin is fitted and having a vertical hole and a horizontal hole continuous to each other, and wherein when the dispensing cylinder assumes the standing position, the engagement pin enters the vertical hole of the L-shaped slit, thereby preventing the operating arm from being rotated, and when the locking arm is further rotated so that the engagement pin enters the horizontal hole from the vertical hole, the operating arm is allowed to be rotated.

8. The frozen dessert dispenser according to claim 7, wherein the operating arm includes a door closure preventing section provided on a distal end thereof, the door closure limiting section abutting an open edge of the opening of the heat-insulating box when the dispensing cylinder assumes the inclined position, thereby preventing the door from being closed.

9. The frozen dessert dispenser according to claim 8, wherein the lid of the dispensing cylinder is rotated relative to the dispensing cylinder so as to completely close the open end of the dispensing cylinder, wherein the lid and the backside of the door are provided with a pair of limiting protrusions interfering with each other respectively, wherein when the lid assumes a normal closing position, the limiting protrusions are prevented from interfering with each other so that the dispensing cylinder is allowed to be inclined from the standing position to the inclined position, and wherein when the lid is not rotated to the normal closing position, the limiting protrusions interfere with each other so that the dispensing cylinder is disallowed to be inclined from the inclined position to the standing position.

10. The frozen dessert dispenser according to claim 7, wherein the lid of the dispensing cylinder is rotated relative to the dispensing cylinder so as to completely close the open end of the dispensing cylinder, wherein the lid and the backside of the door are provided with a pair of limiting protrusions interfering with each other respectively, wherein when the lid assumes a normal closing position, the limiting protrusions are prevented from interfering with each other so that the dispensing cylinder is allowed to be inclined from the standing position to the inclined position, and wherein when the lid is not rotated to the normal closing position, the limiting protrusions interfere with each other so that the dispensing cylinder is disallowed to be inclined from the inclined position to the standing position.

11. The frozen dessert dispenser according to claim 4, wherein the operating arm includes a door closure preventing section provided on a distal end thereof, the door closure limiting section abutting an open edge of the opening of the heat-insulating box when the dispensing cylinder assumes the inclined position, thereby preventing the door from being closed.

12. The frozen dessert dispenser according to claim 11, wherein the lid of the dispensing cylinder is rotated relative to the dispensing cylinder so as to completely close the open end of the dispensing cylinder, wherein the lid and the backside of the door are provided with a pair of limiting protrusions interfering with each other respectively, wherein when the lid assumes a normal closing position, the limiting protrusions are prevented from interfering with each other so that the dispensing cylinder is allowed to be inclined from the standing position to the inclined position, and wherein when the lid is not rotated to the normal closing position, the limiting protrusions interfere with each other so that the dispensing cylinder is disallowed to be inclined from the inclined position to the standing position.

13. The frozen dessert dispenser according to claim 4, wherein the lid of the dispensing cylinder is rotated relative to the dispensing cylinder so as to completely close the open end of the dispensing cylinder, wherein the lid and the backside of the door are provided with a pair of limiting protrusions interfering with each other respectively, wherein when the lid assumes a normal closing position, the limiting protrusions are prevented from interfering with each other so that the dispensing cylinder is allowed to be inclined from the standing position to the inclined position, and wherein when the lid is not rotated to the normal closing position, the limiting protrusions interfere with each other so that the dispensing cylinder is disallowed to be inclined from the inclined position to the standing position.

14. The frozen dessert dispenser according to claim 3, which further comprises a limiting pin provided on the dispensing cylinder so as to abut the operating arm and wherein when the operating arm is rotated so that the dispensing cylinder assumes the standing position, the limiting pin abuts the operating arm, thereby limiting further rotation of the operating arm.

15. The frozen dessert dispenser according to claim 14, which further comprises an engagement pin provided on the operating arm and a locking arm having one end rotatably connected to the door and including at the other end side a generally L-shaped slit with which the engagement pin is fitted and having a vertical hole and a horizontal hole continuous to each other, and wherein when the dispensing cylinder assumes the standing position, the engagement pin enters the vertical hole of the L-shaped slit, thereby preventing the operating arm from being rotated, and when the locking arm is further rotated so that the engagement pin enters the horizontal hole from the vertical hole, the operating arm is allowed to be rotated.

16. The frozen dessert dispenser according to claim 15, wherein the operating arm includes a door closure preventing section provided on a distal end thereof, the door closure limiting section abutting an open edge of the opening of the heat-insulating box when the dispensing cylinder assumes the inclined position, thereby preventing the door from being closed.

17. The frozen dessert dispenser according to claim 16, wherein the lid of the dispensing cylinder is rotated relative to the dispensing cylinder so as to completely close the open end of the dispensing cylinder, wherein the lid and the backside of the door are provided with a pair of limiting protrusions interfering with each other respectively, wherein when the lid assumes a normal closing position, the limiting protrusions are prevented from interfering with each other so that the dispensing cylinder is allowed to be inclined from the standing position to the inclined position, and wherein when the lid is not rotated to the normal closing position, the limiting protrusions interfere with each other so that the dispensing cylinder is disallowed to be inclined from the inclined position to the standing position.

18. The frozen dessert dispenser according to claim 15, wherein the lid of the dispensing cylinder is rotated relative to the dispensing cylinder so as to completely close the open end of the dispensing cylinder, wherein the lid and the backside of the door are provided with a pair of limiting protrusions interfering with each other respectively, wherein when the lid assumes a normal closing position, the limiting protrusions are prevented from interfering with each other so that the dispensing cylinder is allowed to be inclined from the standing position to the inclined position, and wherein when the lid is not rotated to the normal closing position, the limiting protrusions interfere with each other so that the dispensing cylinder is disallowed to be inclined from the inclined position to the standing position.

19. The frozen dessert dispenser according to claim 14, wherein the operating arm includes a door closure preventing section provided on a distal end thereof, the door closure limiting section abutting an open edge of the opening of the heat-insulating box when the dispensing cylinder assumes the inclined position, thereby preventing the door from being closed.

20. The frozen dessert dispenser according to claim 19, wherein the lid of the dispensing cylinder is rotated relative to the dispensing cylinder so as to completely close the open end of the dispensing cylinder, wherein the lid and the backside of the door are provided with a pair of limiting protrusions interfering with each other respectively, wherein when the lid assumes a normal closing position, the limiting protrusions are prevented from interfering with each other so that the dispensing cylinder is allowed to be inclined from the standing position to the inclined position, and wherein when the lid is not rotated to the normal closing position, the limiting protrusions interfere with each other so that the dispensing cylinder is disallowed to be inclined from the inclined position to the standing position.

21. The frozen dessert dispenser according to claim 14, wherein the lid of the dispensing cylinder is rotated relative to the dispensing cylinder so as to completely close the open end of the dispensing cylinder, wherein the lid and the backside of the door are provided with a pair of limiting protrusions interfering with each other respectively, wherein when the lid assumes a normal closing position, the limiting protrusions are prevented from interfering with each other so that the dispensing cylinder is allowed to be inclined from the standing position to the inclined position, and wherein when the lid is not rotated to the normal closing position, the limiting protrusions interfere with each other so that the dispensing cylinder is disallowed to be inclined from the inclined position to the standing position.

22. The frozen dessert dispenser according to claim 3, which further comprises an engagement pin provided on the operating arm and a locking arm having one end rotatably connected to the door and including at the other end side a generally L-shaped slit with which the engagement pin is fitted and having a vertical hole and a horizontal hole continuous to each other, and wherein when the dispensing cylinder assumes the standing position, the engagement pin enters the vertical hole of the L-shaped slit, thereby preventing the operating arm from being rotated, and when the locking arm is further rotated so that the engagement pin enters the horizontal hole from the vertical hole, the operating arm is allowed to be rotated.

23. The frozen dessert dispenser according to claim 1, further comprising a damper stay provided between the door and the dispensing cylinder so as to be actuated when the dispensing cylinder is inclined so that the open end thereof is departed from the door.

24. A frozen dessert dispenser comprising:
   a heat-insulating box having a side formed with an opening closed and opened by a heat-insulating door;

a cooling unit for cooling an atmosphere in the heat-insulating box;

a dispensing cylinder formed into the shape of a vessel and having an open end, the cylinder including a lid for closing and opening the open end thereof and a piston provided therein for sliding motion, the open end having a notch in an edge thereof, the cylinder including a pack accommodating chamber defined between the piston and the lid therein so that a frozen dessert pack is accommodated into the pack accommodating chamber when the lid is opened, the frozen dessert pack including a discharging cylinder fitted into the notch when the frozen dessert pack is accommodated into the pack accommodating chamber and a frozen dessert filling the pack;

a bracket for mounting the dispensing cylinder in a vertical disposition and hingedly mounted on a backside of the door so as to be rotatable, the bracket being rotated so that the dispensing cylinder is inclined from a standing position where the dispensing cylinder stands along the door to an inclined position where the open end of the dispensing cylinder is spaced away from the door;

a dispensing mechanism provided on the door and including a connecting pipe and a valve, the connecting pipe being connected to the discharging cylinder of the frozen dessert pack when the dispensing cylinder assumes the standing position, the connecting pipe being disconnected from the discharging cylinder when the dispensing cylinder assumes the inclined position, the valve shutting off and opening a flow of frozen dessert fed into the connecting pipe out of the frozen dessert pack;

a pressure pump for supplying and discharging an operating fluid to and from a pressure chamber defined in the dispensing cylinder, the pressure chamber being located in a space opposite the pack accommodating chamber with respect to the piston; and a receiving member provided on the backside of the door so as to be located below the connecting pipe, thereby receiving the frozen dessert falling from the connecting pipe.

25. The frozen dessert dispenser according to claim 24, wherein the receiving member includes a vessel having an open upper face and attached to the backside of the door and a receiving plate inserted into the vessel, the receiving plate having such a weight balance as to be normally inserted into the vessel while being inclined so that an upper end thereof is spaced away from the backside of the door, the receiving plate being pushed by the dispensing cylinder to rise up when the dispensing cylinder is standing, the receiving plate being inclined when the dispensing cylinder is inclined.

26. The frozen dessert dispenser according to claim 25, further comprising an auxiliary receiving plate provided below the receiving plate to receive the frozen dessert having dropped down to the side of the backside of the door and guide the received frozen dessert to the side right over the hinge.

27. The frozen dessert dispenser according to claim 24, further comprising an auxiliary receiving plate provided below the receiving plate to receive the frozen dessert having dropped down to the side of the backside of the door and guide the received frozen dessert to the side right over the hinge.

28. The frozen dessert dispenser according to claim 24, further comprising a damper stay provided between the door and the dispensing cylinder so as to be actuated when the dispensing cylinder is inclined so that the open end thereof is departed from the door.

* * * * *